United States Patent [19]
Sugioka et al.

[11] Patent Number: 5,613,569
[45] Date of Patent: Mar. 25, 1997

[54] ELECTRIC MOTOR VEHICLE AND BATTERY UNIT FOR ELECTRIC MOTOR VEHICLE

[75] Inventors: Kouichi Sugioka; Masao Ogawa; Hiroyuki Sako; Hidetoshi Takamatsu, all of Saitama, Japan

[73] Assignee: Honda Giken Kogyo Kabushiki Kaisha, Tokyo, Japan

[21] Appl. No.: 533,347

[22] Filed: Sep. 25, 1995

Related U.S. Application Data

[60] Continuation of Ser. No. 453,901, May 30, 1995, abandoned, which is a division of Ser. No. 371,891, Jan. 12, 1995, Pat. No. 5,477,936, which is a continuation-in-part of Ser. No. 956,066, Oct. 2, 1992, abandoned.

[30] Foreign Application Priority Data

Oct. 19, 1991 [JP] Japan ................... 3-299874
Mar. 30, 1992 [JP] Japan ................... 4-103745

[51] Int. Cl.$^6$ .................................................. B62K 11/10
[52] U.S. Cl. .................... 180/68.5; 180/220; 429/99; 429/120
[58] Field of Search ............................ 180/65.1, 68.1, 180/68.2, 68.5, 220, 229; 429/83, 99, 120; 454/69, 105

[56] References Cited

U.S. PATENT DOCUMENTS

| | | | |
|---|---|---|---|
| 2,104,770 | 1/1938 | Saunders | 180/68.5 |
| 2,104,771 | 1/1938 | Saunders | 180/68.5 |
| 2,104,772 | 1/1938 | Saunders | 180/68.5 |
| 2,104,773 | 1/1938 | Saunders | 180/68.5 |
| 2,717,045 | 9/1955 | Nallinger | 180/68.5 X |
| 3,713,502 | 1/1973 | Delaney et al. | 180/217 X |
| 3,745,048 | 9/1973 | Dinkler et al. | |
| 3,773,131 | 11/1973 | Jaulmes | 180/220 X |
| 3,928,080 | 12/1975 | Aronson | |

(List continued on next page.)

FOREIGN PATENT DOCUMENTS

| | | |
|---|---|---|
| 327023 | 1/1976 | Australia . |
| 0003888 | 9/1979 | European Pat. Off. . |
| 0050057 | 4/1982 | European Pat. Off. . |
| 1408074 | 1/1991 | European Pat. Off. . |
| 1469995 | 2/1992 | European Pat. Off. . |
| 0539269 | 4/1993 | European Pat. Off. . |

(List continued on next page.)

OTHER PUBLICATIONS

Patent Abstracts of Japan, vol. 16, No. 34 (M–1204) (5077) 28 Jan. 1992 & JP–A–03 243 484 (Honda Motor Co., Ltd.) Oct. 30, 1991.
Patent Abstracts of Japan, vol. 16, No. 34 (M–1204) (5077) 28 Jan. 1992 & JP–A–03 243 484 (Honda Motor Co., Ltd.) Oct. 30, 1991.

*Primary Examiner*—Brian L. Johnson
*Assistant Examiner*—Michael Mar
*Attorney, Agent, or Firm*—Birch, Stewart, Kolasch & Birch, LLP

[57] ABSTRACT

An electrically powered motor-scooter includes a scooter body having a step floor, a seat, a body cover mounted under the seat, and a storage compartment located below the seat. A battery case is mounted under the step floor which has at least one opening therein which is open to the surrounding air for allowing the flow of air therethrough. A rear compartment extends below and rearwardly of the storage compartment and extends rearwardly of the battery case. The storage compartment forms an upper wall of the rear compartment, and the body cover forms sidewalls of the rear compartment. A portion of the rear compartment is open to the surrounding air. A fan is mounted in a forward portion of the rear compartment for producing a movement of cooling air between the rear compartment and the battery case. The cooling air passes through the rear compartment and the opening in the battery case. A duct is connected between the fan and the battery case which forms a passage for the cooling air to pass therethrough. A control apparatus is mounted in the rear compartment rearwardly of the fan for controlling a drive motor of the electrically powered motor-scooter.

10 Claims, 40 Drawing Sheets

U.S. PATENT DOCUMENTS

| | | | |
|---|---|---|---|
| 4,111,274 | 9/1978 | King et al. | 180/65.5 X |
| 4,135,593 | 1/1979 | Fowkes | 180/65.1 |
| 4,183,418 | 1/1980 | Dudas | 180/216 |
| 4,406,342 | 9/1983 | Lacroix | 180/220 |
| 4,468,440 | 8/1984 | Evjen . | |
| 4,666,009 | 5/1987 | Yashima et al. . | |
| 5,015,545 | 5/1991 | Brooks . | |
| 5,082,075 | 1/1992 | Karolek et al. | 180/68.2 |
| 5,101,924 | 4/1992 | Yamagiwa et al. | 180/220 |
| 5,207,288 | 5/1993 | Ono | 180/68.5 X |
| 5,222,572 | 6/1993 | Yamagiwa et al. | 180/220 |

FOREIGN PATENT DOCUMENTS

| | | | |
|---|---|---|---|
| 2669585 | 5/1992 | France . | |
| 3110365 | 10/1982 | Germany . | |
| 4018347 | 12/1991 | Germany | 180/68.5 |
| 2182590 | 7/1990 | Japan | 180/220 |
| 3-105098 | 4/1991 | Japan . | |
| 3128789 | 5/1991 | Japan . | |
| 3243484 | 10/1991 | Japan . | |
| 5105143 | 4/1993 | Japan | 180/220 |
| 5105147 | 4/1993 | Japan | 180/220 |
| 1298046 | 11/1972 | United Kingdom . | |
| 2027978 | 2/1980 | United Kingdom . | |
| WO84/00642 | 2/1984 | WIPO . | |

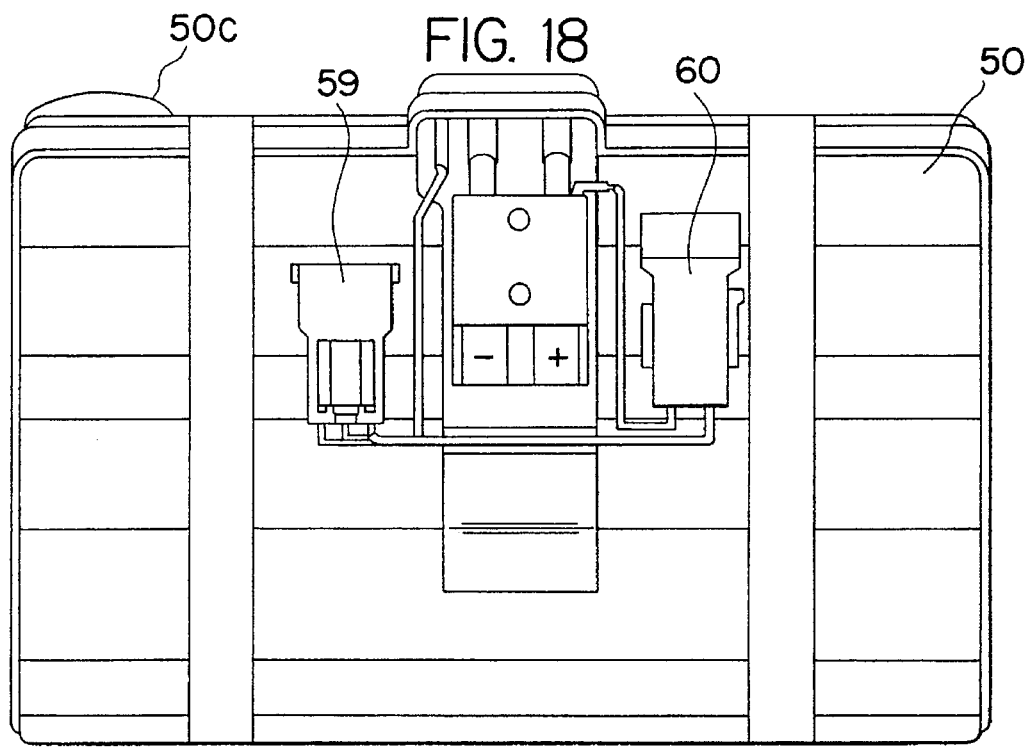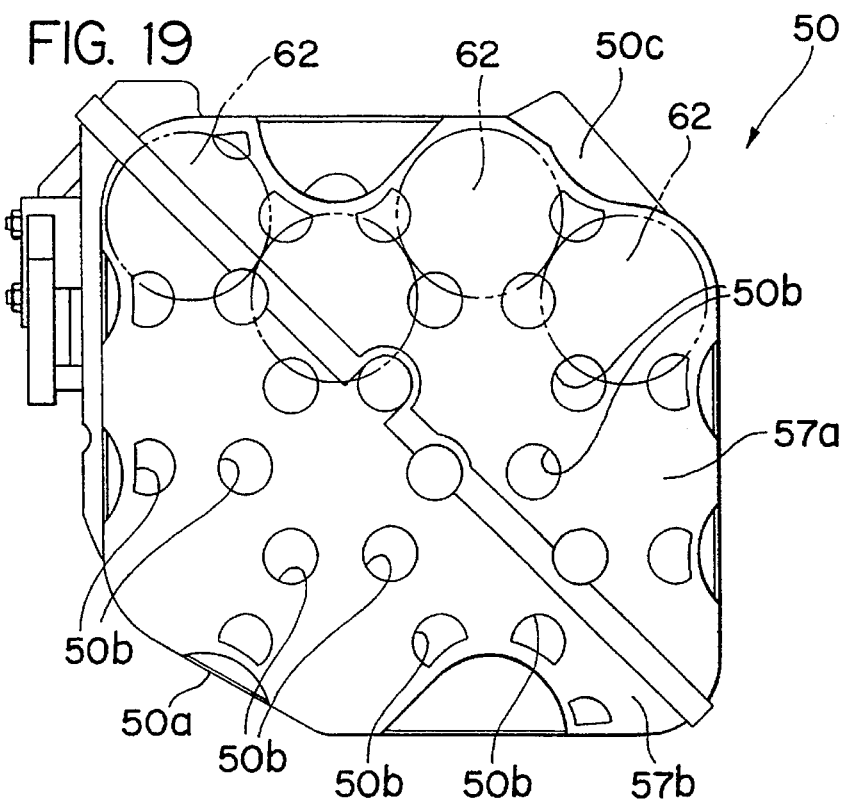

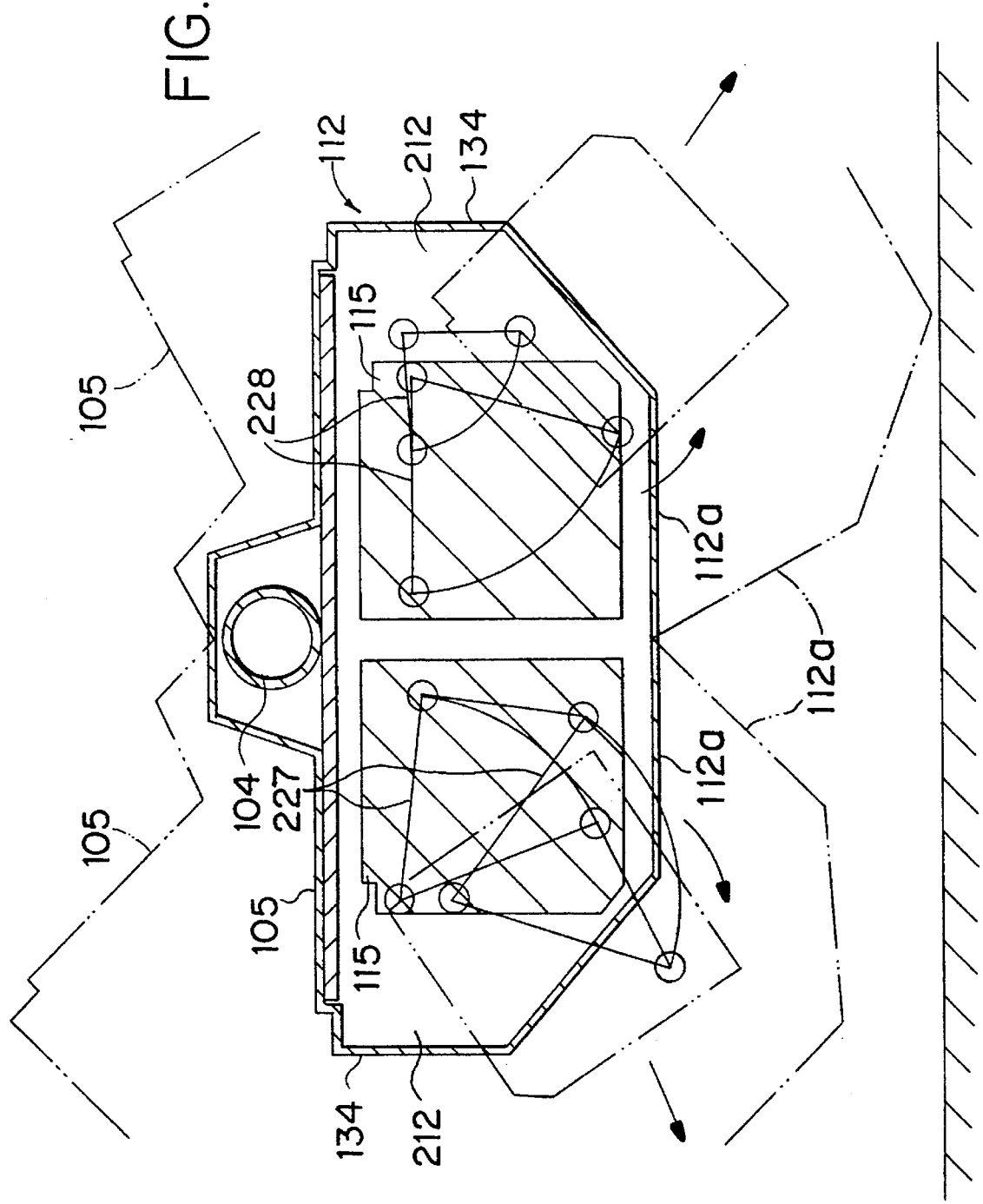

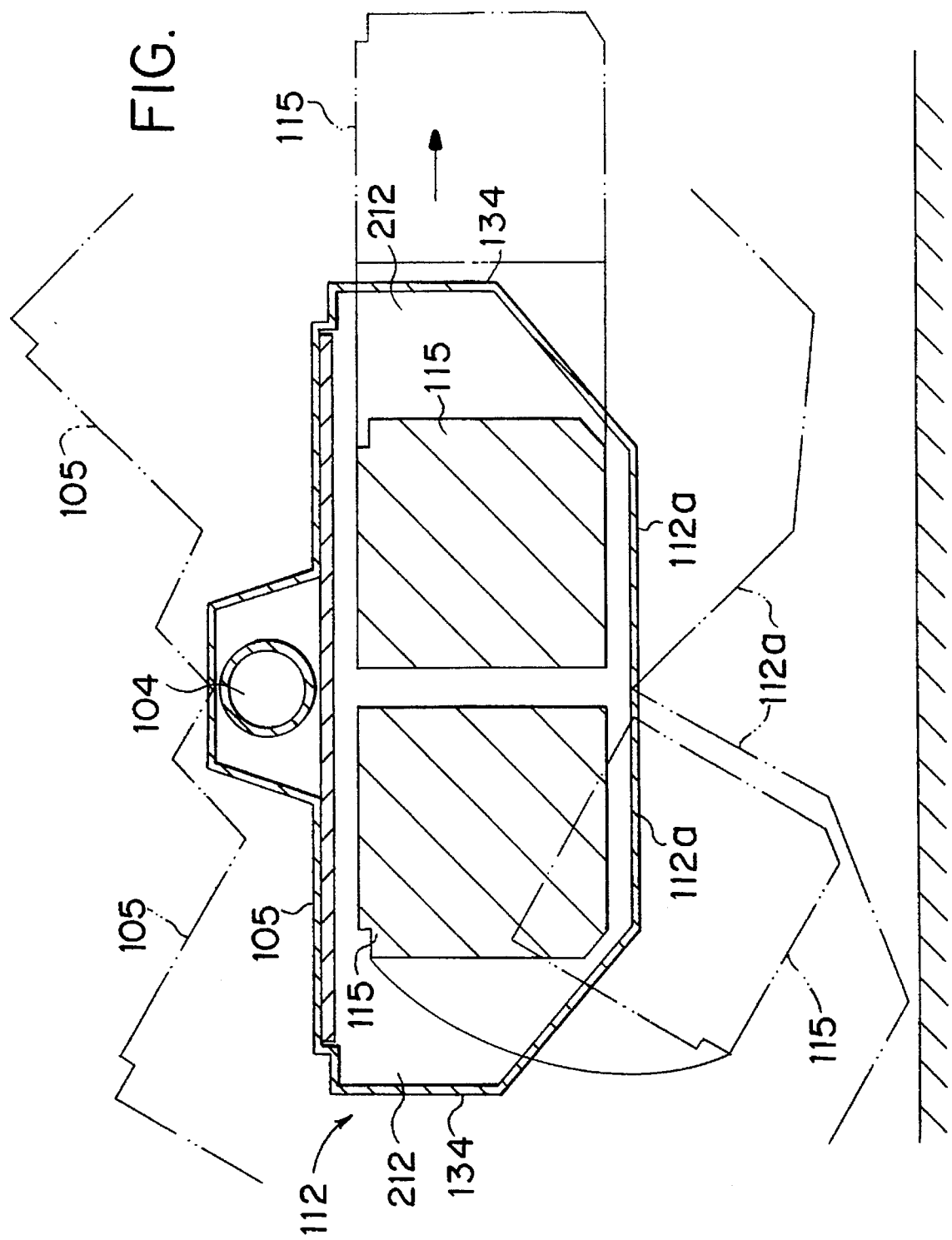

ELECTRIC MOTOR VEHICLE AND BATTERY UNIT FOR ELECTRIC MOTOR VEHICLE

This application is a continuation of application Ser. No. 08/453,901 filed on May 30, 1995, now abandoned, which is a Divisional of Ser. No. 08/371,891 filed on Jan. 12, 1995, now U.S. Pat. No. 5,477,936, which is a Continuation-In-Part of Ser. No. 07/956,066 filed on Oct. 2, 1992, now abandoned.

BACKGROUND OF THE INVENTION

1. Field of the Invention

This invention relates to an electric motor vehicle and a battery unit therefor, and more particularly to a battery unit for a straddling type electric motor vehicle such as an electric motor scooter or the like. The widthwise dimensions of the battery permit a large bank angle of the electric motor vehicle.

2. Description of Background Art

Electric motor vehicles are disclosed, for example, in Japanese Laid-Open Patent Application H3-243484 wherein a straddling type electric motor vehicle is set forth. In this prior art electric motor vehicle, a battery is mounted beneath a line drawn through the axes of the front and rear wheels, thereby to lower the center of gravity of the vehicle as a whole. The vehicle is also provided with a cooling air duct through which cooling air is sent to the electric motor.

However, in actual applications, the above-mentioned prior art electric motor vehicle needs to mount a box-shaped battery in a lower position on the vehicle. This results in an objectionably large dimension in the battery width across the center line of the vehicle body and consequently restricting the bank angle when taking a "lean-with" or similar driving posture.

Where a battery is accommodated in a battery box as in the above-mentioned prior art electric motor vehicle, it is desirable to provide means for effectively cooling the battery in actual applications since it generates heat at the time of charging or discharging.

Japanese Patent Application H2-162242, a prior application, the inventor discloses an embodiment, wherein a scooter type vehicle body includes a step floor, supporting a battery by means of a floor frame extended in the longitudinal direction along the lower side of the step floor. The battery is used as a power source for driving a power unit which is pivotally supported on a rear portion of the floor frame and which includes a combination of an electric motor and a belt type transmission.

Further, the above-described prior art electric motor vehicle needs a filter for removing dust, especially conductive dust which might be entrained on cooling air flows through the cooling air duct. This filter acts as a resistance to the flow of cooling air, barring improvements in cooling effect.

SUMMARY AND OBJECTS OF THE INVENTION

It is an object of the present invention to provide an electric motor vehicle which permits reduction of the width of the lower side of the battery, and which is capable of cooling the battery effectively and removing magnetic dusts from cooling air for the electric motor without resorting to a filter.

An electric motor vehicle includes a battery unit mounted on the vehicle body to supply current to the electric motor. The battery unit is formed in an elongated shape in outer configuration and located under the vehicle body with the lengthy side of the battery unit disposed in the longitudinal direction of the vehicle body.

In the electric motor vehicle, an arrangement may be employed in which the battery unit includes battery assemblies each consisting of a bundle of a plurality of batteries of an elongated shape, or in which the battery unit is formed in a profile having lower edges of the opposite lateral sides thereof truncated obliquely to have a smaller width across the bottom side than across the top side thereof. In the alternative, the vehicle body includes a front vehicle body for supporting a front wheel, a rear vehicle body for supporting a rear wheel, and an intermediate vehicle body interconnecting the front and rear vehicle bodies. The battery unit is suspended under the intermediate vehicle body, providing a foot rest on the upper side of the intermediate vehicle body.

The battery unit includes battery assemblies each having a plural number of elongated batteries bundled together to extend in the longitudinal direction of the motor vehicle and in a small gap relationship with adjacent batteries. The battery assemblies are accommodated in a battery box having ventilation or exhausting holes formed in a front portion for introduction or exhaustion of air at positions corresponding to the gap spaces between the individual batteries. An air exhaust or introduction hole is formed at least in a side or rear portion of the battery box.

A hollow pipe constitutes a body frame of a straddling type electric motor vehicle, communicating the air exhaust or introduction hole with the pipe frame to exhaust or introduce air therethrough, or providing an air exhauster connected to the air exhaust or introduction hole for forcibly exhausting air from the battery case. In the case of a straddling type electric motor vehicle with a cowled frame, there may be employed a modified arrangement in which the discharge port of the air exhauster is opened into a space which is surrounded by the cowl.

The battery unit may be composed of a couple of battery assemblies having the electrodes thereof connected to a single plate-like conductor member and being positioned end to end in spaced positions in the longitudinal direction within the battery box upon folding the plate-like conductor member. A spacer may be interposed between opposing surfaces of the folded plate-like conductor member.

The electric motor vehicle is operated on the power of an electric motor, and provided with a cooling air duct for conducting the flow of cooling air toward the electric motor and a magnet located on an inner wall surface of the cooling air duct.

The battery unit is formed into an elongated shape extending in the longitudinal direction of the vehicle, so that there can be obtained a great degree of freedom with respect to the widthwise profile of the battery unit, namely, with respect to the widthwise dimensions of the battery unit. Thus, a large bank angle may be obtained without inviting increases in vehicle body size when applied to a straddling type electric motor vehicle.

The battery unit is composed of battery assemblies, each including a bundle of a plurality of elongated batteries, giving a great degree of freedom in deciding the profile of the battery unit. Further, in the electric motor vehicle, the lower edge portions of the opposite lateral sides of the battery unit are truncated to ensure a greater bank angle when applied to a straddling type electric motor vehicle. Further, the arrangement of suspending the battery unit on the lower side of an intermediate vehicle body portion, which interconnects front and rear vehicle body portions, permits a great degree of freedom in the battery layout, as well as facilitated adjustments of the vehicle body weight into an appropriately balanced state in the longitudinal direction thereof.

The battery assemblies include individual batteries joined together in such a way as to form gap spaces between adjacent batteries. The batteries are placed in a battery box with ventilation or exhaust holes in a front portion thereof in positions in alignment with the gap spaces between the individual batteries to cool the battery unit effectively with the flow of air which is taken in either through the ventilation or exhaust holes or through an air exhaustor introduction port and exhausted through the ventilation or exhaust holes.

The battery unit is supported on a pipe-like vehicle body frame of a straddling type electric motor vehicle and arranged to discharge air through the pipe-like body frame, effectively utilizing the vehicle body frame to realize a reduction in size as a whole. An air exhauster is provided to discharge air forcibly, thereby cooling the battery effectively. When applied to a motor bicycle, air is discharged into a space under a cowl to prevent intrusion of rain or water without the necessity of providing a cover exclusively for this purpose.

A couple of battery assemblies are connected through a plate-like electrode, which is foldable to bring the two battery assemblies into axially aligned positions, so that a plural number of battery assemblies can be easily connected and mounted in closely spaced positions. In addition, the folded electrode plate has suitable flexibility to absorb dimensional errors of the battery box and/or battery assemblies.

Magnetic dust such as iron powder, entrained in the flow of cooling air to the electric motor, is retained by a magnet, so that it becomes possible to simplify the air filter and thus to minimize its resistance to the flow of cooling air. Thus, cooling air is supplied to the electric motor at a sufficient flow rate.

In an electric motor vehicle, it is natural to support a battery in a fixed state on a part of the floor frame to endure vibrations which take place while the vehicle is in motion. However, a battery which is fixed too securely is troublesome to load or unload at the time of replacement or at the time of maintenance and service. For this reason, the battery is desired to be mounted in a manner which permits facilitated loading or unloading on such occasions. It is an object of the present invention to satisfy such demands.

An open-topped battery case is supported on a floor frame. A battery is accommodated within the battery case. A fixing member extends longitudinally along the lower side of the step floor to hold the top side of the battery. Connector members are provided for connecting the fore and rear ends of the fixing member detachably to the battery case.

The battery is resiliently supported, on the bottom side thereof, through a resilient material attached to the battery case. On the top side thereof, the battery is supported through a resilient material attached to the fixing member.

The floor frame includes a single unitary member extended longitudinally along the center of the vehicle body. A battery case is supported on the upper or lower side of the floor frame to accommodate a battery therein. The battery casing is provided with an inlet/outlet opening at one lateral side thereof and in the sideward direction of the vehicle body.

The inlet/outlet opening may be opened or closed by a lid member.

The battery may be moved upward by the battery case simply by removing the step floor and then the two connector members at fore and rear end positions of the fixing member.

The battery, positioned in the battery case is in engagement with the fixing member on its top side, resiliently supported on its bottom side by the resilient material attached to the battery case and on its top side is supported by the resilient material attached to the fixing member.

The battery can be put into or out of the battery case from a lateral side of the vehicle body through the inlet/outlet opening in the battery case because no floor frame exists on the lateral side of the battery case.

The lid member is opened at the time of loading or unloading of the battery into or out of the battery case through the inlet/outlet opening. When the lid member is closed, the battery which is accommodated in the battery case can be retained longitudinally along the center of the vehicle body, and a battery case is supported on the upper or lower side of the floor frame to accommodate a battery therein. The batter casing is provided with an inlet/outlet opening at one lateral side thereof and in the sideward direction of the vehicle body. Therefore, the floor frame does not exist laterally on the outer side of the battery case, so that a battery can be loaded or unloaded through the inlet/outlet opening at one side of the battery case. It follows that even a battery of large size and heavy weight can be loaded or unloaded quite easily.

The inlet/outlet opening is opened or closed by a lid member, so that, after opening the lid member, a battery can be loaded or unloaded from or in a sideward direction of the vehicle body. Upon closing the lid member, the battery can be stably retained in the battery case free of dislocations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 18 is a side view of a battery box constituting part of the battery unit;

FIG. 19 is a front view of the battery box;

FIG. 45 is a transverse sectional view of another embodiment of the present invention;

FIG. 46 is a transverse sectional view of another embodiment of the present invention.

DETAILED DESCRIPTION OF THE PREFERRED EMBODIMENTS

FIGS. 1 through 24 illustrate an embodiment of the invention as applied to a straddling type electric motor vehicle, of which FIGS. 1 to 4 illustrate views of the straddling type electric motor vehicle which is an electric motored scooter, FIGS. 5 to 9 illustrate vehicle body frames of the electric motored scooter, and FIGS. 10 to 24 illustrate other major components of the vehicle.

Figure 11:
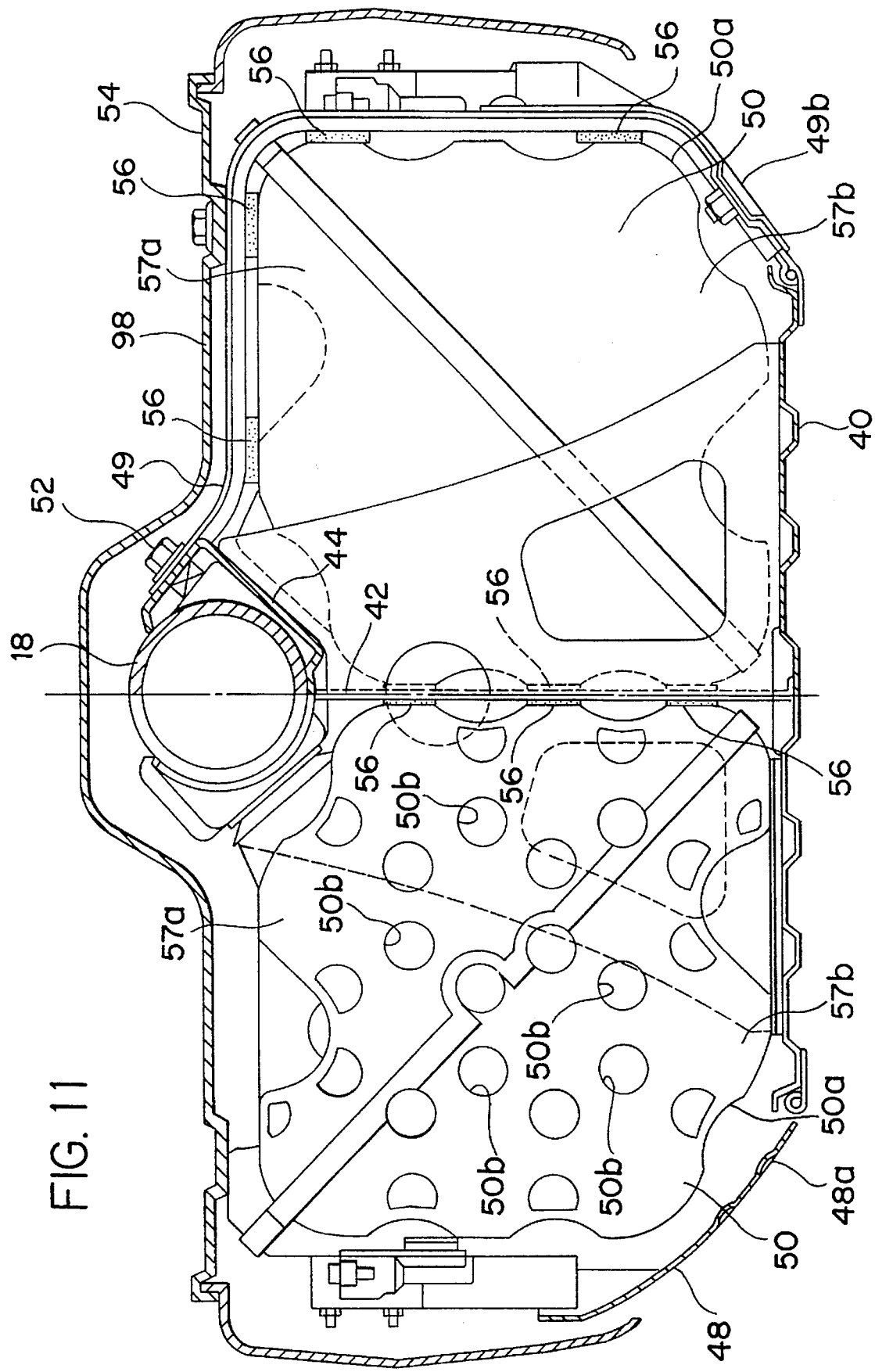
FIG. 11 is a sectional view of a battery unit and associated component parts of the electric motor scooter.

In various figures, a vehicle body frame 11 includes a head pipe or front frame 12 connected to a rear frame 13 through an intermediate frame 14. As is well known in the art, a front wheel 16F is supported on a front fork 15 of the head pipe 12 steerably in association with a steering handle 17. A front cover 55, a center cover 54 and a rear cover 27 are provided and affixed to the vehicle body frame 11. The center cover 54 is formed with a step floor 98, as illustrated in FIG. 11, on an upper side, so that the driver can place his or her feet thereon. A seat 28 is mounted on top of the rear cover 27, and a tail lamp 22 and a number plate mount portion 23 are provided on tail portions of the rear cover 27. In the drawings, for the sake of simplicity of illustration, the covers 27, 54 and 55 are shown as one unitary body without indicating their boundaries.

Figure 1:
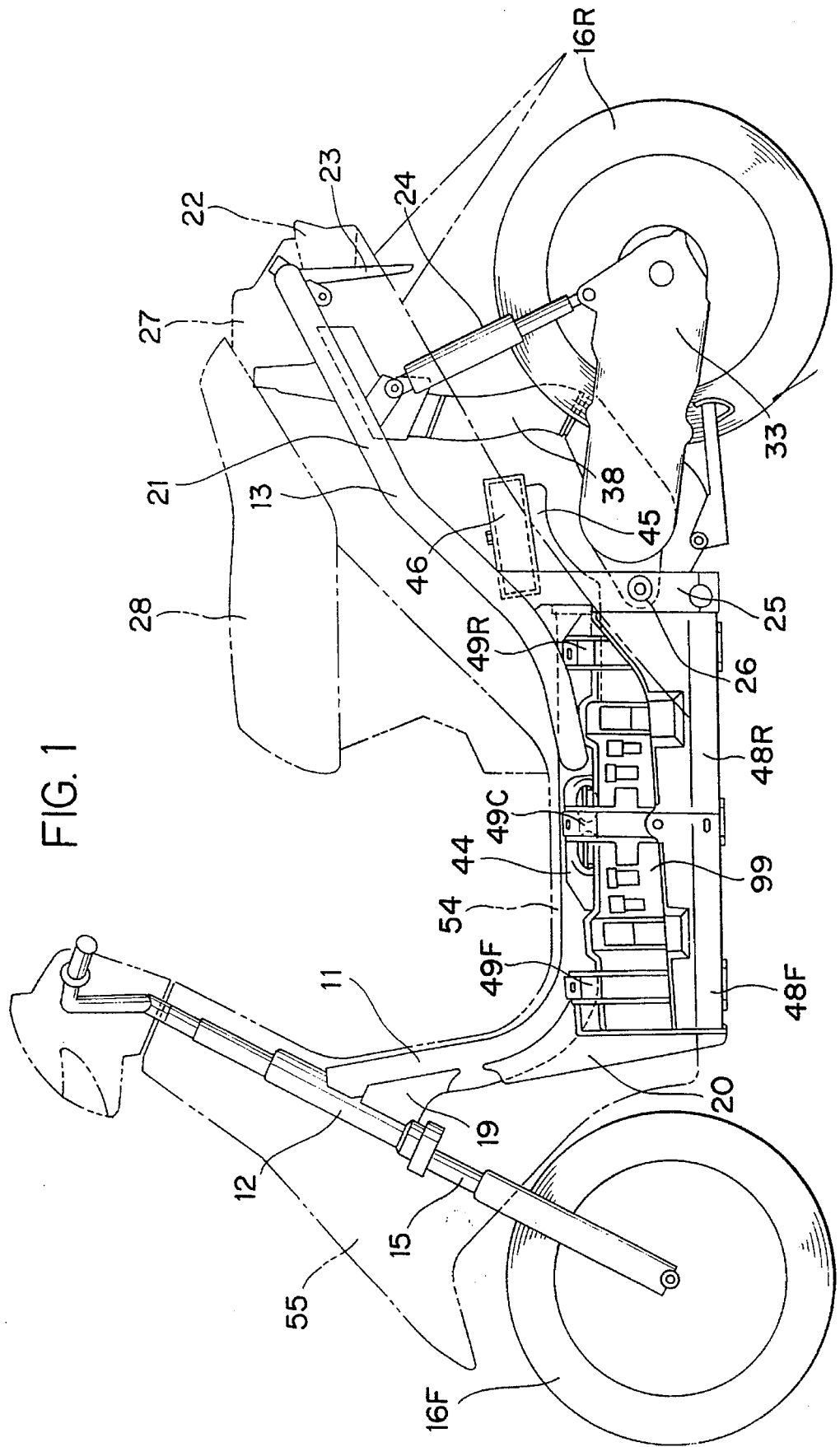
FIG. 1 is a side view of an electric motor scooter shown as an example of an electric motor vehicle for application of the present invention.
Figure 2:
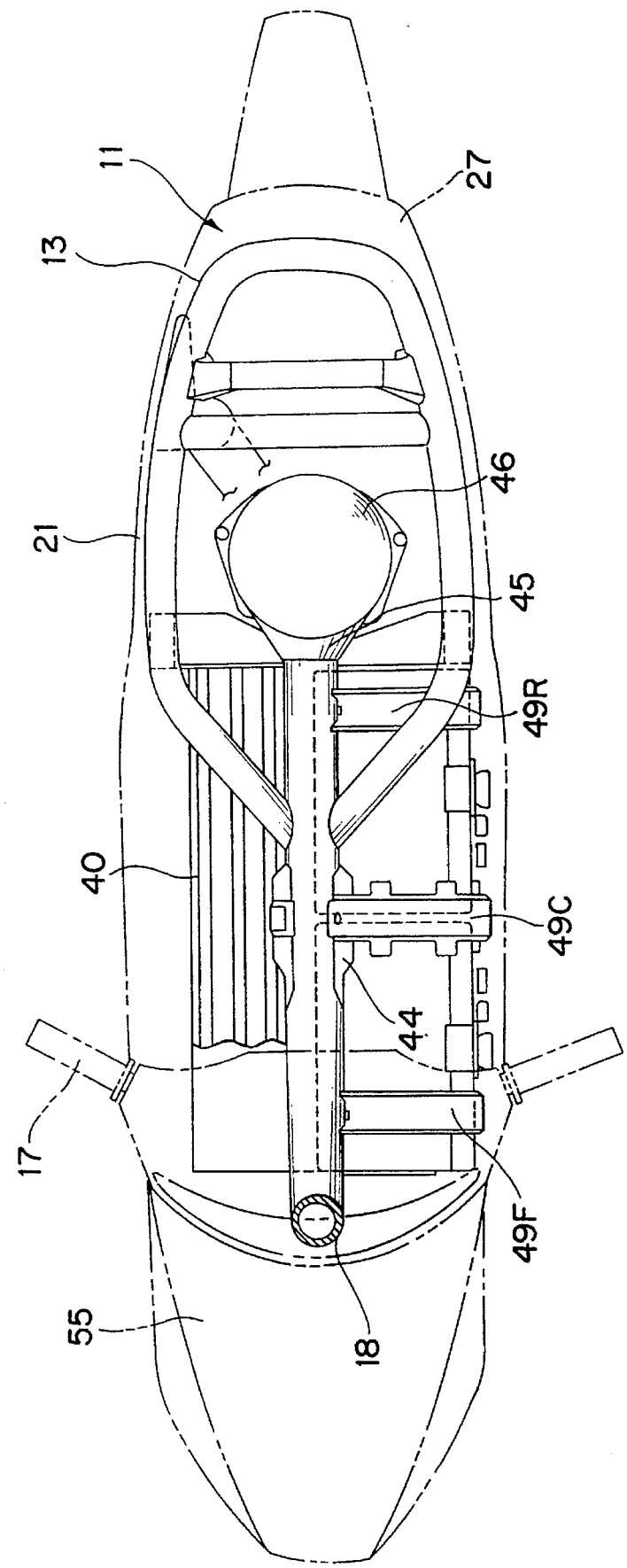
FIG. 2 is a partly cutaway plan view of the electric motor scooter.
Figure 5:
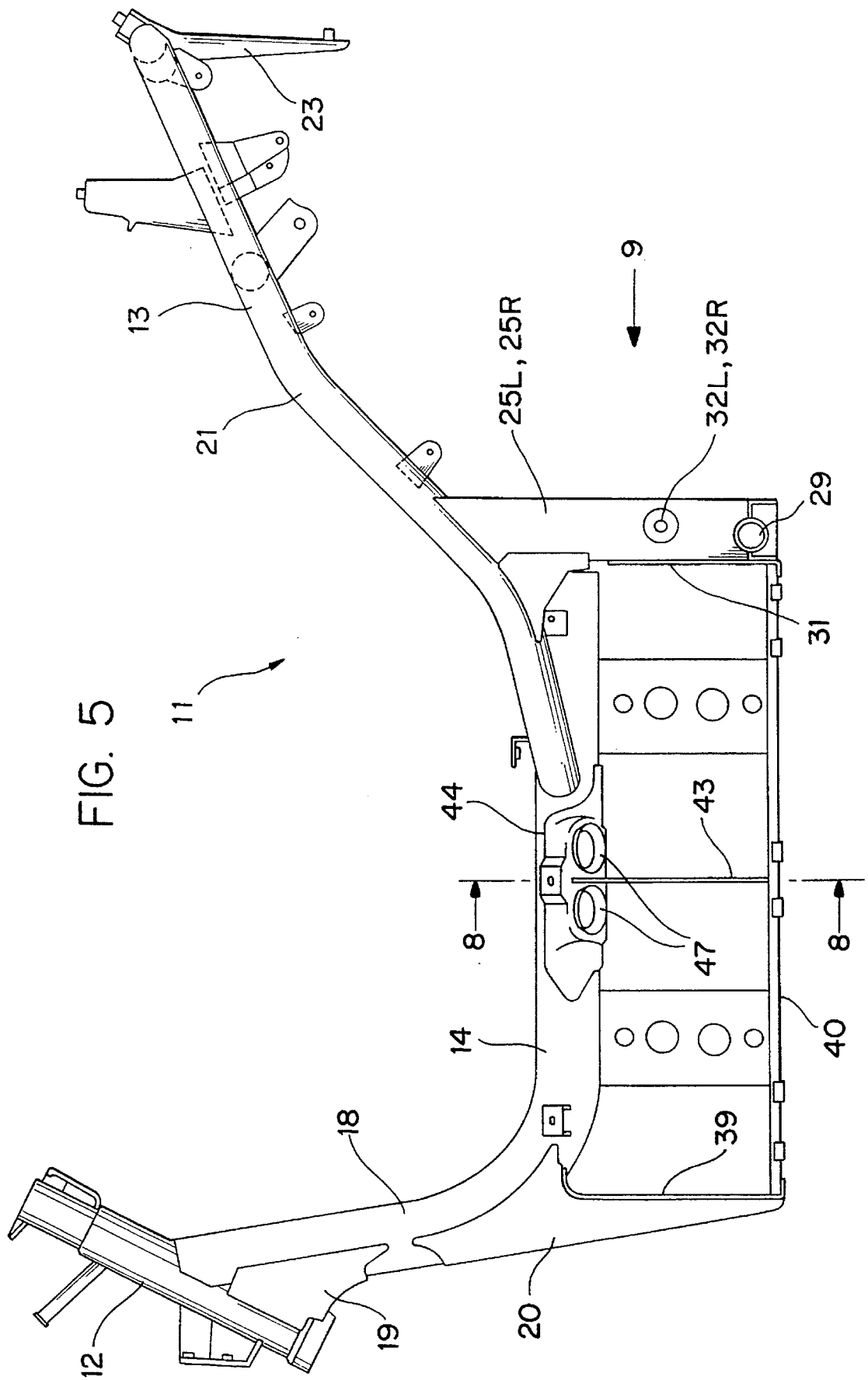
FIG. 5 is a side view of vehicle body frames of the electric motor scooter.
Figure 6:
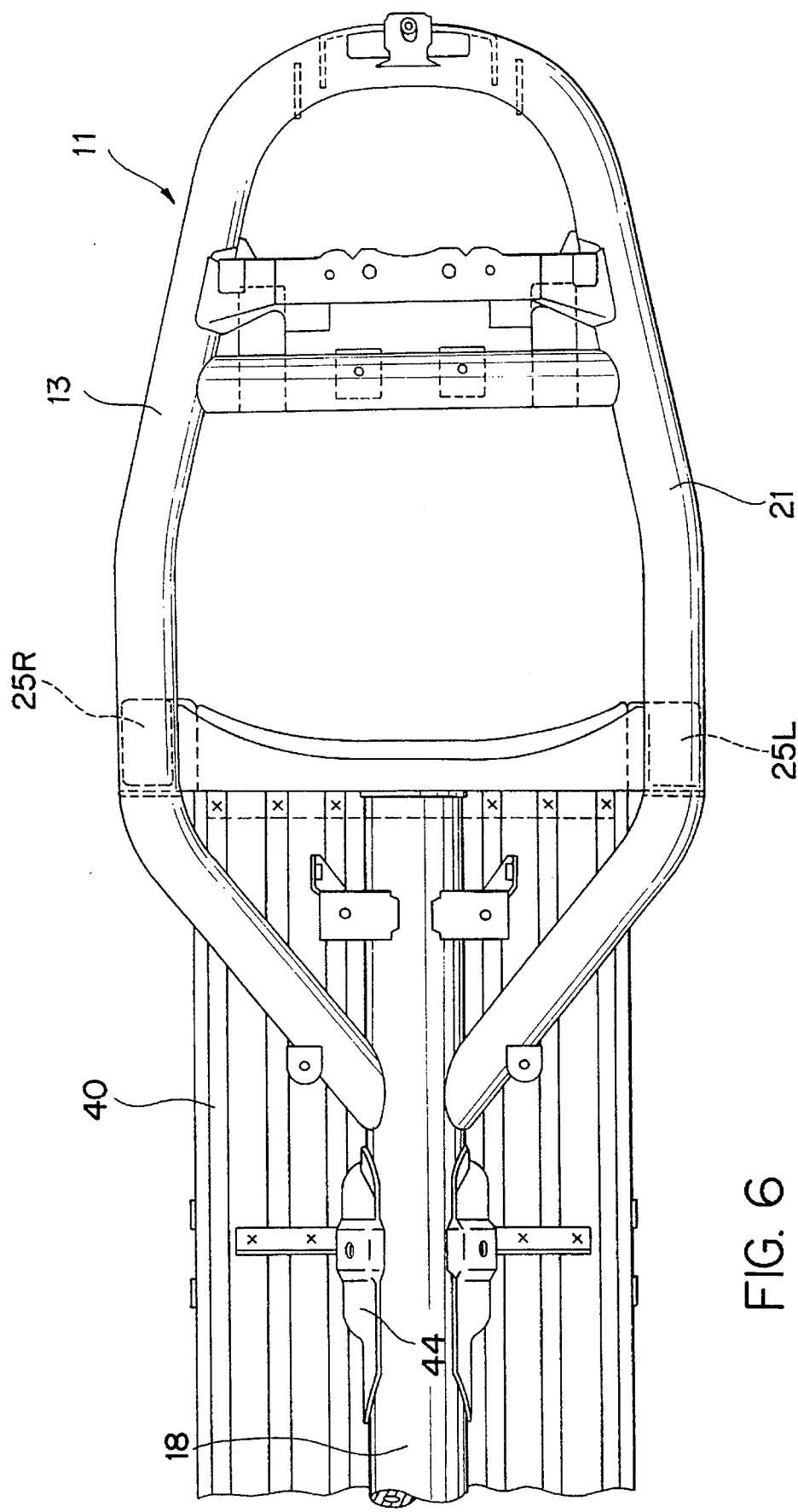
FIG. 6 is a plan view of the vehicle body frames.

The rear frame 13 is provided with a rear tube 21 which is formed by bending a pipe substantially into a U-shape. As shown in FIGS. 2, 5 and 6, the rear tube 21 is extended obliquely upwardly toward its folded rear end of the U-shape, and has both of its fore ends securely fixed to the intermediate frame 14 by welding or other suitable means. The rear tube 21 is provided with a cushion 24 between its intermediate portion and a power swing unit, which will be described later, and wrapped under the rear cover 27 on its top and opposite lateral sides.

Figure 9:
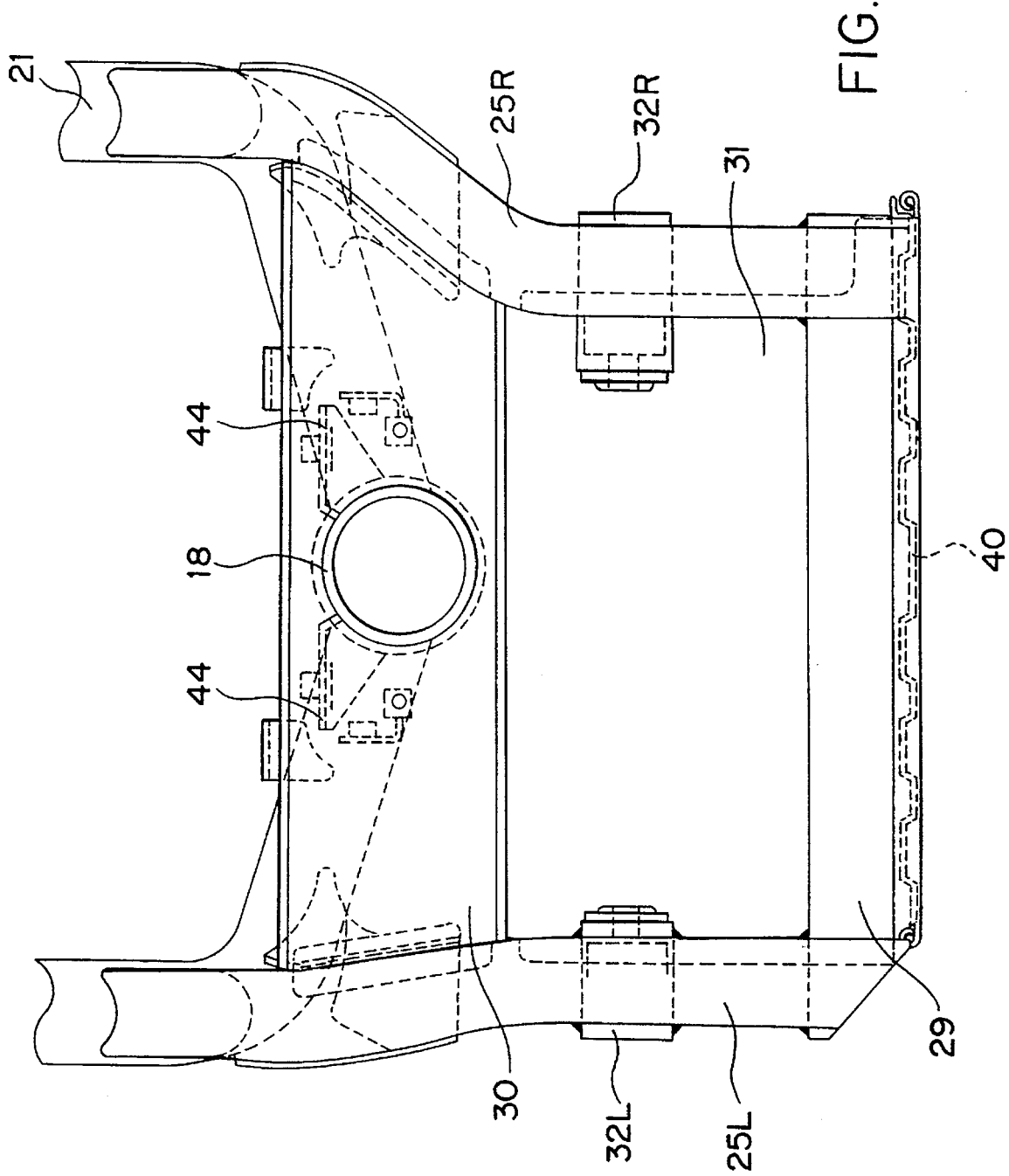
FIG. 9 is a view taken in the direction of arrow 9 in FIG. 5.

Further, as shown particularly in FIG. 9, the rear tube 21 includes mounting pipes 25R and 25L (hereinafter indicated by the reference numeral alone without the suffix letter whenever necessary) suspended on its opposite sides in a front portion each at a position substantially in alignment with the rear end of a center tube 18 which will be described later. The mounting pipes 25L and 25R are securely welded to the rear tube 21 at the respective upper ends, and a cross pipe 29 is securely bridged between their lower ends.

Further, a cross plate 30 is securely bridged between upper portions of the mounting pipes 25 by welding or other suitable means, along with a rear plate 31 which is positioned under the cross plate 30. A pivot shaft 26 is bridged behind the rear plate 31 through collars 32L and 32R.

The cross plate 30 has its upper and lower edges folded back substantially at right angles to present a U-shape in section, and is securely welded to the mounting pipes 25 at its opposite ends. Extending rearwardly through the cross plate 30 is the rear end of a center tube 18 which will be described hereinafter, the rear end of the center tube 18 is opened to a rear duct 45 which is securely fixed on the rear surface of the cross plate 30. An air exhauster 46 is provided in an upper portion of the rear duct 45. More specifically, the air exhauster 46 is located within the rear cover 27 and has its air discharge or inlet port opened within the rear cover 27. The air exhauster 46 is provided with a fan drive motor, which is connected to a controller as will be described later, thereby to drive a fan for forcibly discharging air, cooling air, which will be described hereinafter.

The rear plate 31 is welded to the mounting pipes 25 at its opposite side edges, and also welded to the lower edge of the cross plate 30 at its upper edge, closing the opening between the two mounting plates 25 in cooperation with the cross plate 30. The rear plate 31 has its lower edge bent substantially at right angles in the forward direction. An under plate is mounted between the folded lower edge of the rear plate 31 and the lower edge of the front plate. A power swing unit 33 is rockably supported on the pivot shaft 26, and a rear wheel 16R is supported on the rear end of the power swing unit 33.

Figure 10:
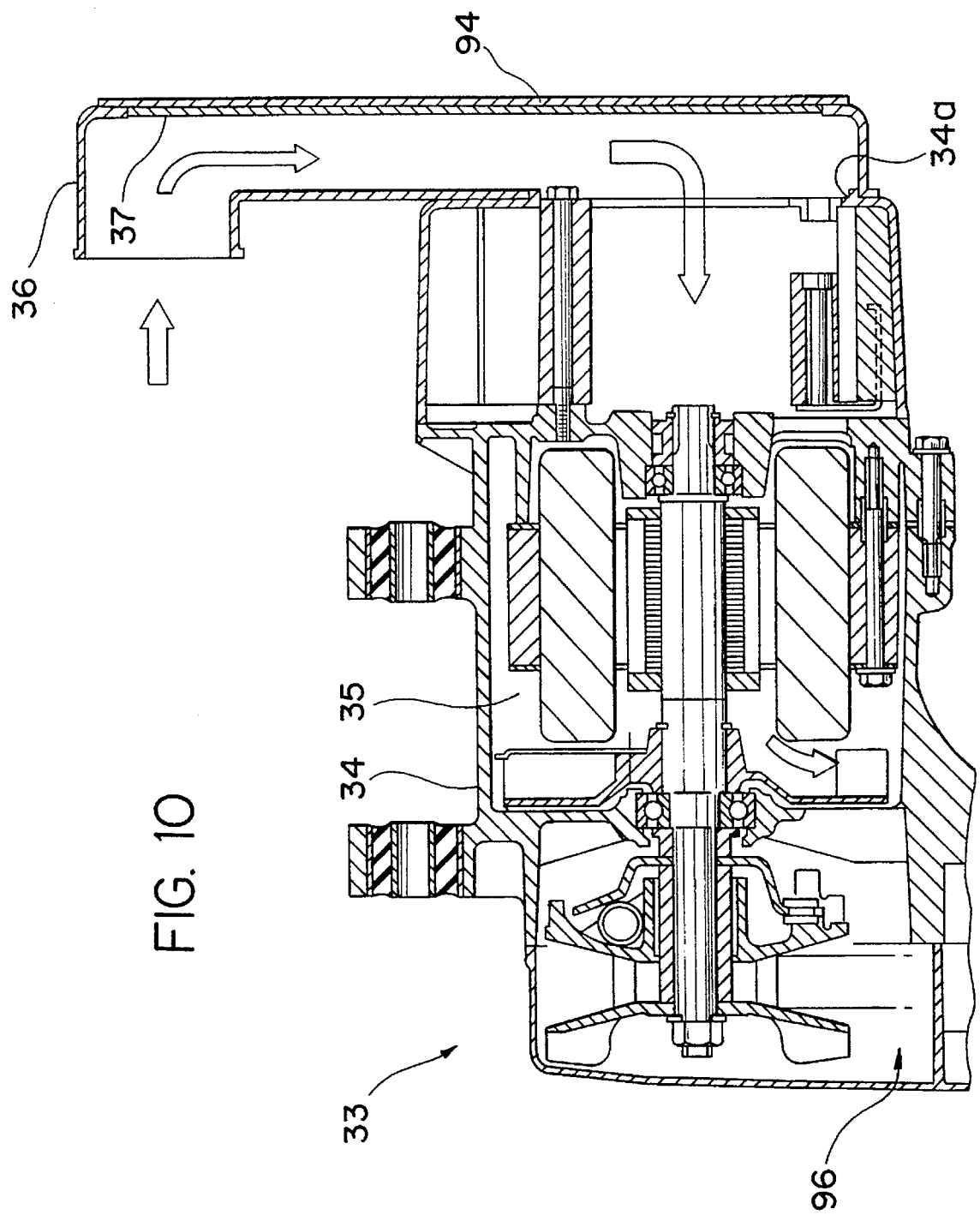
FIG. 10 is an enlarged sectional view of an electric motor and associated component parts of the electric motor scooter.

As shown in FIG. 10, the power swing unit 33 is provided with an electric motor 35 which is accommodated within a unit case 34 together with a belt type stepless transmission 96. The unit case 34 is provided with an air induction opening 34a which is opened toward the electric motor 35, and an air discharge opening which is formed in its rear portion although not shown. One end of the duct 36 is connected to the air induction opening 34a. The other end of the duct 36 extends substantially upwardly and is connected to a flexible duct tube 38, see FIG. 1. A magnet 37 is bonded on an inner wall surface of the duct. The duct tube 38 extends upward within the rear cover 27 and is opened at its upper end which is fixed by a fixation member within the rear cover 27. Duct tube 38 is set in position such that its opened position is located above the above-mentioned discharge or inlet port of the air exhauster 46.

The duct 36 is provided with an opening in its side wall, and this side opening is normally closed by a closure plate 94 with the magnet 37 bonded thereto. The magnet 37 is exposed to air flows in the duct 36 to function as a partition wall of the air passage. The closure plate 94 is detachably mounted in position by the use of screws or the like. The magnet 37 retains magnetic dust like iron powder which is entrained in the flow of air in the duct 36. The dust caught on the magnet 37 can be cleaned off after detaching the closure plate 94. The construction of the swing unit 33 is described in detail in the afore-mentioned patent publication, so that its description is omitted here.

The intermediate frame 14 is provided with a center tube 18 in the form of a hollow pipe, which is bent upwardly toward its front end which is securely fixed to the head pipe 12 by welding or other suitable means. The center tube 18 is reinforced with a gusset 19 at its fixed fore end, and, as shown particularly in FIG. 6, has the fore ends of the rear tube 21 of the rear frame 13 connected to its rear portions by welding or other suitable means. The center tube 18 is formed with communication ports 18a substantially at a center position in the longitudinal direction, FIG. 12, and a bracket 44 is fixedly welded thereto in such a manner as to cover the communication ports 18a. The rear end of the center tube extends through the cross plate 30 and communicates with the rear duct 45.

Figure 8:
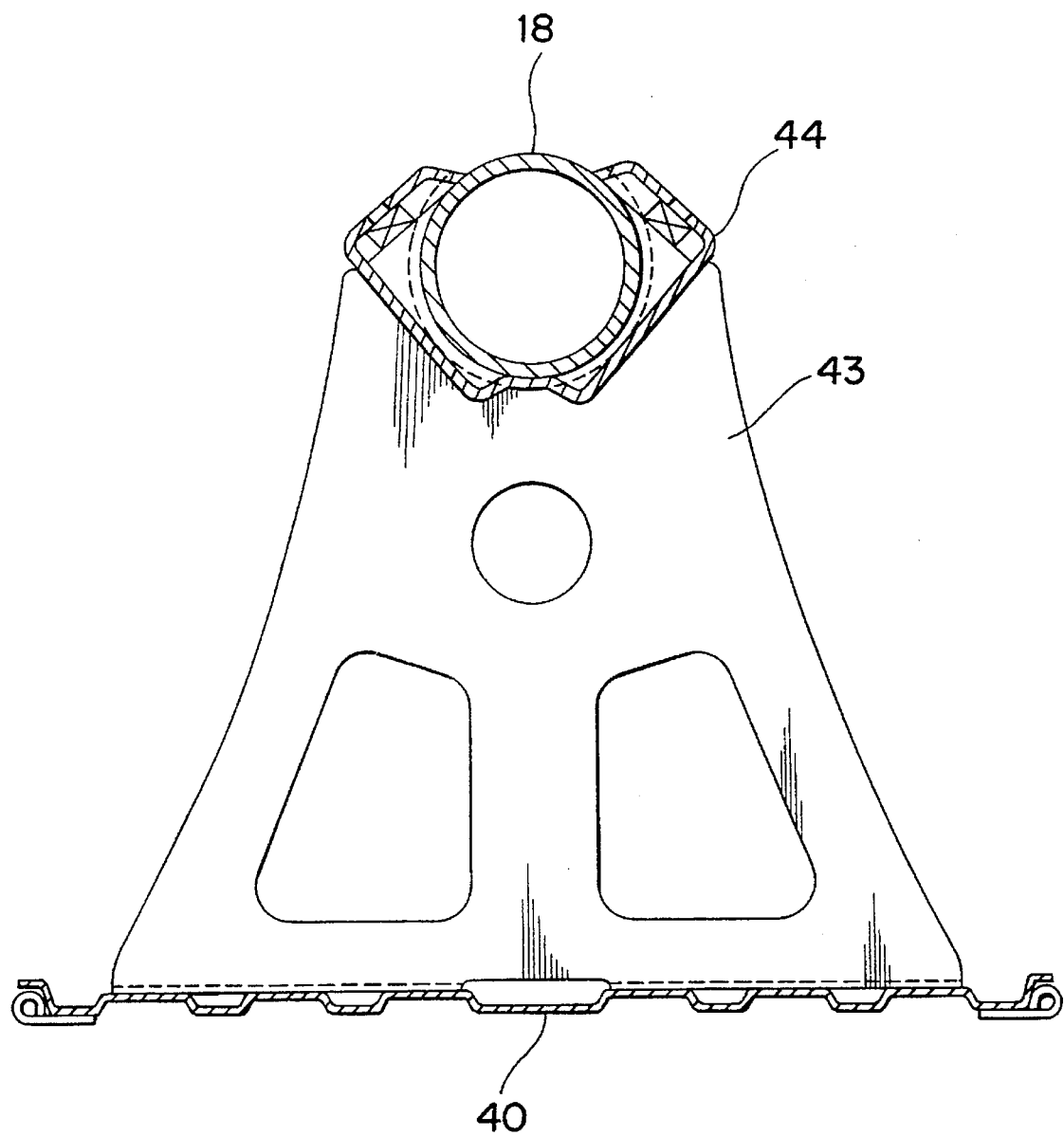
FIG. 8 is a sectional view taken on line 8—8 of FIG. 5.
Figure 12:
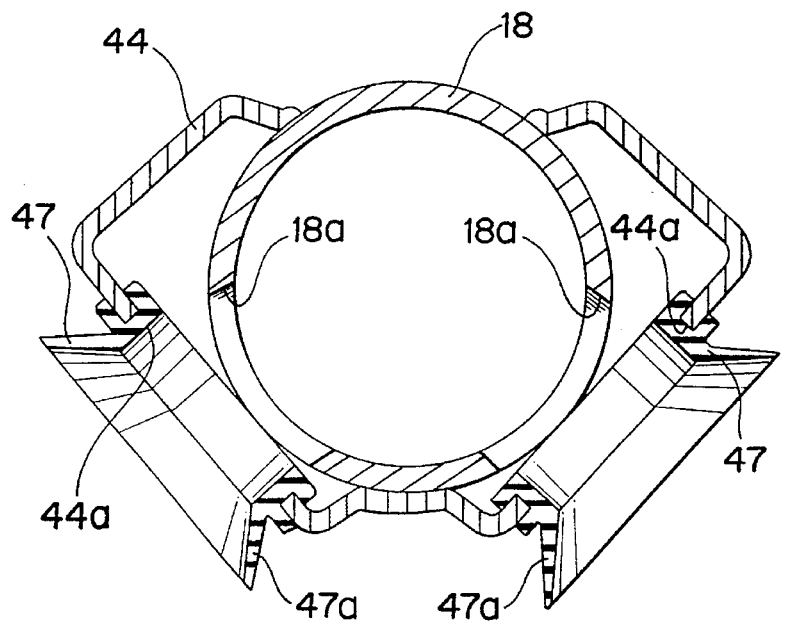
FIG. 12 is a fragmentary sectional view of an enlarged scale of a vehicle body frame of the electric motor scooter.
Figure 13A:
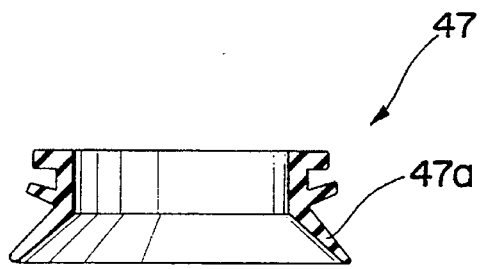
FIGS. 13(a) and 13(b) are a sectional view and a plan view of major component parts employed for the electric motor scooter.
Figure 13B:
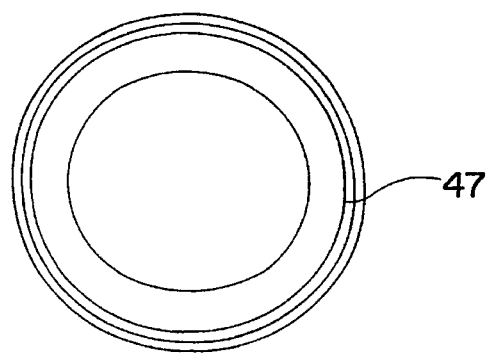

As illustrated in FIGS. 5, 8 and 12, the bracket 44 is formed with four air exhaust or introduction holes 44a in total, namely, two air exhaust or introduction holes 44a in longitudinally spaced position on each lateral side thereof. Stem portion 44b are also provided on each lateral side. The bracket 44 has a hollow sucking disc member 47 fitted in each air exhaust or introduction hole 44a. A bolt is threadedly engageable in each stem portion 44b for fixing a fastening belt as will be described hereinafter. As shown in FIG. 13, the sucking disc member 47 is formed of a resilient material like rubber and fitted on the bracket 44 with a conically diverging sucking disc 47a facing outwardly. The sucking disc 47a of each sucking disc member 47 is tightly fitted on marginal edges of an air exhaust or introduction hole of the battery box to communicate the same with the inner space of the center tube 18, namely, with the air exhauster 46 in a hermetically sealed state.

Figure 7:
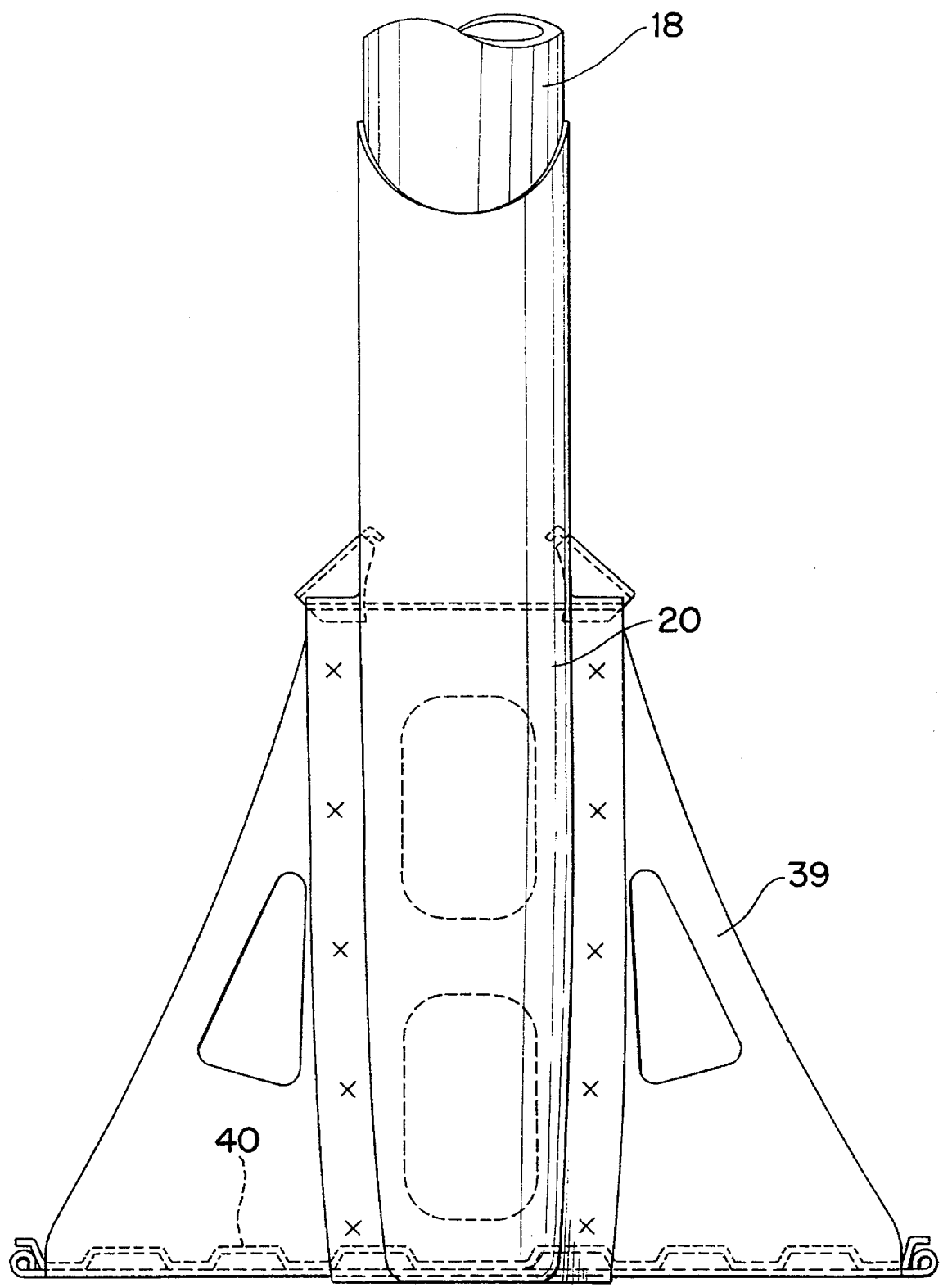
FIG. 7 is a fragmentary front view on an enlarged scale of the vehicle body frames.

Further, as shown in FIGS. 5 and 7, a downwardly pendant bracket 20 is securely welded to a front portion of the center tube 18 at a position below the gusset 19, and a front plate 39 is securely fixed to the bracket 20 by spot welding or the like. The front plate 39 is formed substantially in a downwardly diverging triangular shape with the lower edge thereof folded backward. An under plate 40 is bridged between the folded lower edge of the front plate 39 and the aforementioned folded lower edge of the rear plate 31.

The under plate 40 includes a corrugated iron or steel sheet or the like, having three fastening belts 49F, 49C and 49R located in three spaced positions at each lateral side edge, and a couple of lids 48F and 48R (hereinafter indicated by the reference numeral alone without the suffix letter whenever necessary) which are movable between open and closed positions. Provided on the under plate 40 are a couple of partition plates 42F and 42R (hereinafter indicated by the reference numeral alone without the suffix letter whenever necessary) which are suspended from the center tube 18 in longitudinally spaced positions along the center of the under plate 40, and a center plate 43 which is also suspended from the center tube 18 at a longitudinal center position, see FIG. 8.

As seen in FIGS. 14 to 17, each fastening belt 49 is pivotally connected at its lower end to the outer side edge of the under plate 40 through a hinge, and formed with a mounting hole 49a at its upper end. As clear from FIGS. 3 and 11, these fastening belts 49 are each formed substantially in a U-shape on the inner side in a transversely sectioned profile, and provided with an upwardly inclined oblique portion 49b at the lower corner in a chamfered fashion.

At the time of mounting the battery box 50 which will be described hereinafter, the front fastening belt 49F is fixed by threading a bolt 52, in its mounting hole 49a, into a stopper member 51 which is fixed on the center tube 18. Similarly, the center fastening belt 49C is fixed by threading a bolt 52, in its mounting hole 49a, into the stem portion 44b of the bracket 44, and the rear fastening belt 49R is fixed to the center tube 18 through a stay 92. Thus, the battery box on the under plate 40 is fixedly held thereon by the fastening belts 49. The stay 92 is fixed at one end to the center tube 18 by a bolt 52, and fixed at the other end to the end of the fastening belt 49 by a bolt 52.

Rubber strips 61 are bonded on the inner surface of each fastening belt 49 for providing a cushioning effect on the contacting battery box 50.

Figure 3:
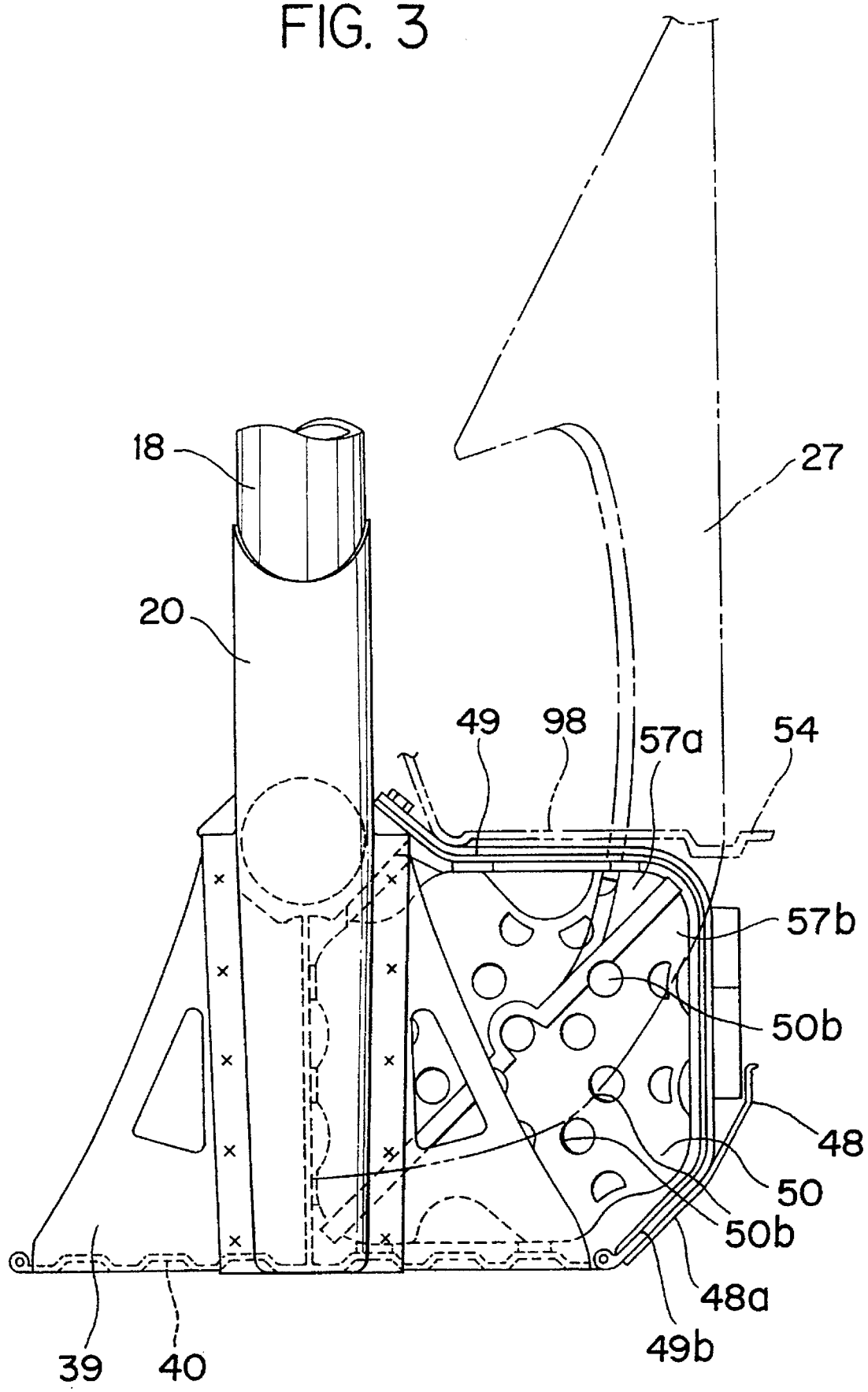
FIG. 3 is a fragmentary front view of an enlarged scale of the electric motor scooter.
Figure 4:
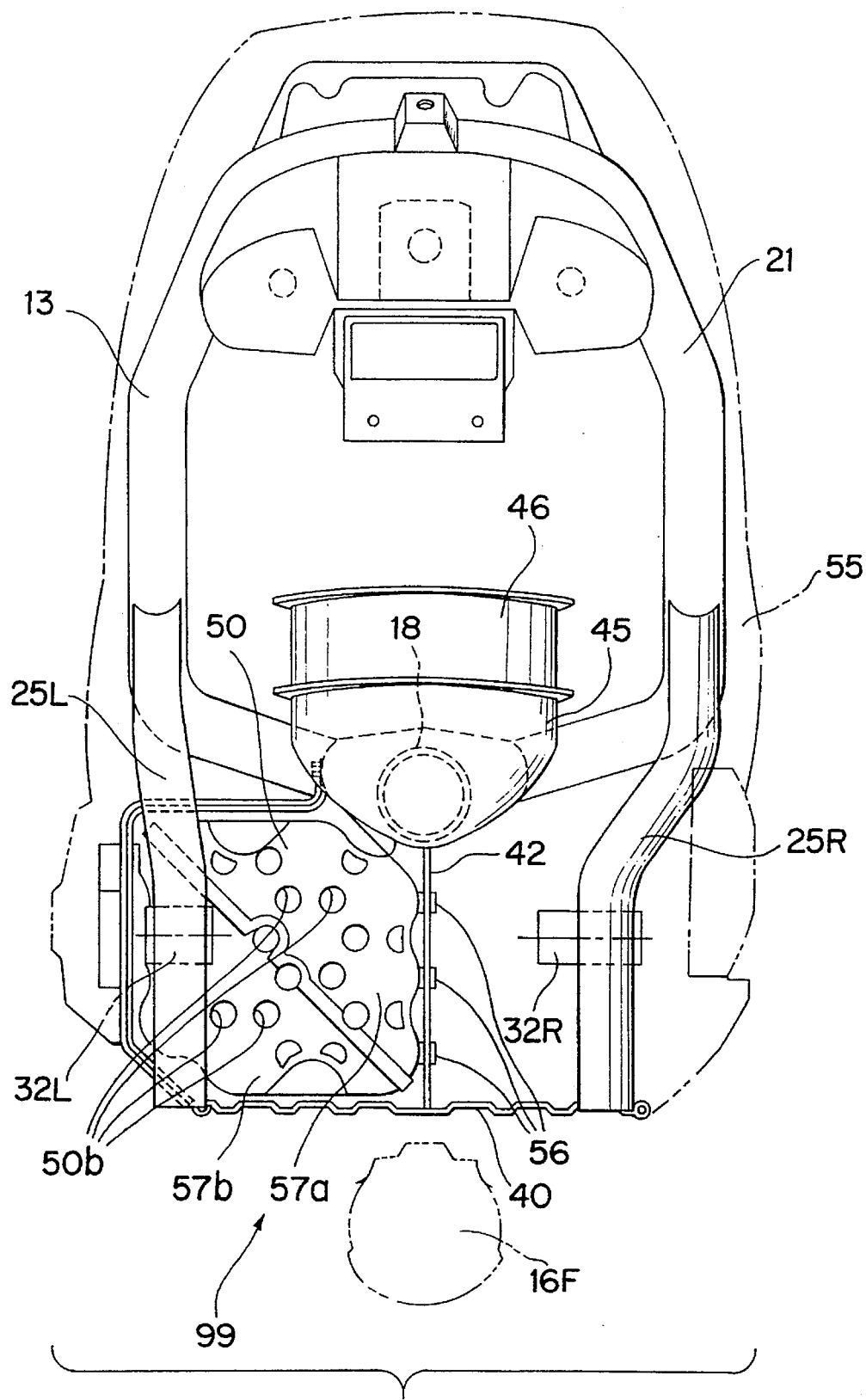
FIG. 4 is a rear view of the electric motor scooter.

The lids 48 are each positioned outwardly of the fastening belts 49 in the transverse direction of the vehicle body and pivotally supported on the under plate 40 by means of hinges provided at the lower edge thereof. Further, in adjacently located side edge portions, the lids 48 are provided with mounting holes 48b in vertically spaced positions. As shown in FIGS. 3 and 11, the lids 48 are each formed substantially in a U-shape on the inner side in a transversely sectioned profile, and provided with an oblique portion 48a at the lower corner thereof. Further, as shown in FIGS. 14 to 17, at the time of mounting the battery box 50, the lids 48 are also fixed by screws into the center fastening belt 49 through the mounting holes 48b.

The partition plates 42 each extend parallel with a vertical plane in the longitudinal direction, and are welded to the center tube 18 at the upper end and securely fixed on the surface of the under plate 40 at the lower end similarly by welding or other suitable means. The center plate 43 extends parallel with a vertical plane in the transverse direction of the vehicle body, and is welded to the center tube 18 at the upper end and fixed on the top surface of the under plate 40 at the lower end also by welding. The partition plates 42 and center plate 43 define four sections on the under plate 40, receiving a battery box 50 in each section to constitute a battery unit 99.

Rubber strips 56 are bonded on the partition plates 42, and rubber strips 91 are laid on the four sections of the under plate 40. The rubber strips 46 and 91 are interposed to cushion impacts which would otherwise be applied to the battery box 50.

As shown particularly in FIGS. 18 and 19, the battery boxes 50 are arranged to accommodate a couple of battery assemblies 58 in front and rear positions, and each include inner and outer halves 57a and 57b of substantially triangular shape in front view, which are assembled together separably along a split plane inclined relative to a vertical line. Each battery box 50 is formed with an oblique portion 50a in conformity with the oblique portions 49b and 48a of the fastening belts 49 and lids 48, and with air exhaust or introduction ports 50c above the inner half 57a. A plural number of ventilation or exhaust holes 50b are formed in the front and rear walls of the casing halves 57a and 57b. The air exhaust or introduction ports 50c are formed in positions confronting the above-described sucking disc members 47, and their marginal edges are brought into intimate contact with the latter when placed on the under plate 40 to establish communication with the center tube 18. The ventilation or exhaust holes 50b are formed in positions corresponding to gap spaces 97, which exist between the individual batteries of the battery assembly 58 as will be described hereinafter, cooling air flows through the opposing gap spaces 97.

For connection to the corresponding battery assembly 58 each battery box 50 has a connector 59 mounted on an inner surface of the inner side wall in the transverse direction along with a fuse 60. The fuse 60 is connected electrically in series between the battery assembly 58 and the connector 59, while the connector 59 connects the coupled battery assembly 58 to a drive circuit. As described later, the battery assemblies 58 in the respective battery boxes 50 are connected in series with each other, see FIG. 24.

Each battery assembly 58 is composed of a plurality of elongated cylindrical batteries 62, twelve batteries in the particular embodiment shown, with electrodes at the opposite ends, which are bundled and bonded together by the use of an adhesive or the like in parallel relation with each other. With this battery assembly 58, gap spaces of substantially rhombic shape are formed between and along the adjacent batteries 62, the gap space 97 extending parallel in the longitudinal direction of the batteries 62, see FIGS. 21 to 23. The gap spaces 97 are respectively confronted by and communicated with the ventilation or exhaust holes 50b of the battery box 50, and at the same time communicated with the air exhaust or exhaust ports 50c.

Figure 22:
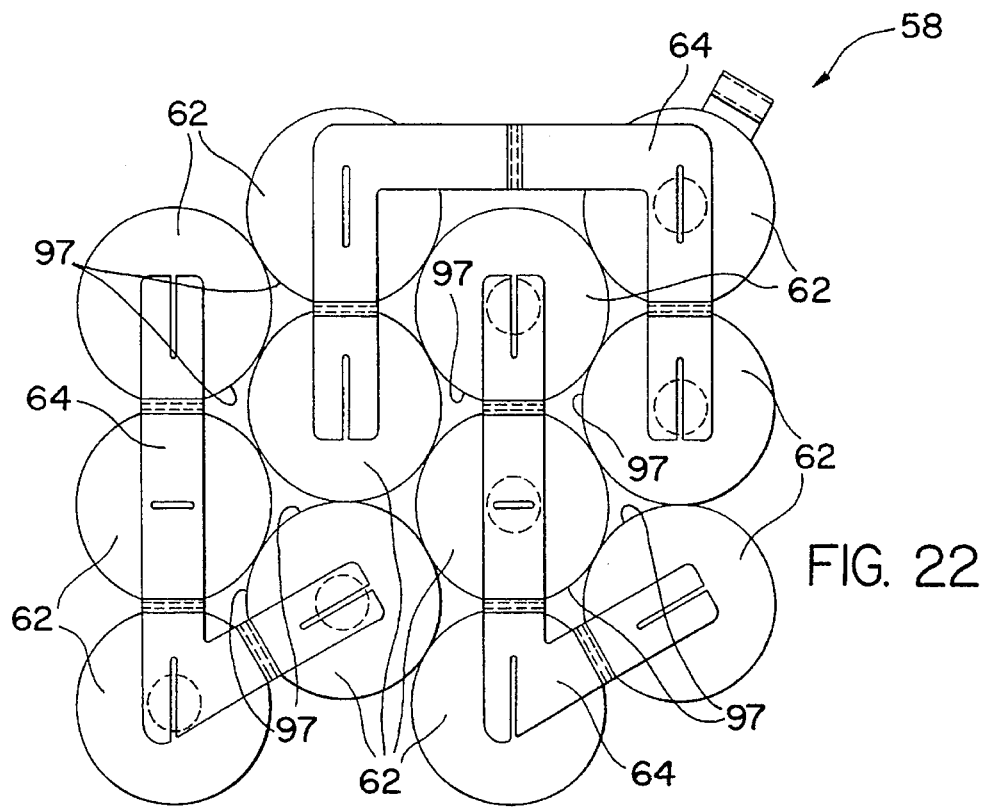
FIG. 22 is a diagrammatic view explanatory of the manner of connecting one electrodes of the battery assemblies.
Figure 23:
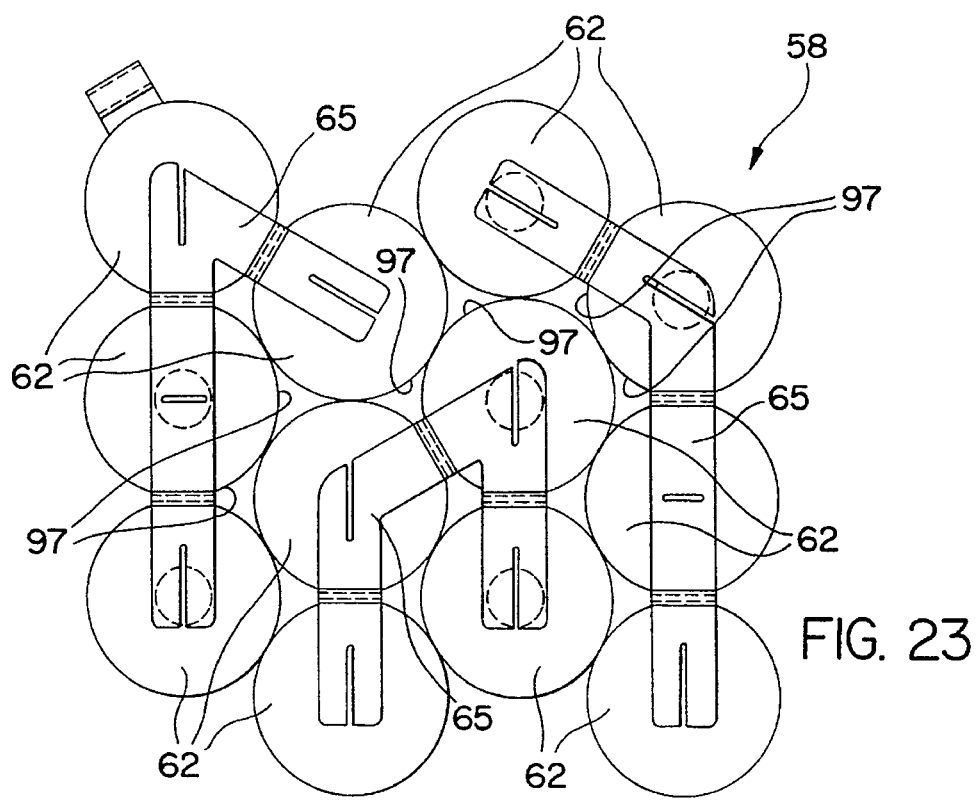
FIG. 23 is a diagrammatic view explanatory of the manner of connecting the other electrodes of the battery assemblies.

As described hereinbefore, a couple of battery assemblies 58 are accommodated as one set and separated in fore and rear sections within the battery box 50. A plurality of conductor plates 63 are securely fixed to the opposing electrodes to the two battery assemblies 58 in the battery box 50 as shown in a developed state in FIG. 21, a plurality of conductor plates 64 are fixed to the fore electrodes of the battery assembly 50 in the fore position as shown in FIG. 22, and a plurality of conductor plates 65 are fixed to the rear electrodes of the battery assembly 58 in the rear position as shown in FIG. 23. By these conductor plates 63 to 65, the batteries 62 of the two battery assemblies 58 in the battery box 50 are divided into pairs which are connected in parallel with the other battery 62 of the same pair and in series with other battery pairs.

Figure 20:
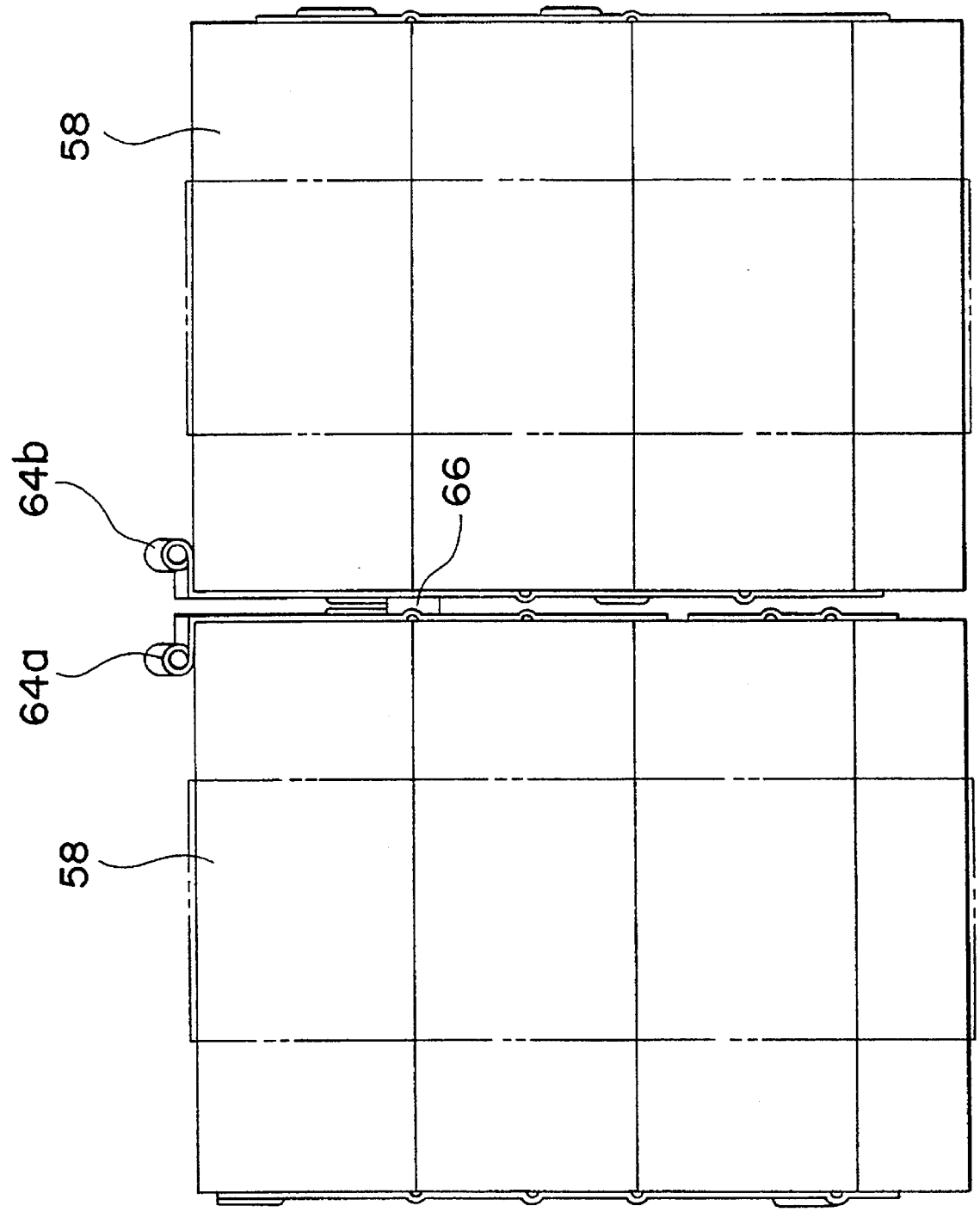
FIG. 20 is a side view of the battery assemblies constituting the battery box.
Figure 21:
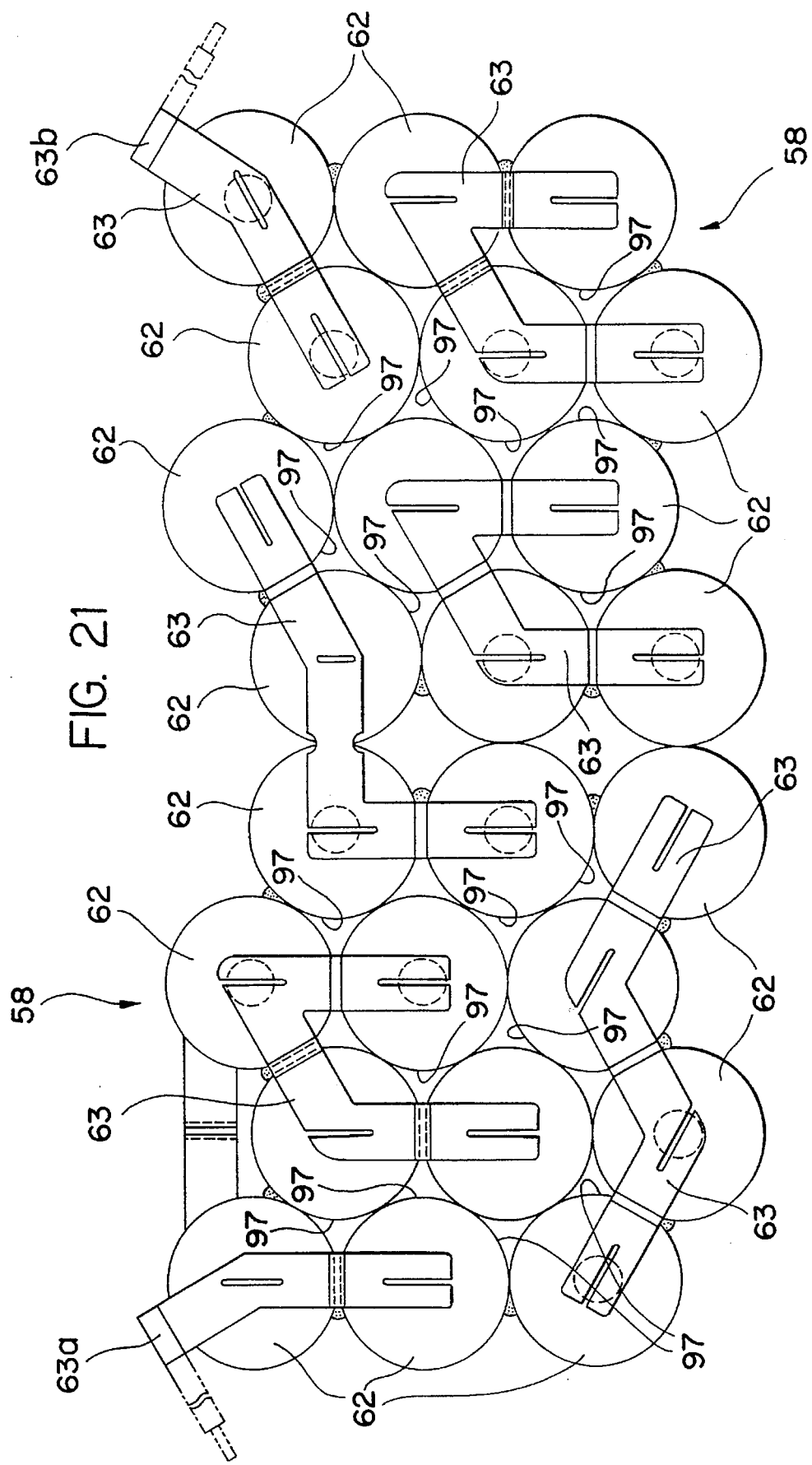
FIG. 21 is a developed view of the battery assemblies constituting the battery box.

At the time of assembling the two battery assemblies 58 in the battery box 50, the conductor plates 63 are securely fixed to the electrodes of the battery assemblies 58 in a developed state, and then folded and sandwiches between the two battery assemblies 58 as shown in FIG. 20. The conductor plates 63 are provided with terminals 63a and 63b at the opposite terminal ends, and a spacer 66 is interposed therebetween in the folded state. Terminals 64a and 65a are connected to the connector 59 in series with the fuse 60.

Figure 24:
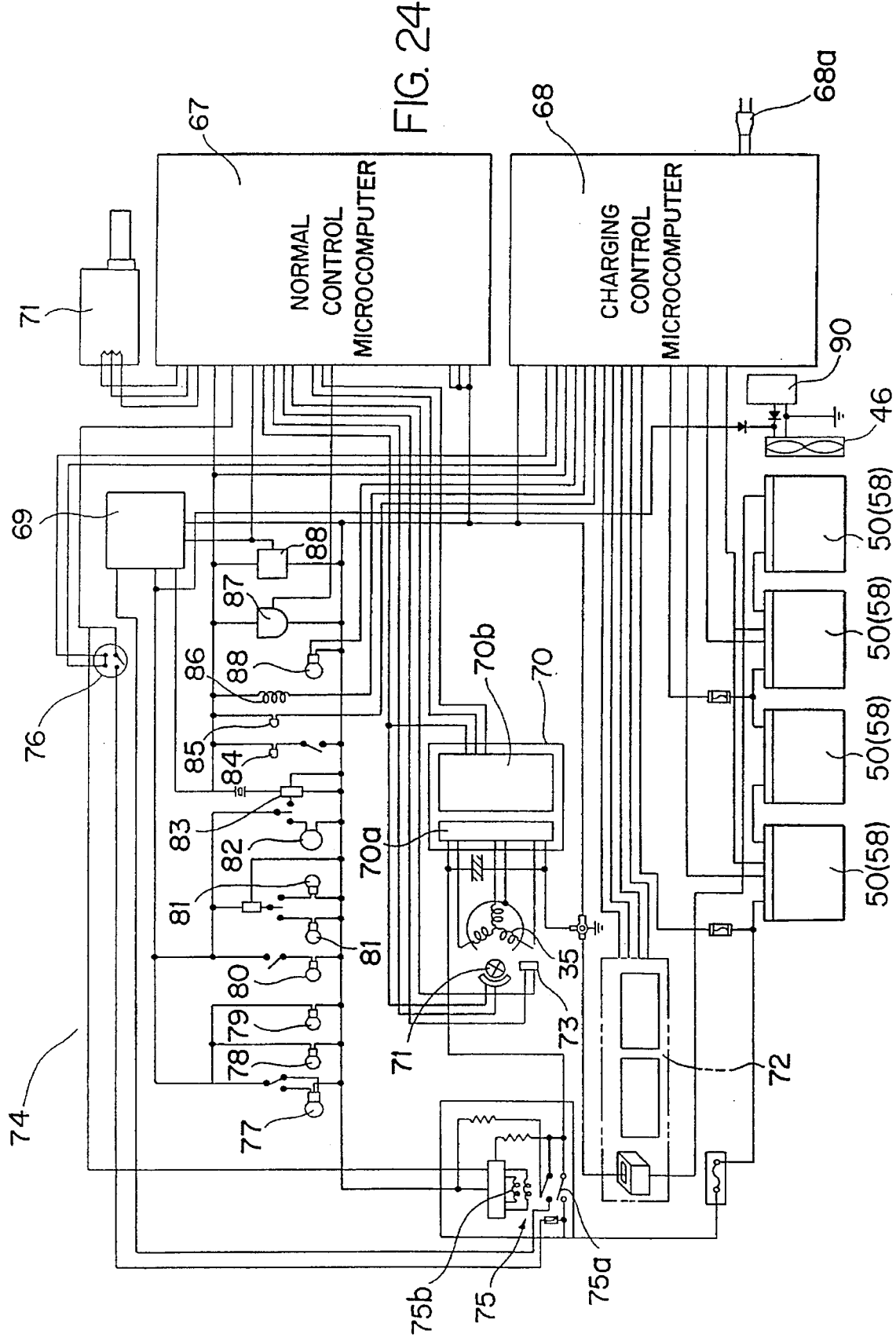
FIG. 24 is a circuit diagram of a control system for the electric motor scooter.

As shown in FIG. 24, the controller 74 normally includes a normal control microcomputer 67, a charging microcomputer 68, a down-regulator 69 and a drive circuit 70. The battery assemblies 58 in each battery box 50, which are connected in series, are connected to the drive circuit 70 through a power relay 75. The power relay 75 includes a normally closed four-contact two-position contactor 75a and a solenoid 75b. The contactor 75a of this power relay 75 is inserted between the respective battery assemblies 58 and the electric motor 35 and between the down-regulator 69 and the respective battery assemblies 58, and driven by the solenoid 75b according to the output of the normal control microcomputer 67.

Connected to the first output terminal of the down-regulator 69 are a fan drive motor for the above-described air exhauster 46, a head light 77, a tail light 78, a meter light 79, a small lamp 80, left and right winker lamps 81 and a horn 82, and connected to the second output terminal of constant voltage are a communication horn 83, a pilot lamp 84, a battery charging alarm lamp 85, a battery level meter 86, a kill sensor 87, an indicator lamp 88 and the normal control microcomputer 67. The down-regulator 69 supplies electric power to the fan drive motor for the air exhauster 46, normal control microcomputer 67 and lamps, etc.

The fan drive motor for the air exhauster 46 constantly receives power supply when the contactor 75a of the power relay 75 is opened. The communication horn 83 is actuated, for example, during a cruising operation to notify a pedestrian of the existence of the vehicle. The kill sensor 87 supplies the normal control microcomputer 67 with a command signal to cut off the power supply system in the event the vehicle falls down or in view of a similar accident. The indicator lamp 88 indicates normal or abnormal conditions when the vehicle is in motion or at rest by turning on and off four lamps in different combinations.

The drive circuit 70 includes a main driver 70a in the form of a bridged FET circuit or the like, and a predriver 70b including a gate driver circuit or the like. The main driver 70a is connected to the aforementioned electric motor 35, and the predriver 70b is connected to the normal control microcomputer 67. The driver circuit 70 produces a current corresponding to a duty factor from the battery assemblies 58 on the basis of a PWM signal produced by the normal control microcomputer 67.

Connected to the normal control microcomputer 67 are a throttle sensor 71 serving to detect the rotational angle of the accelerator grip of the steering handle 17, a current sensor 72 serving to detect the conduction current to the electric motor, and a temperature sensor 73 serving to detect the temperature of the electric motor 35, along with a main switch 76, a solenoid 75b of the above-described power relay 75 and the drive circuit 70. The normal control microcomputer 67 is arranged to produce a PWM signal for supply to the drive circuit 70 on the basis of the output signals of the respective sensors, thereby controlling the electric motor 35 for the control of vehicle speed in a normal cruising operation or for charging the batteries 62 in a braking operation through regenerative brake control.

The charging control microcomputer 68 is provided with a connector 68a for connecting to a supply of electricity, and operated on the main power supply. The charging control microcomputer 68 has a charging terminal which is connected to the respective battery assemblies 58, and an air exhauster drive terminal which is connected to an AC/DC converter 90, along with constant voltage terminals for the afore-mentioned main switch 76 and down-regulator 69 and terminals which are connected to the battery level meter 68, battery charging alarm lamp 85, current sensor 72, and battery temperature sensor 89 serving to detect the temperature of the batteries 62. The AC/DC converter 90 is connected to the fan drive motor for the air exhauster 46 to supply current after converting mains AC current into DC current. When the connector 68a is connected to a mains tap with the main switch 76 in a nontravelling position such as a charging position, the charging control microcomputer 68 starts to control the charging of the battery assemblies 58 on the basis of output signals of the respective sensors including the current sensor 72.

The above-described embodiment operates in the manner as described below.

In case of the electric motor scooter of this embodiment, the battery unit 99 is supported in a suspended state under the center tube 18, supplying current from the battery unit 99 to the electric motor 35. In a normal vehicle driving operation, the current supply to the electric motor 35 is controlled by the normal control microcomputer 67 for the control of the vehicle drive or regenerative braking, and at the time of charging, the respective battery assemblies 58 are charged with the current from the mains source under control of the charging control microcomputer 68.

In this particular electric motor scooter, the duct 36 is connected to the power swing unit 33 to take in and send cooling air to the electric motor 35 through the duct 36 in a cruising operation for cooling the motor. In this regard, the magnet 37 is fixed on the inner surface of the duct 36 to catch iron powder which might be entrained in the cooling air flows. This prevents magnetic dust like iron powder from creeping into the electric motor 35 to cause deteriorations in performance quality of the electric motor 35.

Further, in this electric motor scooter, the battery unit 99 accommodates a couple of battery assemblies 58 in each one of the four battery boxes 50 placed on the under plate 40 which is suspendedly supported on the center tube 18, the battery unit 99 having an elongated shape in the longitudinal direction of the vehicle. Namely, the battery assemblies 58 of the battery unit 99 are each formed in an elongated shape as a whole, and placed in longitudinally fore and rear positions, so that the battery unit 99 has a greater degree of freedom in shape designing in the widthwise direction. Therefore, even though the battery unit 99 is suspended under the center tube 18, its width can be reduced to such a degree as to guarantee a large bank angle. The battery unit 99 is suspended in position through utilization of the dead space under the step floor, so that it contributes to lower the center of gravity of the vehicle as a whole in addition to the effective use of the dead space.

Especially, the battery unit 99 is constituted by the battery assemblies 58 which are formed by bundling a number of batteries of elongated shape extending in the longitudinal direction of the vehicle. Therefore, each battery assembly 58 has a great degree of freedom in widthwise shape design, giving a greater degree of freedom in the shape design of the battery unit 99 as a whole. The battery assemblies 58 include batteries 62 which are bundled substantially in a trapezoidal shape in cross section with truncated portions on the opposite lateral sides, correspondingly providing the oblique portion 50a in the lower portion of its outer lateral side, the oblique portion 48a on the lid and the oblique portion 49b on the fastening belts 49 to permit a larger bank angle.

Each pair of battery assemblies 58 to be accommodated in a battery box 50 are assembled together by fixing the electrodes of the batteries 62 of the respective battery assemblies 58 to the conductor plates 63 in developed state and then folding the conductor plates 63 in such a manner as to bring the respective electrodes into head-to-head relation. Therefore, the battery assembling process can be simplified and can be completed through a reduced number of steps.

The battery assemblies 58 which are accommodated in the battery box 50 have gap spaces 97 between the individual batteries 62 in communication with the ventilation or exhaust holes 50b and air exhaust or introduction ports 50c in the fore and rear walls of the battery box 50. The gap spaces 97 are in communication with the air exhauster 46 through the air exhaust or introduction ports 50c and center tube 18. In an ordinary cruising operation, the air exhauster 46 is controlled and driven from the normal control microcomputer 67 to cool the batteries 62. In a charging operation, it is controlled and driven from the charging control microcomputer 68 to cool the batteries 62. The flow of cooling air can be in either direction. In other words, the air exhauster 46 can force cooling air through center tube 18, into the battery box 50 by way of the air exhaust or introduction ports 50c, through the gap spaces 97 between the individual batteries 62, and out through the ventilation or exhaust holes 50b. Alternatively, the air exhauster 46 can draw cooling air through the ventilation or exhaust holes 50b, through the gap spaces 97 between the individual batteries 62, out through the air exhaust or introduction ports 50c, through the center tube 18 and out through the air exhauster 46. Therefore, temperature elevation of the batteries 62 is prevented to preclude occurrence of problems which would be caused by temperature increases of the batteries 62.

In this instance, the electric motor scooter utilizes the center tube 18 as a duct for discharging air from the battery box 50. Therefore, there is no need for providing a duct exclusively for this purpose, and it becomes possible to reduce the number of parts to attain reductions in size and weight of the vehicle body as a whole. Further, since the discharge or inlet port of the air exhauster 46 is opened into a space which is covered under the rear cover 27, the air exhauster 46 and batteries 62 are suitably protected against intrusion of water or other foreign matter without providing a cover specifically for prevention of intrusion of such water or other undesirable extraneous material. This also contributes to reduce the number of parts and the weight of the vehicle.

Figure 14:
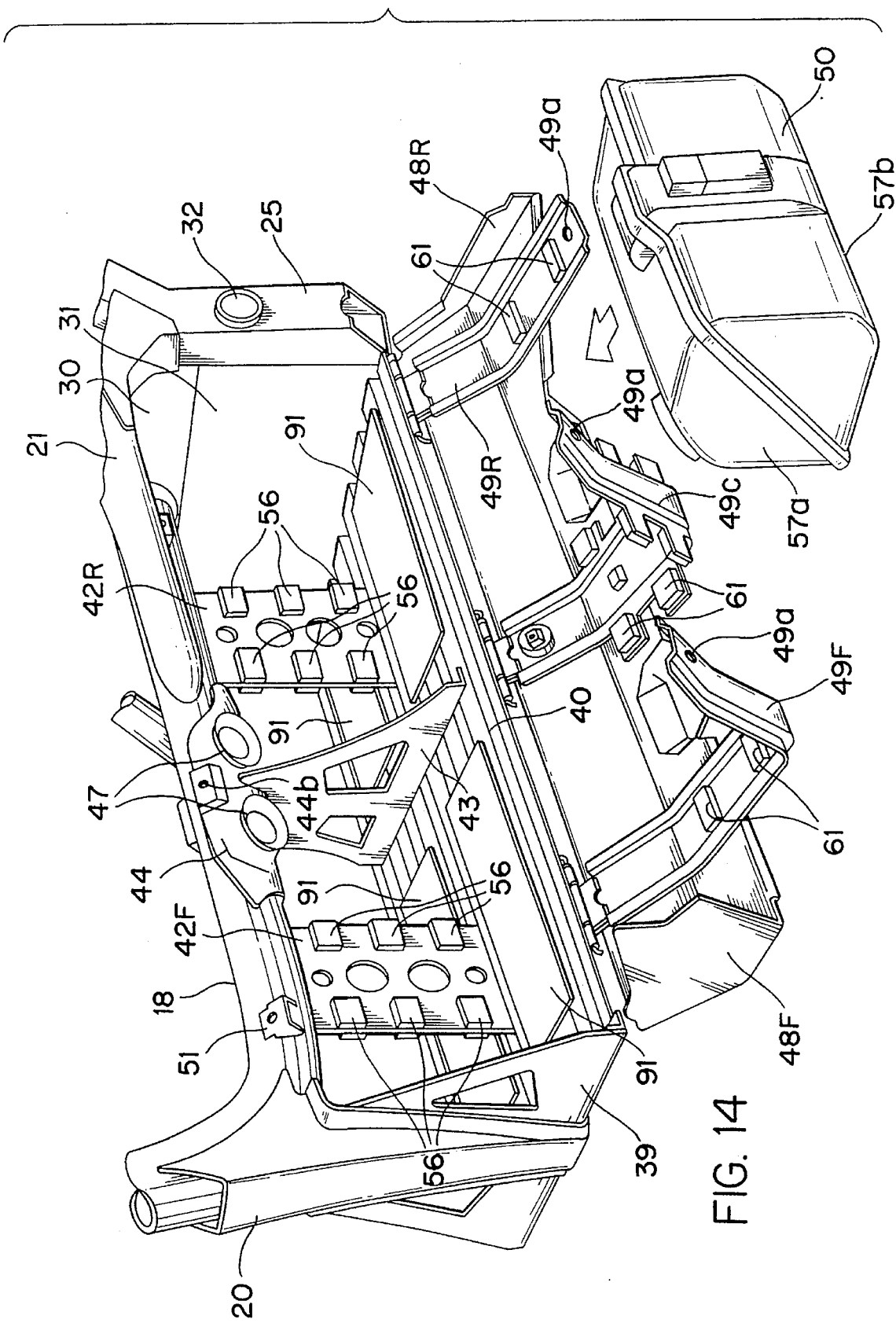
FIG. 14 is an exploded perspective view of the battery unit being loaded onto the electric motor scooter.

On the other hand, the batteries are loaded and unloaded to and from the electric motor scooter in the manner as shown in FIGS. 14 through 17. Firstly, the lids 48 and fastening belts 49 are opened as seen in FIG. 14, while in this state the battery assemblies 58 are put in a battery box 50 and placed on the under plate 40. Similarly, the remaining three battery boxes 50 are placed on the under plate 58 so that in total four battery boxes 50 are loaded on the under plate 40.

Figure 15:
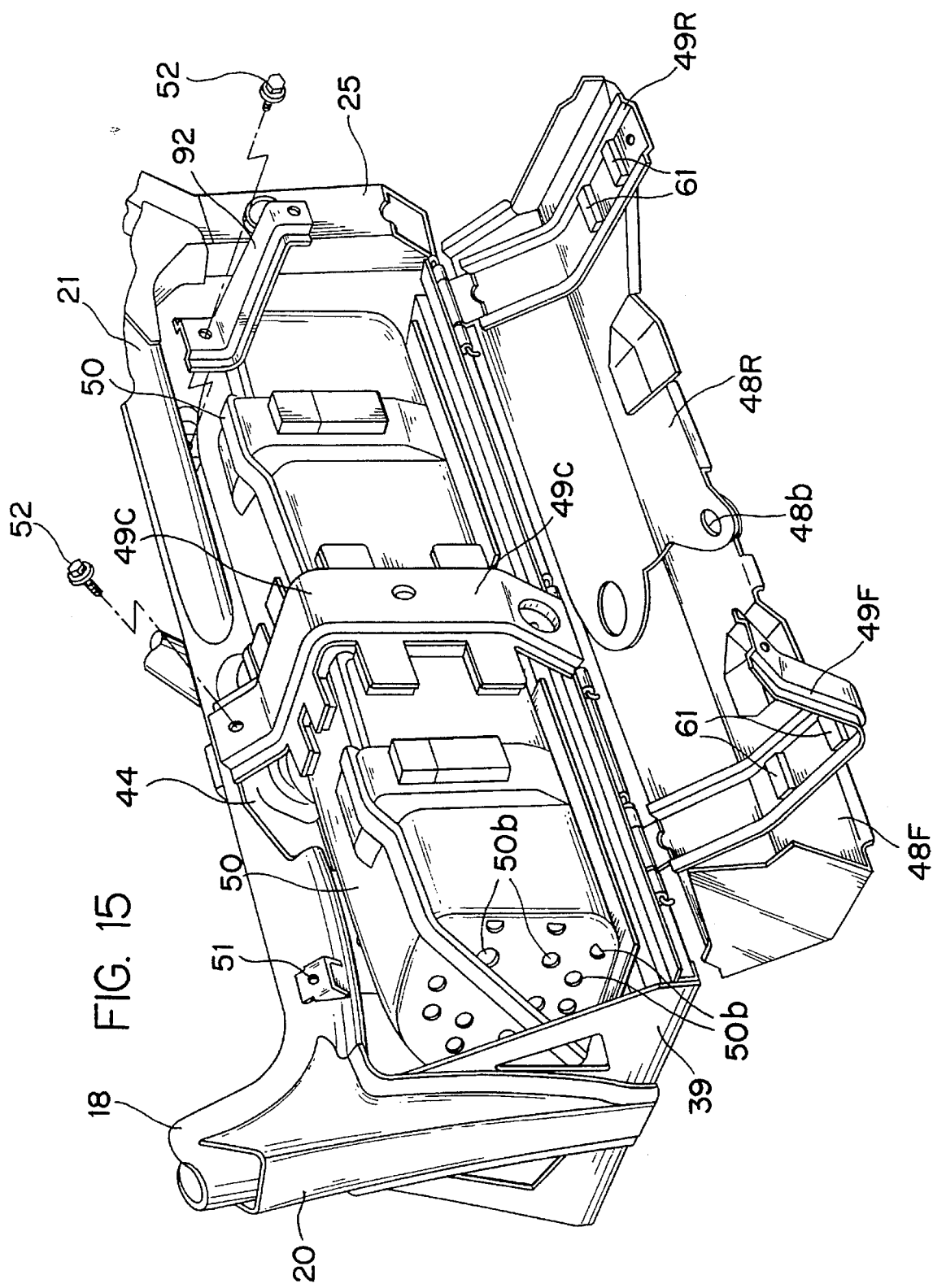
FIG. 15 is an exploded perspective of the battery unit in a state different from FIG. 14.
Figure 16:
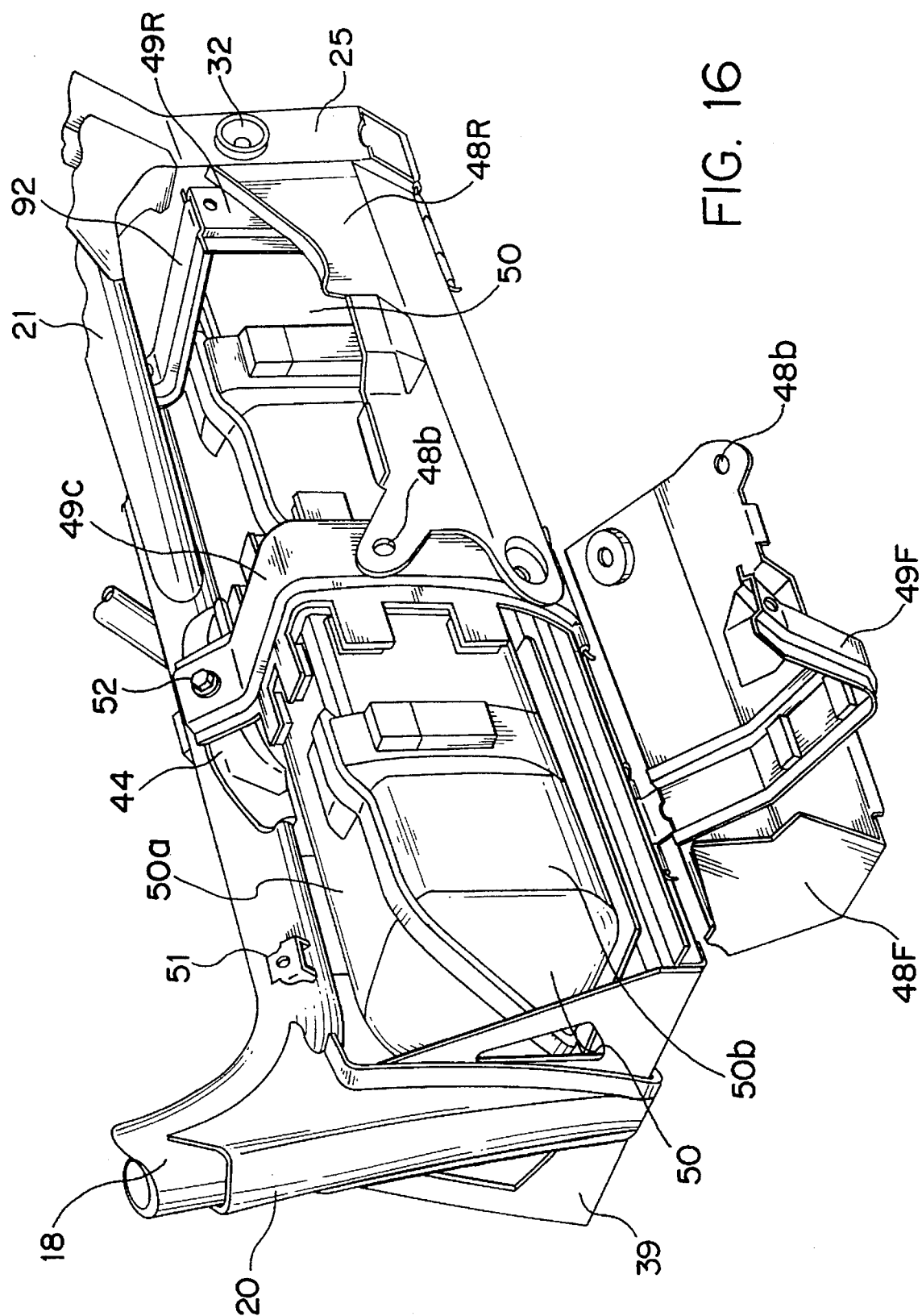
FIG. 16 is an exploded perspective view of the battery unit in a state different from FIGS. 14 and 15.

As illustrated in FIG. 15, the upper end of the center belt 49c on one side of the vehicle is fixed to the center tube 18 by a bolt 52, and one end of the fixing member 93 is fixed to the center tube 18 by a bolt 52. Similarly, the other fastening belt 49c and fixing member 93 on the other side are fixed to the center tube 18. Thereafter, as shown in FIG. 16, the lid 48 on the rear side is closed and fixed in the closed position by means of a screw 53, and the lid 48 on the other side is fixed in the closed position in a similar manner.

Figure 17:
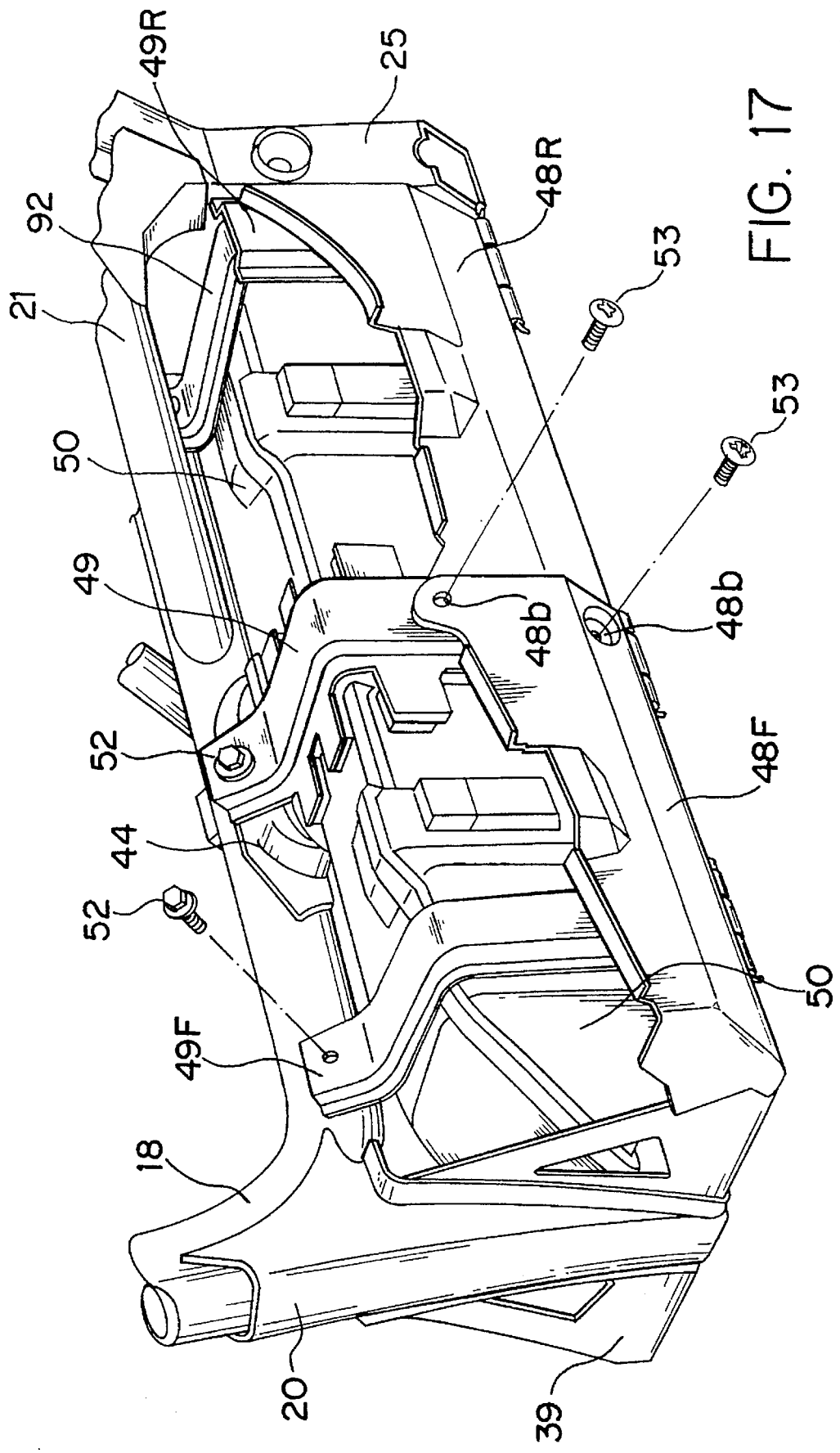
FIG. 17 is an exploded perspective view of the battery unit in a state different from FIGS. 14, 15 and 16.

As illustrated in FIG. 17, the upper end of the fastening belt 49 on the front side is fixed to the center tube 18 by a bolt, and then the lid 48 on the front side is closed and fixed in that position at two positions by means of screws 53 to complete the battery loading. The battery can be unloaded from the vehicle by reversing the order of the above-described battery loading procedures, namely, by performing the jobs of FIGS. 17, 16, 15 and 14 in a reversed way.

Figure 25:
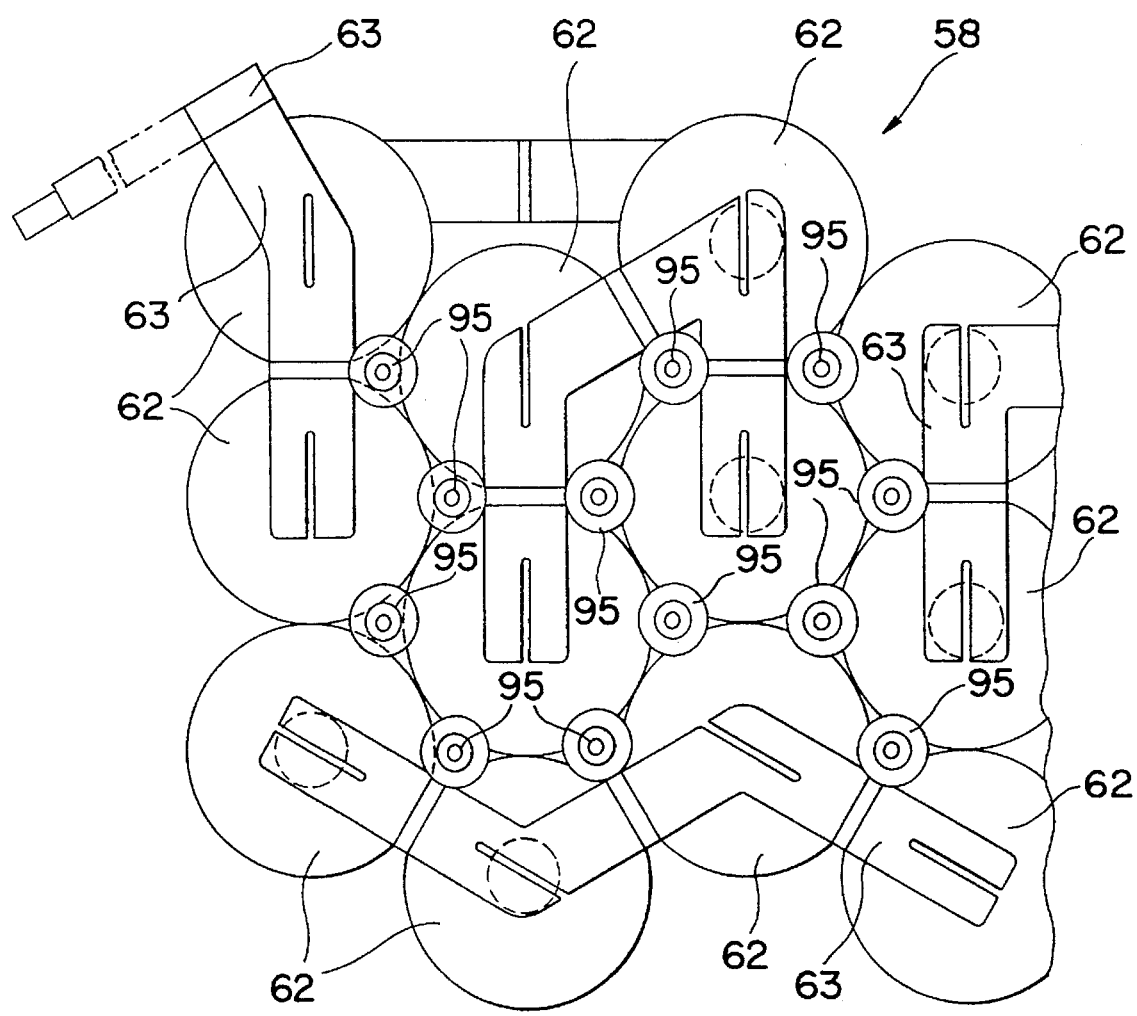
FIG. 25 is a fragmentary front view on an enlarged scale of battery assemblies in another embodiment of the invention.
Figure 26:
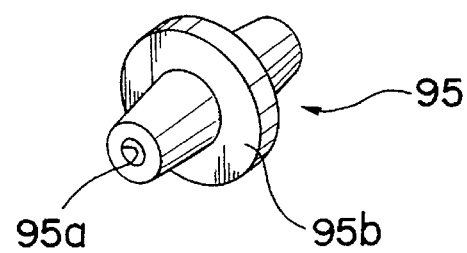
FIG. 26 is a perspective view of a component part used for the battery assemblies.

FIGS. 25 and 26 illustrate another embodiment of the invention, of which FIG. 25 is an enlarged fragmentary front view of a battery assembly and FIG. 26 is a perspective view of a part used for the battery assembly.

In this embodiment, the component parts common with the foregoing embodiment are designated by common reference numerals, and their description is omitted to avoid repetitions.

As illustrated in FIG. 25, bushings 95 are fitted in the gap spaces 97 between the individual batteries 62 at each end face of the battery assembly 58. Each one of the bushes 95 is formed in a hollow shape having an axial bore 95a and provided with a flange 95b around the circumference of its body. These bushings 95 are bonded to the batteries 62 at their circumferential surfaces and flanges 95b by the use of an adhesive or other suitable means. The axial bores 95a open into the gap spaces 97 to introduce air thereinto.

In this embodiment, the batteries 62 are joined together more firmly through the bushings 95 to improve the strength of the battery assembly 58. Cooling air for the batteries 62 is introduced into the respective gap spaces 97 through the axial bores 95a of the bushings 95 without degrading the cooling effect on the batteries 62.

Although the invention is applied to a straddling type electric motor vehicle in the foregoing embodiments, it can be similarly applied to electric motor vehicles other than the straddling type, for example, to four-wheel electric motor vehicles.

The battery unit is formed in an elongated shape and located under the vehicle body to extend in the longitudinal direction of the vehicle body. This arrangement gives a great degree of freedom in selecting the widthwise profile of the battery, in addition to an advantage that the width can be reduced to secure a large bank angle when applied to a straddling type electric motor vehicle.

The battery unit is constituted by battery assemblies each consisting of a bundle of a plurality of batteries of an elongated shape. This arrangement also gives a broader range of freedom in selecting the battery shape.

The battery unit is formed in a shape having lower edges of the opposite lateral sides thereof truncated to have a smaller width across the bottom side than across the top side thereof. This arrangement contributes to secure a large bank angle when applied to a straddling type vehicle.

The battery unit is suspended under an intermediate vehicle body interconnecting a front vehicle body and a rear vehicle body, providing a step floor on the upper side of the intermediate vehicle body over the battery unit. This arrangement contributes to lower the center of gravity of the vehicle as a whole, while utilizing a dead space in such a manner as to provide a compact vehicle body.

A battery assembly is formed by bundling together a plural number of elongated batteries to extend in the longitudinal direction of the motor vehicle and in small gap relation with adjacent batteries, and accommodated in a ventilated battery box. Thus, the battery is cooled with air to prevent elevations of its temperature.

The battery unit is provided with an air exhauster for forced air exhaustion to cool the battery more effectively.

The battery unit is arranged to pass air through a hollow frame member. This arrangement obviates the necessity for providing a duct exclusively for this purpose, and permits reduction in the number of parts and the size of the vehicle body.

The air exhauster is located in a space enclosed by a body cover and the discharge or inlet port of the air exhauster is opened into that space. This arrangement can prevent intrusion of rain water into the air passage cylinder without the necessity of providing special parts for this purpose and permitting to reduction in the number of component parts and reduction in the size of the vehicle body.

A couple of battery assemblies, each composed of a plural number of batteries, are connected to flat conductor plates in such a way that the battery assemblies are connected end to end upon folding the conductor plates. This arrangement facilitates the assembling process and contributes to reduce the number of steps of assembling.

A magnet is located on an inner wall surface of the duct which introduces cooling air streams toward the electric motor. This arrangement contributes to prevent magnetic dust like iron powder from creeping into the electric motor, and thus to guarantee high reliability of the motor.

Figure 27:
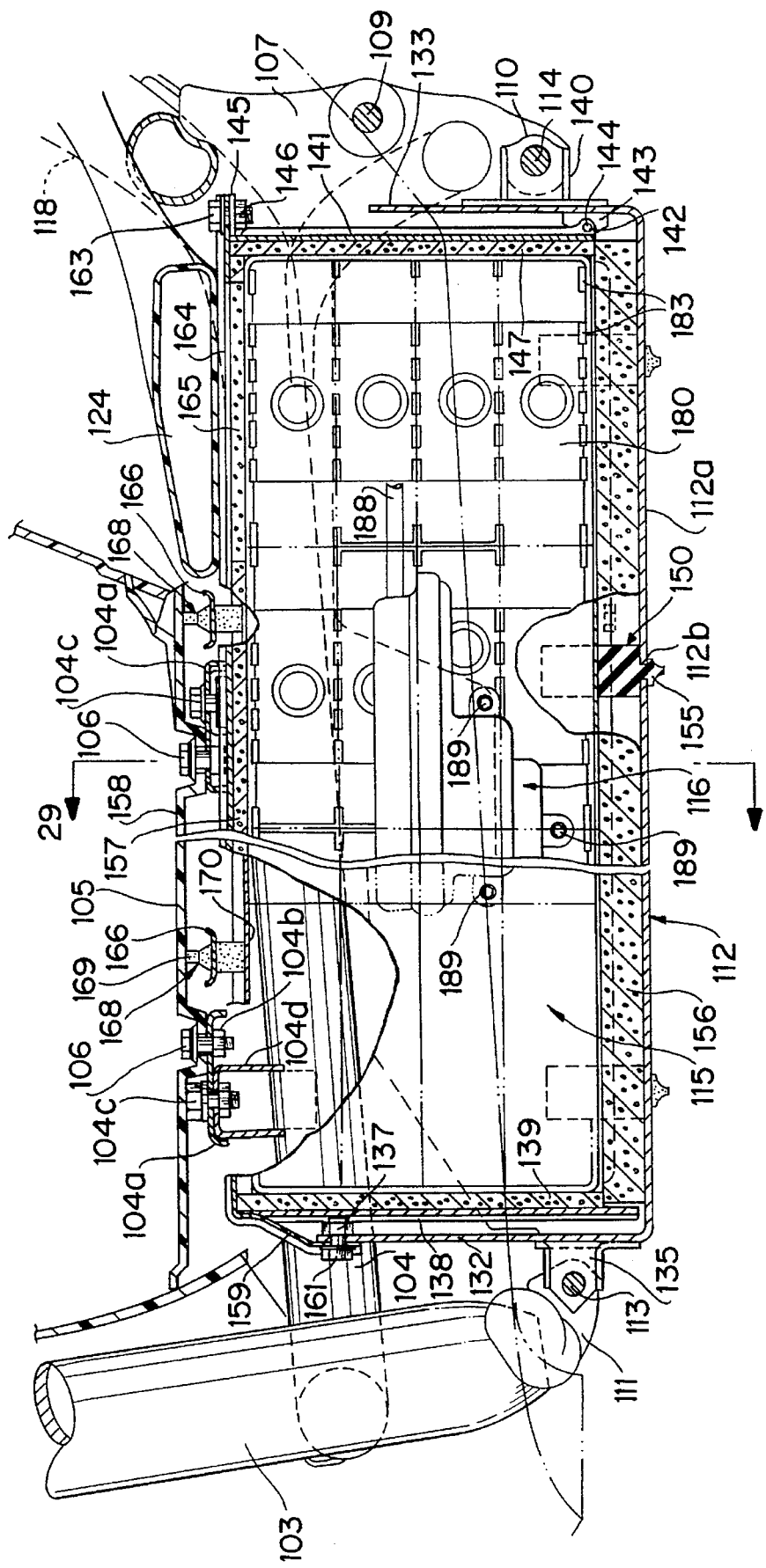
FIG. 27 is a side view of an electric motor scooter showing an example of a housing for application of the present invention.
Figure 28:
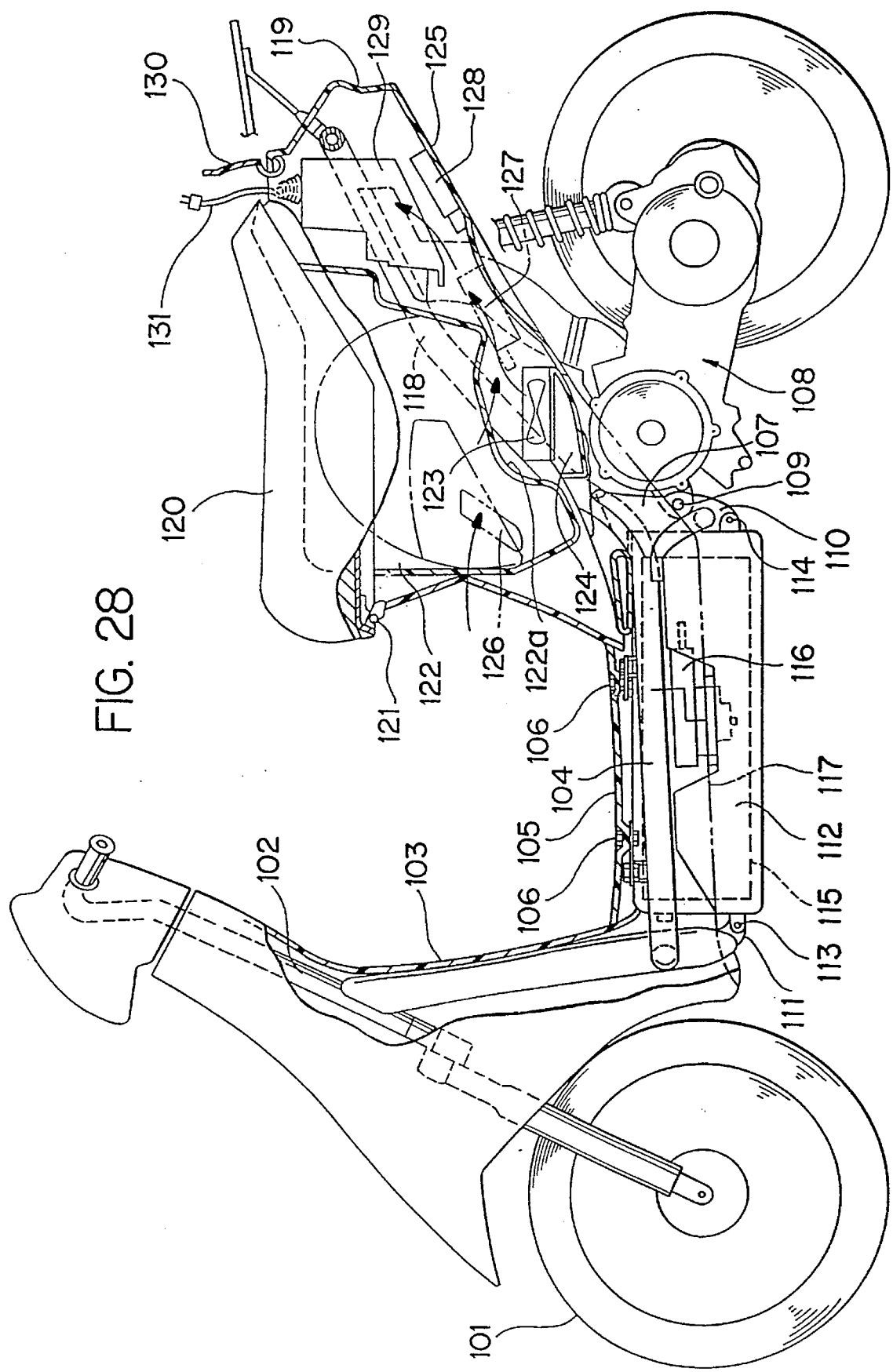
FIG. 28 is a partly cutaway plan view of the electric motor scooter.

Referring to FIGS. 27-33, there is illustrated another embodiment of the present invention. FIG. 28 is a partly cutaway left side view of an electric motor scooter incorporating this embodiment of the present invention. In FIG. 28, a steering shaft 102 supports a front wheel 101 which is supported at the upper end of a main frame 103. The main frame 103 extends obliquely downwardly and is connected to the front end of a floor frame 104.

Figure 29:
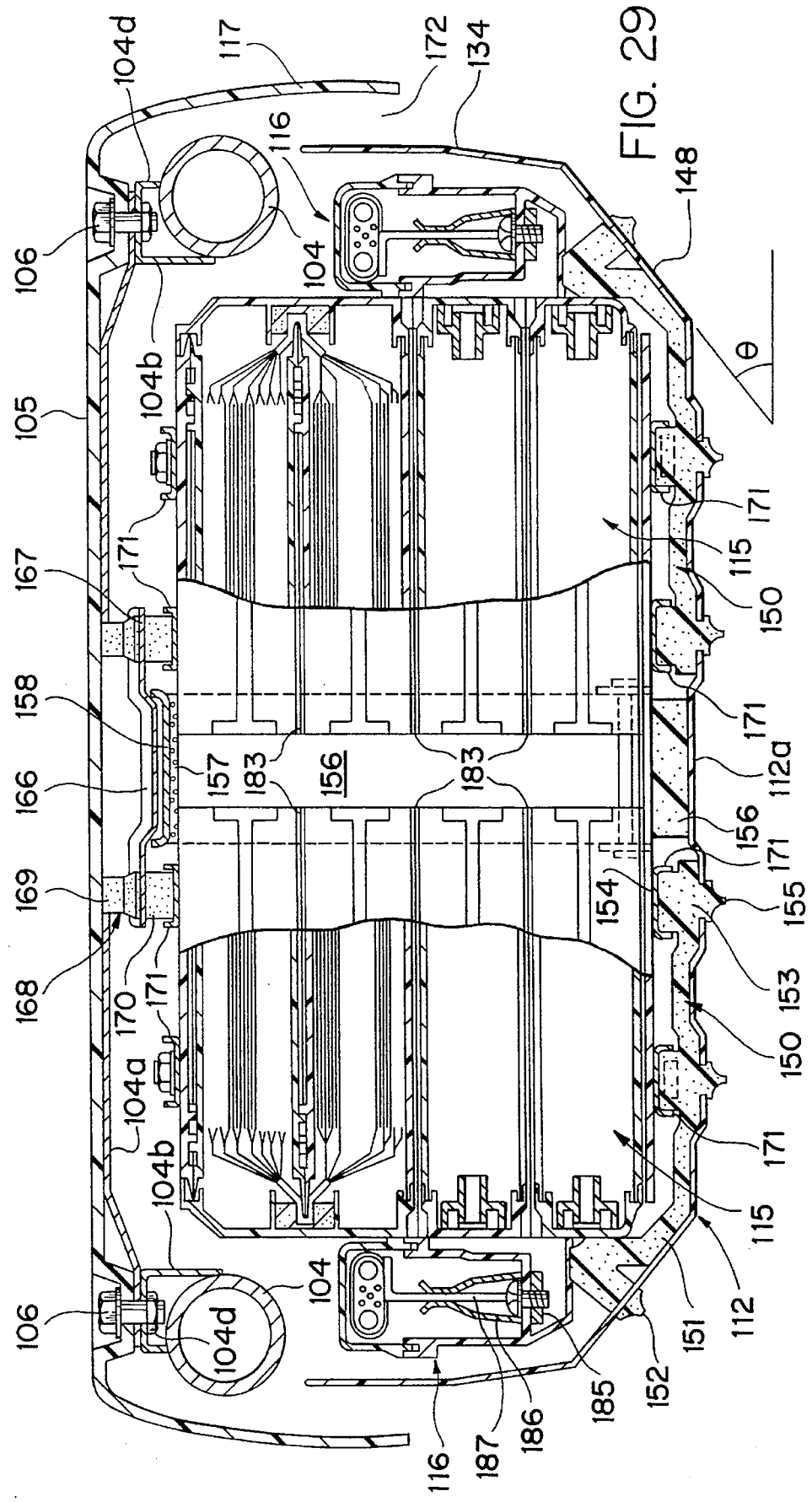
FIG. 29 is a sectional view taken along line 29—29 of FIG. 27.
Figure 30:
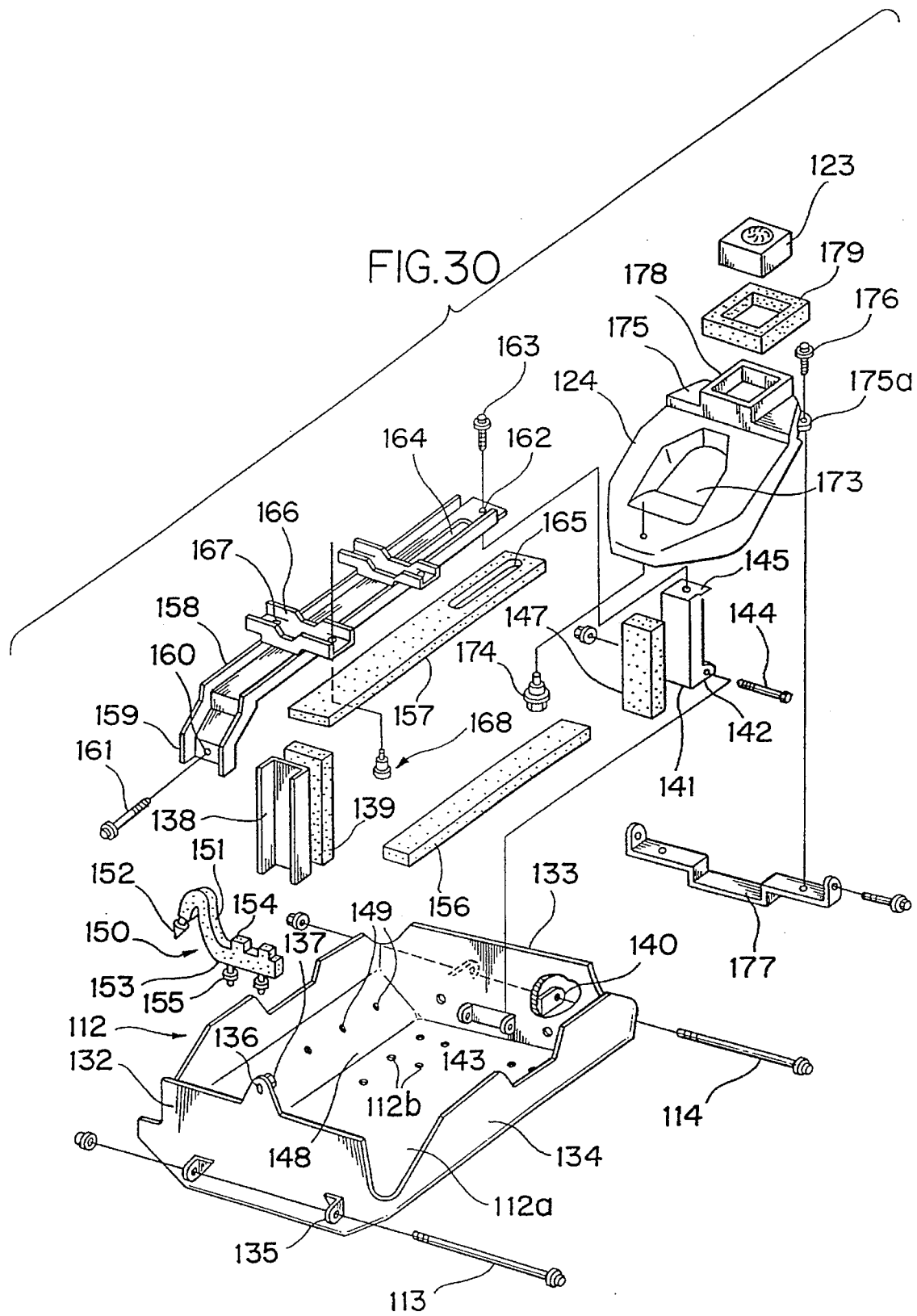
FIG. 30 is an exploded view of the major components of the support.

The floor frame 104 includes a couple of frame members which extend rearwardly in a laterally diverging fashion, as illustrated in FIGS. 29 and 30, which will be described hereinafter, a step floor 105 is detachably fixed on top of the floor frame 104 by means of bolts 106 to support the feet of the driver during travel.

Attached to a rear portion of the floor frame 104 is a pivot bracket 107 to which a front end portion of a power unit 108 is rockably attached through a pivot shaft 109. A rear bracket 110 extends obliquely forward from a lower end portion of the pivot bracket 107.

The rear bracket 110 and a front bracket 111, which extends rearwardly from a lower end portion of the main frame 103, support rear and front portions of a battery case 112 which is mounted in position from one lateral side by means of long bolts 113 and 114. The battery case 112 is open on the top side and accommodates therein a battery 115. Attached to the lateral sides of the battery 115 are couplers 116 which will be described in greater detail hereinafter. The lateral sides of the battery case 112 are covered under skirt portions 117 of the step floor 105.

On the rear side of the pivot bracket 107, the floor frame 104 is formed into a rear frame 118 which extends obliquely upwardly in a continuous manner in the rearward direction, and a rear cover 119 is attached in such a manner as to circumvent the rear frame 118. A seat 120 is mounted on top of the rear cover 119 through a hinge 121 for opening the seat. Provided under the seat 120 is an open-topped compartment 122 which is useful as a container for a helmet or the like and which utilizes the seat 120 as its lid.

A fan 123, is put in rotation at the time of charging the battery 115 and is provided within the rear cover 119 under a bottom portion of the compartment 122. The fan 123 is located at the rear end opening of a duct 124. The fore end of the duct 124 is opened toward an upper rear portion of the battery case 112. When charging the battery 115, air in the battery case 112 is sucked out by rotation of the fan 123, thereby sucking ambient air into the battery case 112 for cooling the battery 115.

The rear cover 119 has a bottom wall 125 which extends obliquely upwardly in the rearward direction, maintaining the interior of the rear cover 119 substantially in a hermetically sealed state so that, simultaneously with the air exhaustion by the fan 123, the counter air flow in travel is taken in through an opening 126 in a front portion of the rear cover 119 and passed to its rear end portion as indicated by an arrow under guidance of the bottom wall 125. A converter 127 and a controller 128 are provided along the bottom wall 125, and a charger 129 is located in a space upwardly of the controller 128 and rearwardly of the compartment 122.

Provided on a surface of the rear cover 119 upwardly of the charger 129 and rearwardly of the seat 120 is an openably closable lid 130 for the charger 129. At the time of battery charging, the lid 130 is opened and a cable 131 is taken out therethrough for connection to a source of electricity. In closed state, the charger lid 130 is pressed in position by a rear end portion of the seat 120.

FIG. 27 is an enlarged longitudinal sectional view through the battery case 112 and associated parts, and FIG. 29 is a transverse section taken on line 29—29 of FIG. 27. Further, FIG. 30 is an exploded view explanatory of the relations of the battery case 112 with the battery 115, fan 123 and duct 124.

Referring to FIGS. 27, 29 and 30, the battery case 112 is provided with front wall 132, rear wall 133 and side walls 134. Projecting forwardly from the front wall 132 are brackets 135 which receive a long bolt 113. A mounting tab 136 projects upwardly at a center portion on the upper edge of the front wall 132 to receive a weld nut 137. A spacer 138 of a C-shape in section is provided vertically at the center of the inner surface of the front wall 132 such that the open side of the spacer 138 is disposed on the outer side. A strip of sponge 139 is provide along the inner side of the spacer 138.

Similarly, rearwardly projecting brackets 140 are provided in lower portions of the rear wall 133 to receive a long bolt 114 therein, and a spacer 141 of C-shape in section is provided vertically at the center of the inner surface of the rear wall 133 with the open side of the spacer facing toward the outer side. Projections 142 in lower portions of the spacer 141 are connected to slitting lugs 143 on the inner side of the rear wall 133 by a bolt 144. The upper end of the spacer 141 is folded back substantially horizontally to provide a mounting portion 145 with a welded nut 146, see FIG. 27. A strip of sponge 147 is also attached along one face of the spacer 141 which is disposed interiorly of the battery case.

The side wall 134 is provided with an oblique wall portion 148, see FIG. 29, which is downwardly inclined toward the center of the vehicle at an angle of θ with the horizontal, and which is formed with mounting holes 149 at suitable intervals in the longitudinal direction. The provision of the oblique wall portion 148 is advantageous in terms of the bank angle of the vehicle body.

The mounting holes 149 are each engageable with a head portion 152 at the outer end of an oblique portion 151 of a lower mount rubber member 150 which is so shaped as to fit the profile of the oblique wall portion 148 and bottom wall portion 112a. The oblique portion 151 is inclined at the same angle as the oblique wall portion 148, and the head portion 152 is formed slightly larger than the mounting hole 149. The horizontal portion 153 of the lower mount rubber member 150, which lies on the bottom wall portion 112a is provided with upward projections 154 on the upper side thereby to support the bottom of the battery 115 resiliently, and with downwardly projecting mount portions 155 on the lower side for engagement in mount holes 112b which are formed in the bottom wall portion 112a at suitable intervals in the longitudinal direction and in a diameter slightly smaller than the mount portions 155.

A sponge strip 156 is fixed longitudinally along the center of the bottom wall portion 112a in such a manner as to fill the gap between the sponge strips 139 and 147 on the front and rear walls.

The top side of the battery 115 is pressed by a sponge strip 157 in cooperation with a fixing member 158 which extends in the longitudinal direction. The fixing member 158 is formed substantially in C-shape in section and formed with a downwardly bent portion 159 in its fore end portion to be overlapped on the mount portion 136. The downwardly bent portion 159 is fastened to the mount portion 136 by threading a bolt 161 into a welded nut 137 through a bolt hole 160 in the downwardly bent portion 159.

A bolt hole 162 is also formed in a rear end portion of the fixing member 158. A bolt 163 is threaded into a welded nut 146 on the mount portion 145 of the spacer 141 through the bolt hole 162 to fasten the rear end portion of the fixing member 158 to the spaced 141. A slot 164 is formed in the vicinity of the bolt hole 162 in overlapping relation with a slot 165 of a similar shape formed in a sponge strip 157 which lies under the fixing member.

The fixing member 158 is provided with laterally projecting cross members 166 in spaced positions in its intermediate portion, each cross member 166 receiving an upper mount rubber member 168 through press-in fit in each of mount holes 167 formed in the laterally projected opposite end portions. The upper ends of the respective upper mount rubber members 168 protrude upwardly and abut against the inner surface of the step floor 105 to provide resilient support therefor. Lower ends of the upper mount rubber members 168, which protrude downwardly from the lower side of the cross members 166, are fitted in angular fore and rear frames 171 of the respective battery units 115 to support the top side of each battery 115 resiliently.

As shown particularly in FIG. 29, after placing the fixing member 158 on the respective battery units 115 and fixedly fastening its fore and rear ends to the battery case 112, the step floor 105 which is put over the fixing member 158 is resiliently supported by the upper ends of the upper mount rubber members 168 which protrude upwardly of the cross members 166 to engage the lower side of the step floor 105. In this state, as mentioned hereinbefore, the skirt portion 117 of the step floor 105 is disposed to circumvent the side wall portion 134 of the battery case 112, forming a small ventilation clearance 172 on the outer side of the side wall portion 134. The collecting coupler 116 is provided on the each one of the left and right battery units 115.

Figure 31:
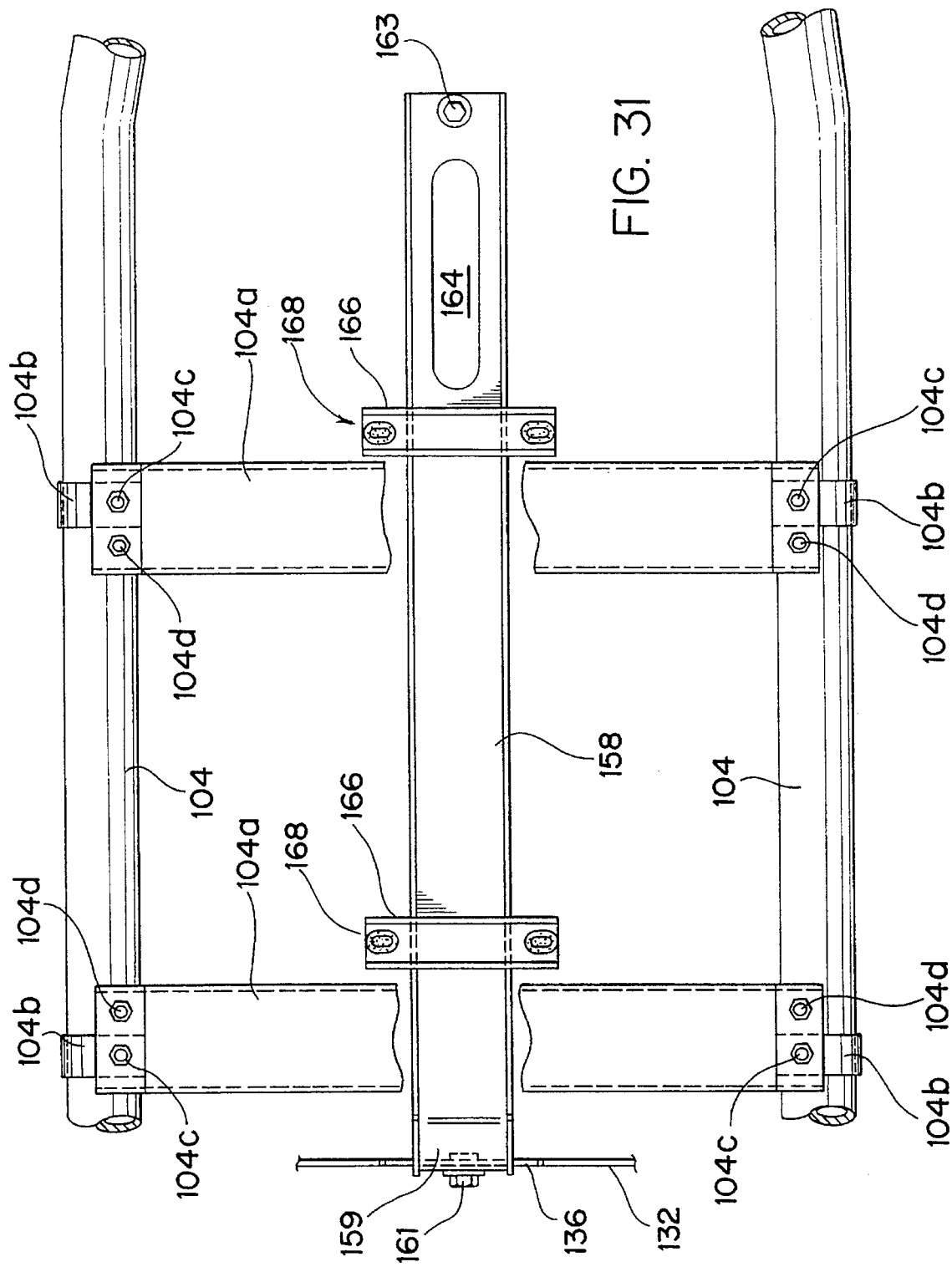
FIG. 31 is a partly cutaway view of components of the floor frame.

As illustrated in a plan view in FIG. 31, a floor frame is provided for mounting the step floor. The floor frame includes left and right floor frames 104 which are interconnected by a couple of parallel cross plates 104a in fore and rear portions. The opposite ends of each cross plate 104a are securely fastened to brackets 104b on the floor frames 104 by bolts 104c. Each cross plate 104a is provided with welded nuts 104d at its opposite ends to receive bolts 106 which fasten same to the floor frame 104.

As seen in FIG. 30, the duct 124 is provided with separate air passages in a circumventing fashion on the left and right sides of a center space 173, and its lower portion is opened toward an upper rear portion of the battery case 112 and securely fixed to a lower front end portion of the rear cover 119 by means of a bolt 174 at a point upwardly rearward of the battery case 112. The body of the duct 124 is raised in the rearward direction and extends into a space beneath the stepped wall portion 122a at the bottom of the compartment 122, see FIG. 28. The rear end of the duct 124 is fixed to a stay 177, which is supported at its opposite ends on the left and right rear frames 118, by means of bolts 176 which are threaded into mount portions 175a provided on the opposite sides of a rear top portion 175 of the duct 124. The fan 123 is fixedly fitted in a center opening 178 of the top portion 175 through a resilient material 179.

Figure 32:
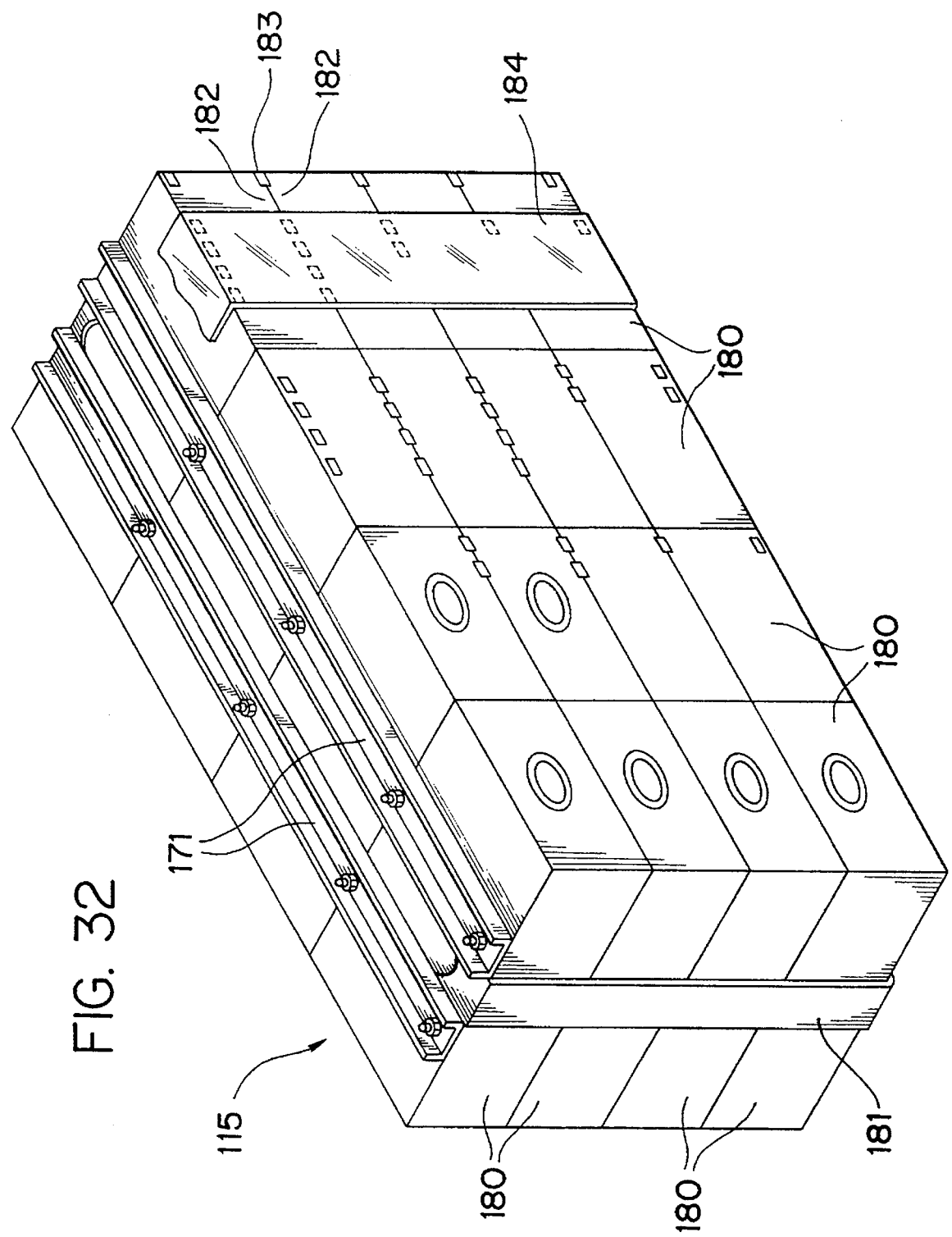
FIG. 32 is a schematic perspective view of major components of an embodiment of the invention.

Schematically shown in FIG. 32 are the battery units 115, which each include 16 wet type secondary battery cells 180, namely, 4×4 battery cells which are aligned in the vertical and longitudinal directions. These battery cells are connected in series with each other and bundled by a frame member 181 which is applied therearound. The frame member 181 includes a pair of longitudinal frames 171, which are provided on the upper and lower sides of the battery assembly 115 as mentioned hereinbefore, and vertical frames 181 which interconnect the fore and rear ends of the upper and lower longitudinal frames 171. Each battery cell 180 is provided with a suitable number of ribs 182 on its surface so that a large number of ventilation grooves 183 are formed in the transverse directions between the joined surfaces of adjacent battery cells 180. In this figure, most of the ventilation grooves 183 are omitted for the convenience of illustration.

As air in the battery case 112 is sucked by the fan 123 through the duct 124, fresh air is introduced into the battery case 112 through the ventilation clearances 172, see FIG. 29, in its side walls, cooling each battery unit 115 efficiently as it passes through the ventilation grooves 183 and the clearances 156 between the two battery units 115. A blocking tape is adhered to a rear end portion of each battery unit 115 to close some of the ventilation grooves 183. This helps to distribute the suction force of the fan 123 as far as front end portions, avoiding localization in the regions around the duct 124.

As seen in FIG. 29, the collecting coupler 116 has a horizontally split structure, mounting on one part a female terminal 186 for connection to a battery terminal 185 and mounting on the other part a male terminal 187 to be coupled with the female terminal 186. The male terminal 187 of the collecting coupler 116 is connected to a harness 188, see FIG. 27, which leads to the motor of the power unit 108. As shown particularly in FIG. 27, the collecting coupler 116 is fixed to the outer side of the battery 115 by means of three bolts 189, and can be extracted upwardly after removing these bolts.

Figure 33:
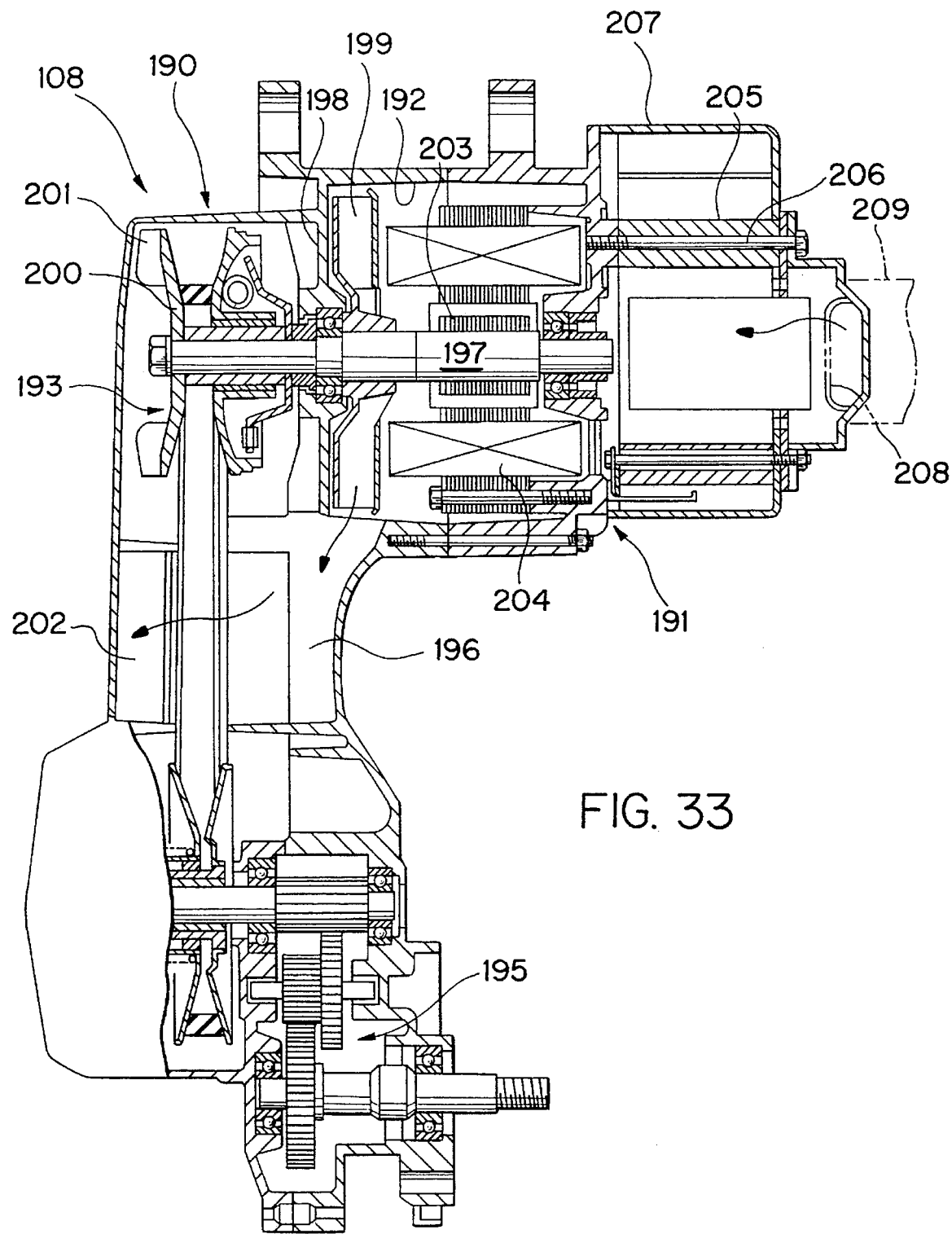
FIG. 33 is a sectional view of a power unit of an embodiment of the present invention.

FIG. 33 shows the power unit 108 in a horizontally sectioned plan view. The power unit 108 is provided with a casing 190 which is divided into a motor chamber 192 which accommodates an electric motor 191 and a transmission chamber 196 which accommodates a belt type stepless transmission 193, a starting clutch 194 and a reducing mechanism 195.

Formed between the motor chamber 192 and the transmission chamber 196 is a bearing portion 198 for a motor shaft 197. The two chambers are communicated with each other rearward of the bearing portion 198. A motor fan 199 is mounted on the motor shaft 197 on the side of the motor chamber 192, and a drive pulley 200 is mounted on the motor shaft on the side of the transmission chamber 196. A belt fan 201 is provided on the drive pulley 200, and an air exhaust port 202 is opened in an intermediate portion of the bottom wall of the transmission chamber 196.

The electric motor 191 in the motor chamber 192 is provided with a magnet 203 and a stator coil 204 located around the magnet 203. A heat sink 205 is attached by bolts 206 to a right-hand wall portion of the motor chamber 192, which is surrounded by a cover 207. Connected to an outer opening 208 of the cover 207 is one end of a duct 209 the other end of which is communicated with the rear cover 119, see FIG. 28.

As the motor fan 199 is coaxially rotated by the rotation of the motor shaft 197, relatively clean air in the rear cover 119 is sucked into the motor chamber 192 through the duct 209 and opening 208 to cool the electric motor 191 with air, which is then passed through the transmission chamber 196 and released into the atmosphere through the air exhaust port 202.

The above-described embodiment operates in the manner as follows. Referring to FIG. 27, firstly in case it is desired to dismantle the battery 115, the step floor 105 is removed by unscrewing the bolts 106 to expose the fixing member 158. Then, the fixing member 158 is detached by unscrewing the fore and rear bolts 161 and 163. Now the battery unit 115 can be lifted up out of the battery case 112. This means that it can be dismantled in a prompt manner simply by removing a couple of bolts 161 and 163.

Conversely, in case it is desired to mount the battery unit 115 in the battery case 112, the battery 115 is put into the battery case 112 from above such that the bottom of the battery 115 is seated on the lower mount rubber members 150 which are fixed on the battery case 112 beforehand. Next, the fixing member 158 is longitudinally placed on top of the battery 115 through the sponge strip 157, and the fore and rear ends of the fixing member 158 are fastened to the fore and rear mount portions 136 and 145 of the battery case 112 by means of the bolts 161 and 163. Consequently, the fixing member 158 is pressed against the top side of the battery 115 to hold the same in a fixed position, and at the same time the lower end portions of the upper mount rubber members 168 on the cross members 166 of the fixing member 158 are abutted against the longitudinal frames 171. In this manner, the batteries 115 can be mounted in position in the battery case 112 promptly while providing a resilient support against vibrations. Further, the step floor 105 which is mounted over the cross members 166 afterwards is also resiliently supported on the upper ends 169 of the cross members 166. Thus, the battery 115 and step floor 102, which constitute two separate components, can be simultaneously supported by the same upper mount rubber members 168 in an advantageous manner.

Described below are further embodiments employing an arrangement which permits to mount or dismantle the battery 115 from or in the sideward direction of the vehicle body, and wherein the component parts common with the foregoing embodiment in function are designated by common reference numerals.

Figure 34:
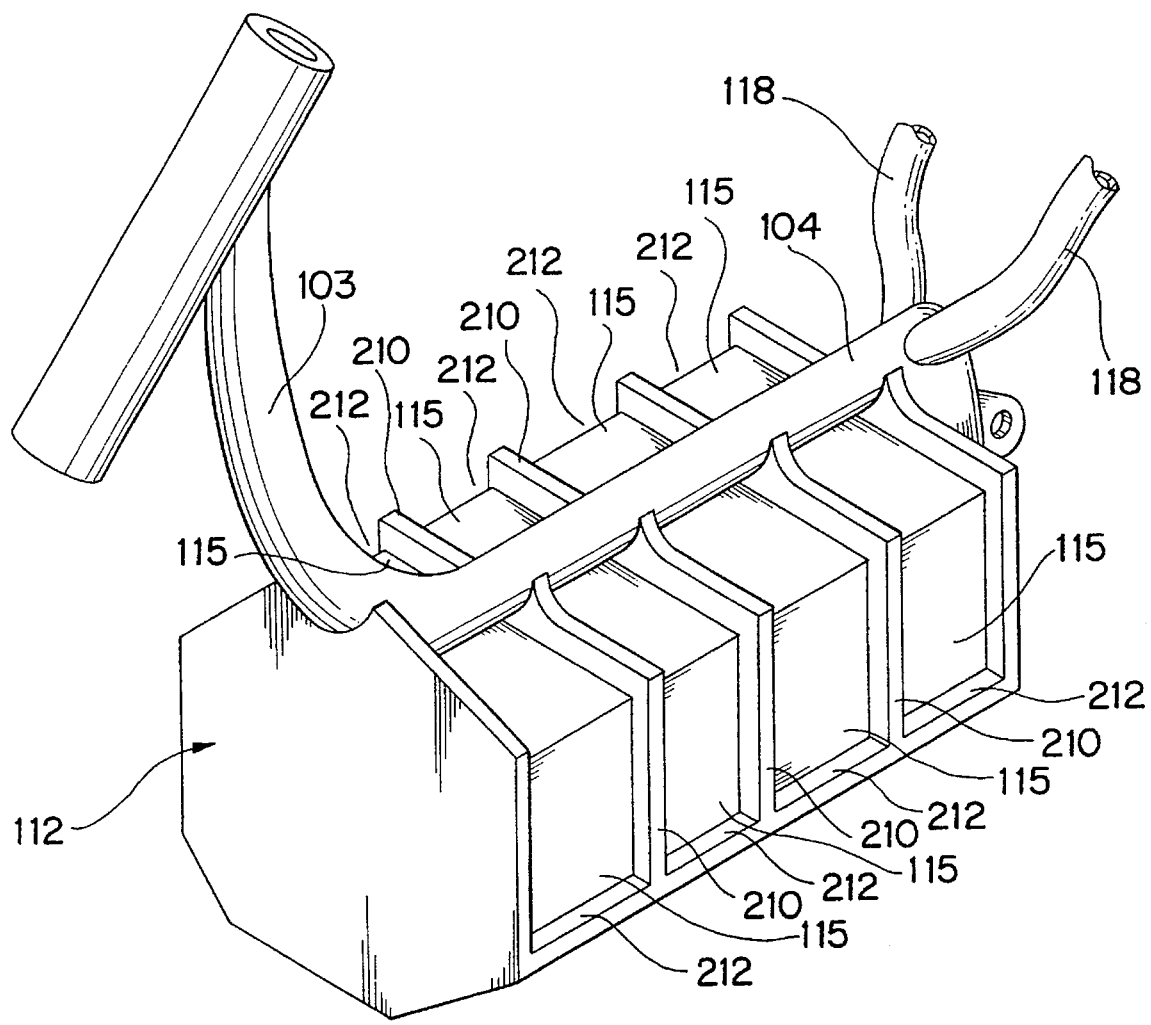
FIG. 34 is a perspective view of major components of the invention according to another embodiment.

In all of these embodiments, the longitudinal side of the battery 115 is disposed in the transverse direction of the battery case 112 (or in the transverse direction of the vehicle body) in mounting and dismantling same. Referring to FIG. 34 which illustrates another embodiment of the invention, the floor frame 104 is connected to a lower portion of the main frame 103, and the center portion of the vehicle body includes a single, longitudinally extending pipe frame with a couple of rear frames 118 connected to rear portions thereof.

The battery case 112 is securely fixed to the floor frame 104 along the center of its top side, and provided with a plural number of partition plates 210 transversely of the vehicle body or in a direction perpendicular to the floor frame 104, the partition plates 210 defining therebetween a plural number of battery compartments 211 which extend fully from one side to the other in the transverse direction of the vehicle body. Each one of the battery compartments 211 is provided with an inlet 212 which is opened toward one lateral side of the vehicle body. The battery 215 may be of either a multi-cell type as employed in the foregoing embodiment or a singular cell type.

With the above-described arrangement, the floor frame 104 does not exist sideward of the battery case 112, so that it becomes possible to mount or dismantle the battery 115 from or in the sideward direction of the vehicle body. This is advantageous particularly in a case where it is difficult to lift the battery 115 up and down due to its heavy weight. The provision of the partition plates 210 contributes to increase the strength against impacts which might be applied from beneath. Further, the floor frame 104 which includes a single pipe permits reduction in the width of the step floor 105 for the sake of slim vehicle body or for ensuring better footing for the driver.

Figure 35:
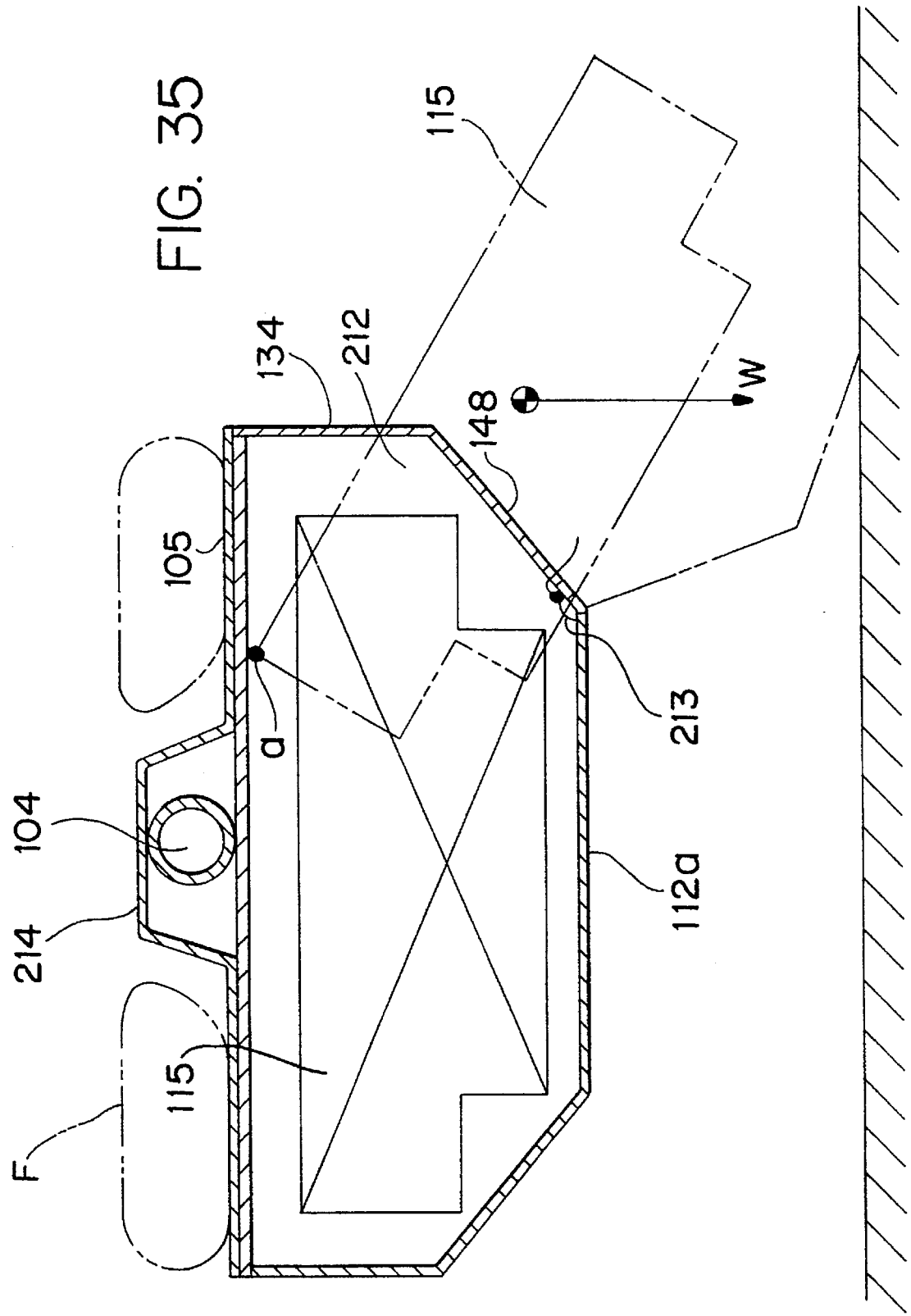
FIG. 35 is a schematic transverse sectional view of another embodiment of the present invention.

In addition to the arrangements of FIG. 34, another embodiment which is shown in FIG. 35 has the side wall 134 swingably connected through a hinge 213 to serve as a lid member for opening and closing the inlet 212. The battery 115, which is the multiple-cell type as in the foregoing embodiments, is mounted in position with its longer side in the transverse direction of the vehicle body, and has a number of cells removed from the opposite sides of its bottom portion to present a profile conforming with the sectional shape of the battery case 112 with oblique wall portions 148 at the opposite sides thereof. The step floor 105 is centrally formed with an upwardly projecting portion 214 for accommodating the floor frame 104. The existence of the upwardly projecting portion 214 gives rise to no problem because the driver's fee F are put on the opposite sides of the upwardly projecting portion 214 as shown in the drawing.

With the above arrangement, the battery 115 can be extracted in the sideward direction of the vehicle body after opening the side wall 134. In so doing, the outer end of the battery 115 which has been extracted from the battery case 12 tends to turn downwardly due to its weight, so that the battery 115 can be extracted gradually in a downwardly inclined posture, without the possibility of slipping off the battery case 112 because the inner upper corner portion a and the bottom of the battery 115 are alternately abutted against the lower side of the step floor 105 and an edge b of the opening at the outer end of the bottom wall 112a, respectively.

Figure 36:
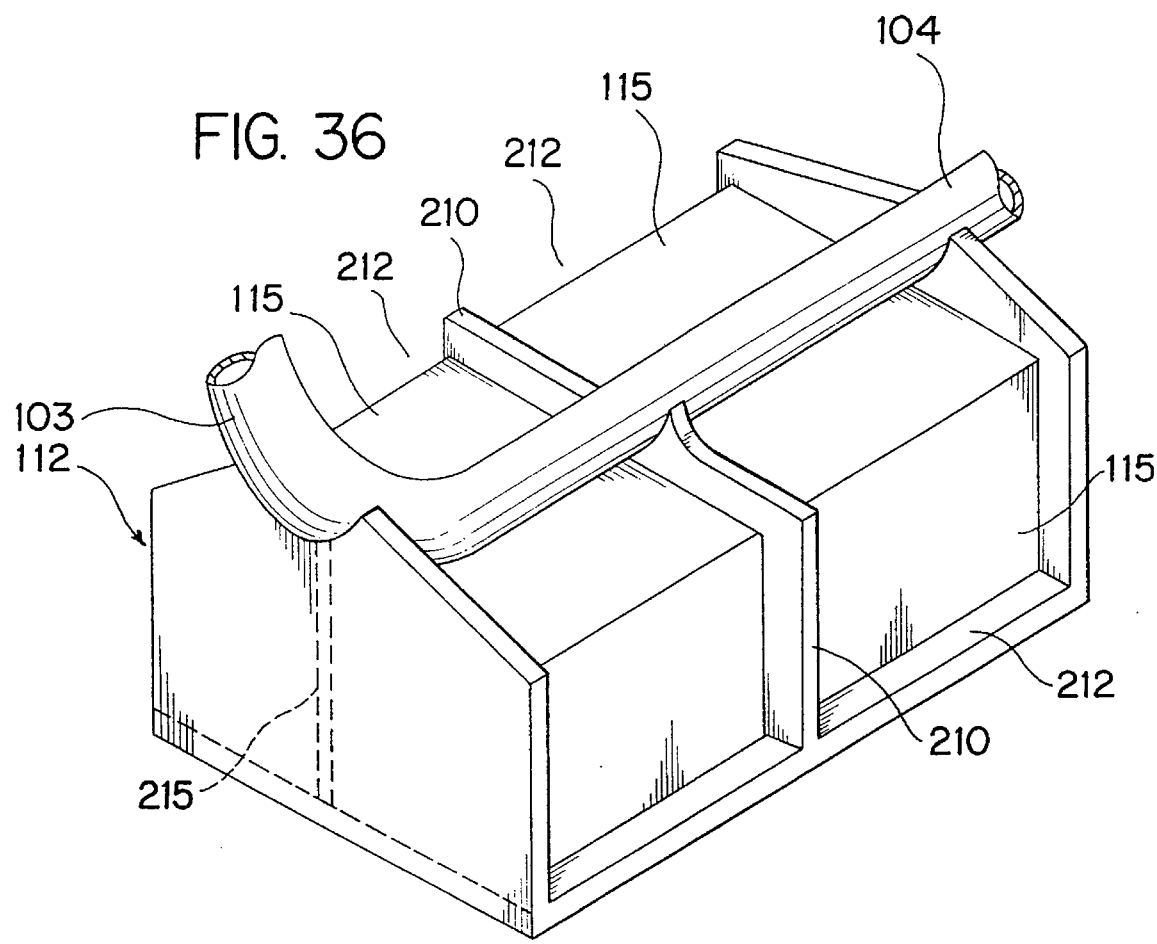
FIG. 36 is a perspective view of another embodiment of the present invention.
Figure 37:
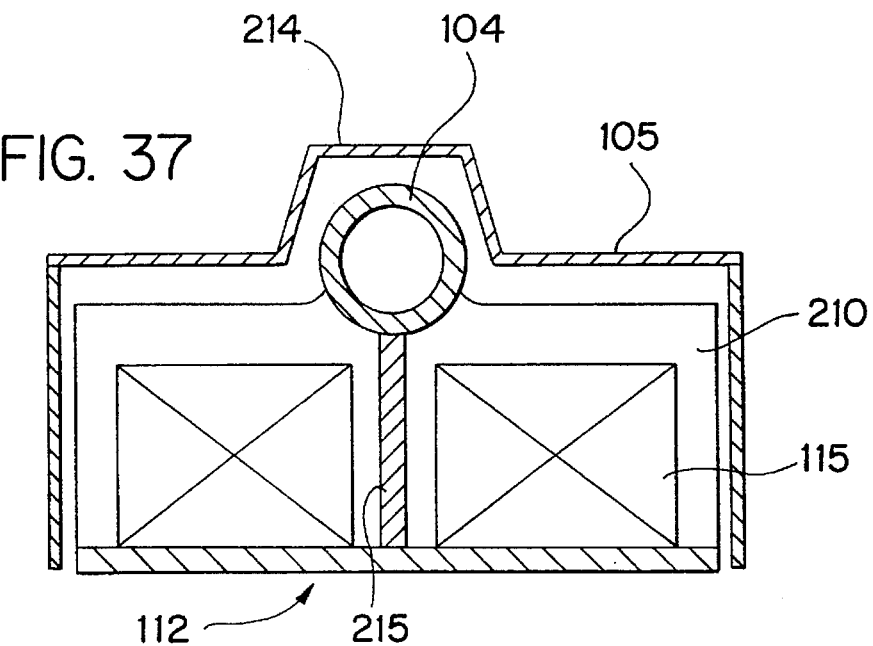
FIG. 37 is a sectional view of another embodiment of the present invention.

Illustrated in FIGS. 36 and 37 is another embodiment of the invention, which is basically the same as the first embodiment of FIG. 34 except that the battery case 112 is almost cut into ½ in length in the longitudinal direction and transverse battery compartments are provided separately on each side of the battery case 112. In this case, the battery case 112 is internally provided with a partition plate 215 along the center thereof. FIG. 37 shows the step floor 105 in addition to the transverse sectional view of FIG. 36.

Figure 38:
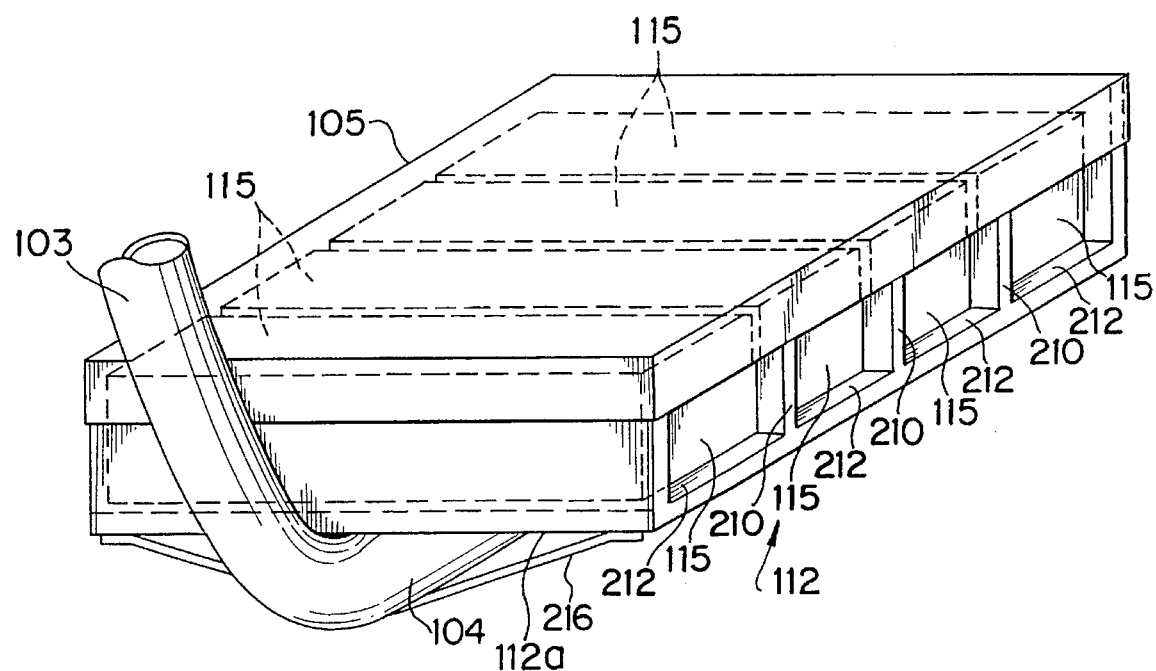
FIG. 38 is a perspective view of the major components according to another embodiment of the present invention.
Figure 39:
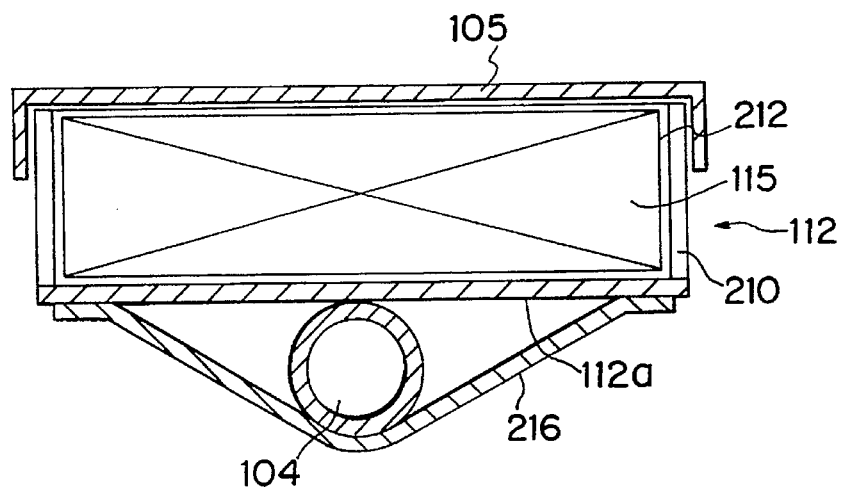
FIG. 39 is a transverse sectional view of another embodiment of the present invention.

FIG. 38 illustrates another embodiment which has a floor frame 104 of one single structure provided longitudinally and centrally along the lower side of the battery case 112. FIG. 39 illustrates the same components in a transverse section. With this arrangement, it becomes possible to employ a flat step floor of a larger area. As seen in FIG. 39, oblique portions 216 are provided between the floor frame 104 and the opposite sides of the bottom wall 12a of the battery case 112 to permit easy banking of the vehicle.

Figure 40:
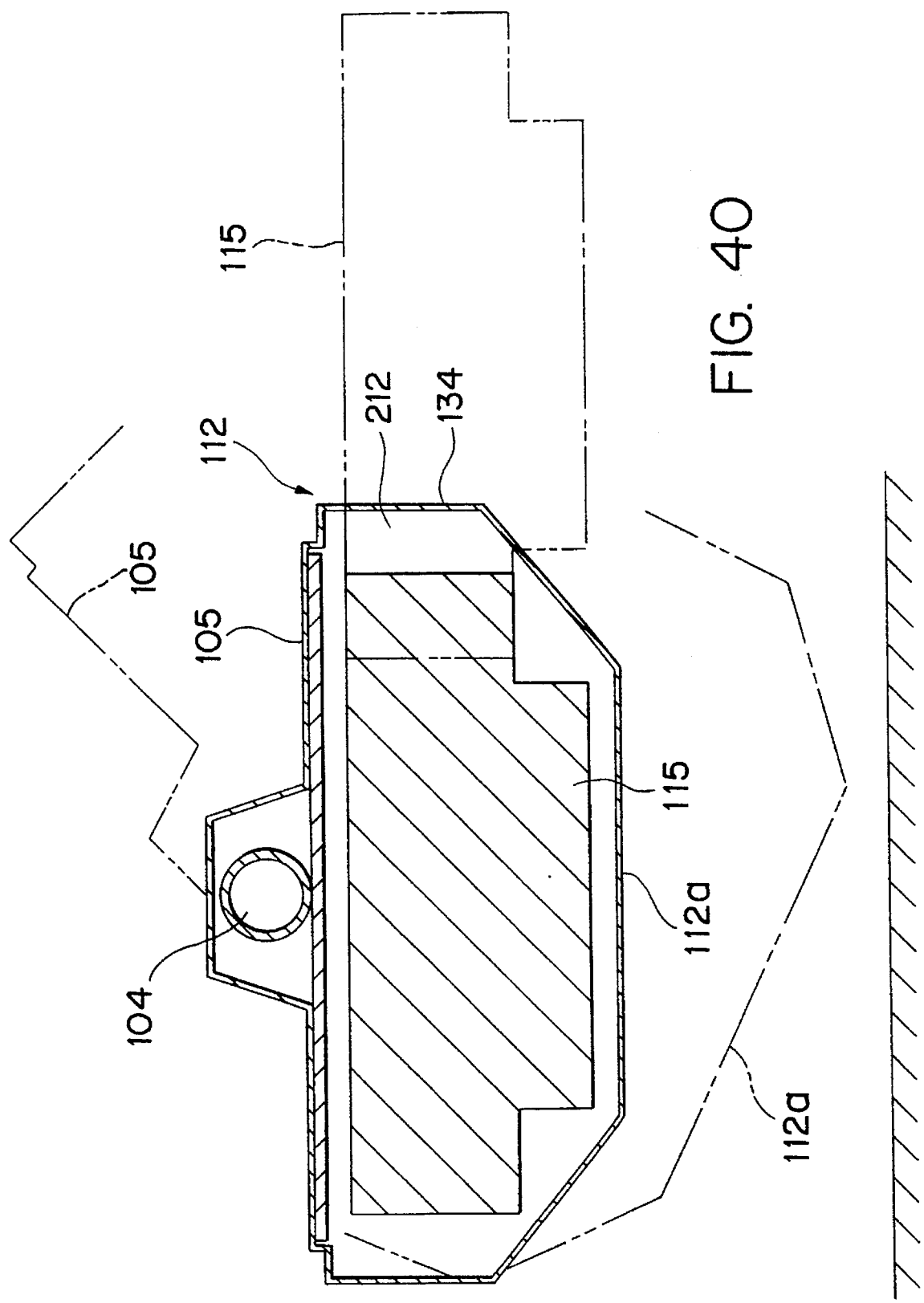
FIG. 40 is a transverse sectional view of another embodiment of the present invention.

Illustrated in FIGS. 40 through 46 are further embodiments employing a guide means for loading or unloading the battery 115 into and out of the battery case 112. More specifically, FIG. 40 shows another embodiment which is similar to the embodiment of FIG. 35 except that the step floor 105 as well as the side wall 134 and bottom wall 112a are swingably connected to serve as lid members. The battery 115 is movable horizontally in the sideward direction of the vehicle body by the use of a guide means which is not shown.

Figure 41:
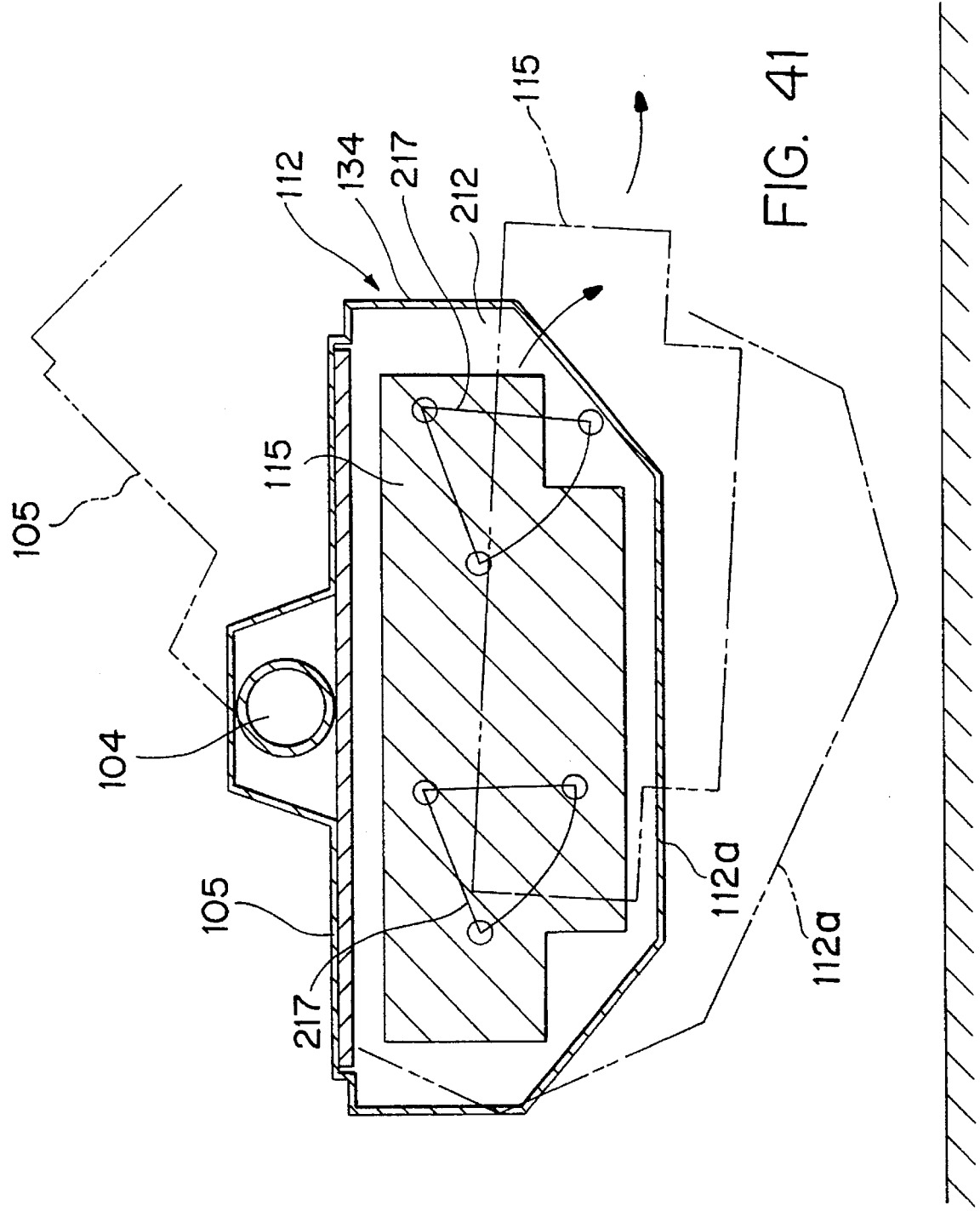
FIG. 41 is a transverse sectional view of another embodiment of the present invention.

FIG. 41 illustrates another embodiment employing an arrangement in which the step floor 105 as well as the side wall 134 and bottom wall 112a are openable, in combination with a guide means which is adapted to get the battery 115 out of the battery case 112 through parallel links 217 of uniform lengths while gradually lowering the outer end.

Figure 42:
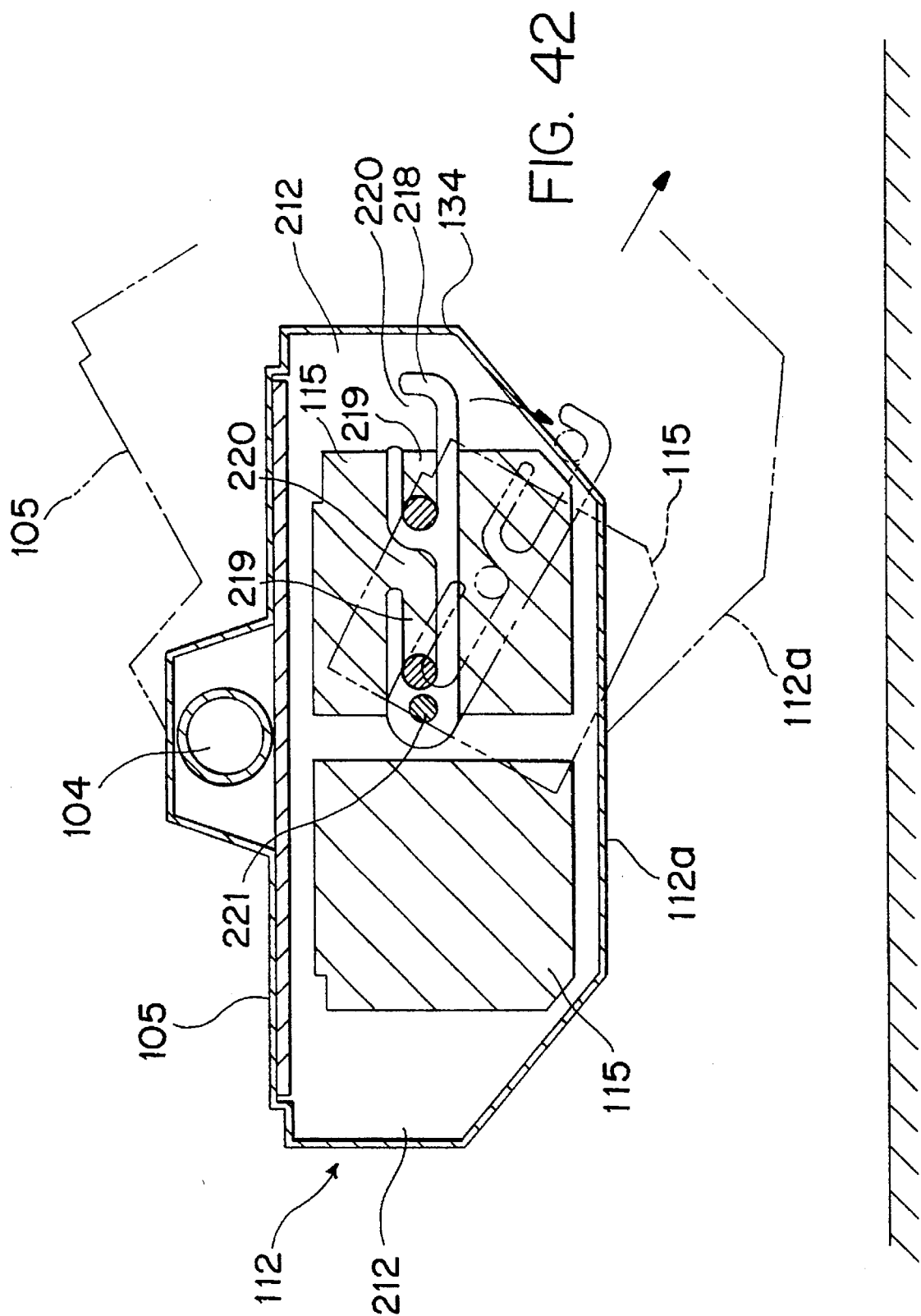
FIG. 42 is a transverse sectional view of another embodiment of the present invention.

FIG. 42 illustrates another embodiment employing an arrangement in which the step floor 105 and the bottom wall 112a are openable in halves on the opposite sides of the floor frame 104 together with the associated side wall 134 (only the right side being opened in FIG. 42). On each side the battery 115 is guided by a slide member 218 which is pivotally supported at one end thereof. The slide member 218 is provided with a couple of guide grooves 219 to support the battery 115 at two positions on the side wall thereof. Accordingly, when extracting the battery 115 from the battery case 112, initially it is moved in the horizontal direction along the slide member 218, which is supported in a horizontal state, as far as an open mouth 220 at the outer end of the slide member 218. In this state, the slide member 218 is turned downward about a pivoting point 221, and at the same time the battery 115 is outwardly turned downward at an angle of about 45° so that it can be removed in the sideward direction.

Figure 43:
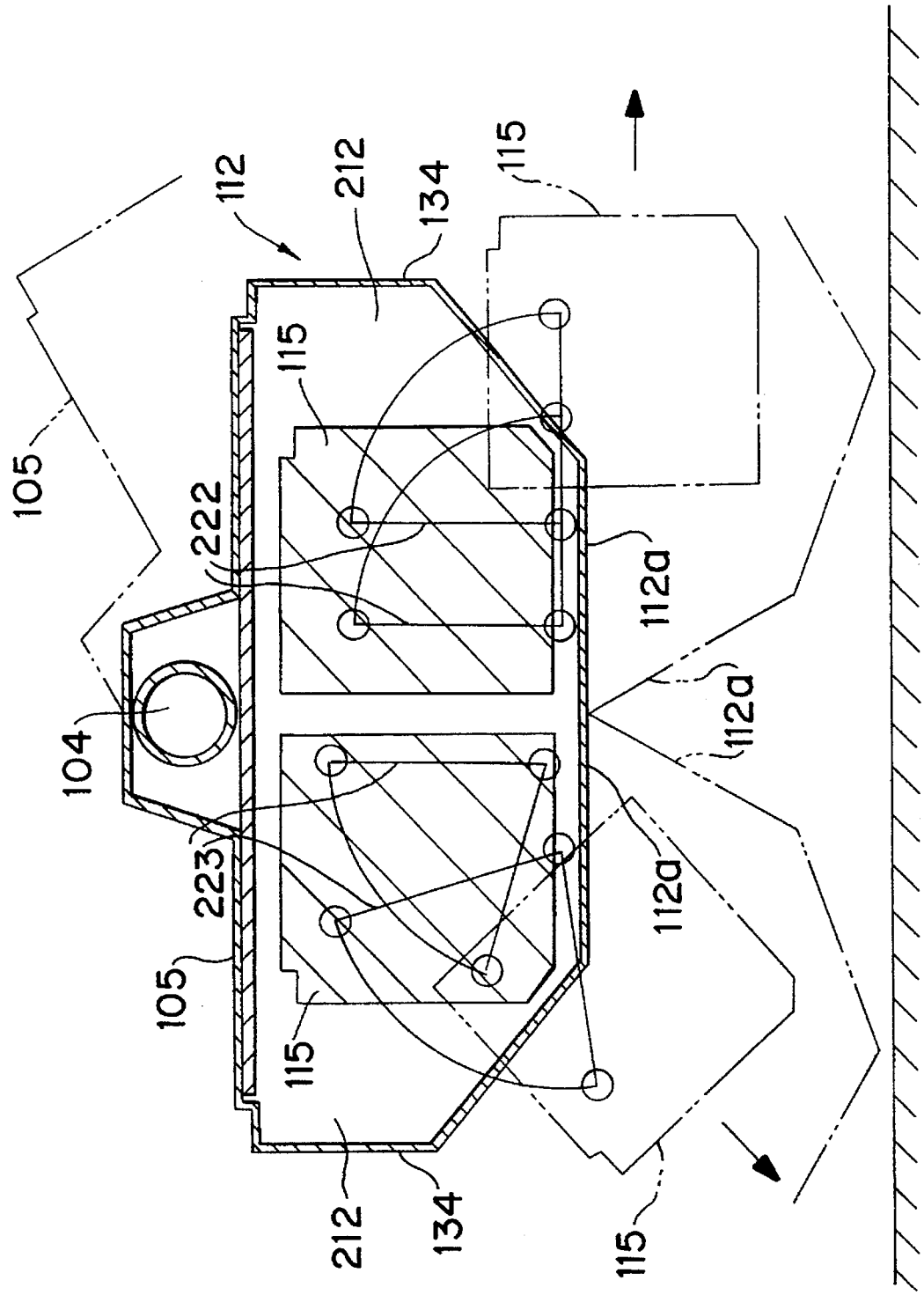
FIG. 43 is a transverse sectional view of another embodiment of the present invention.

FIG. 43 illustrates another embodiment employing an arrangement in which the battery 115 can be turned to a greater degree as compared with the arrangement of FIG. 41, more specifically, through an angle of about 90°. The battery 115 on the right side can be turned through an angle of about 90° by the use of links 222 of uniform lengths, while the battery on the left side can be turned through more than approximately 90° by the use of trapezoidal links of different lengths. Either type of links can be selectively adopted depending upon the need.

Figure 44:
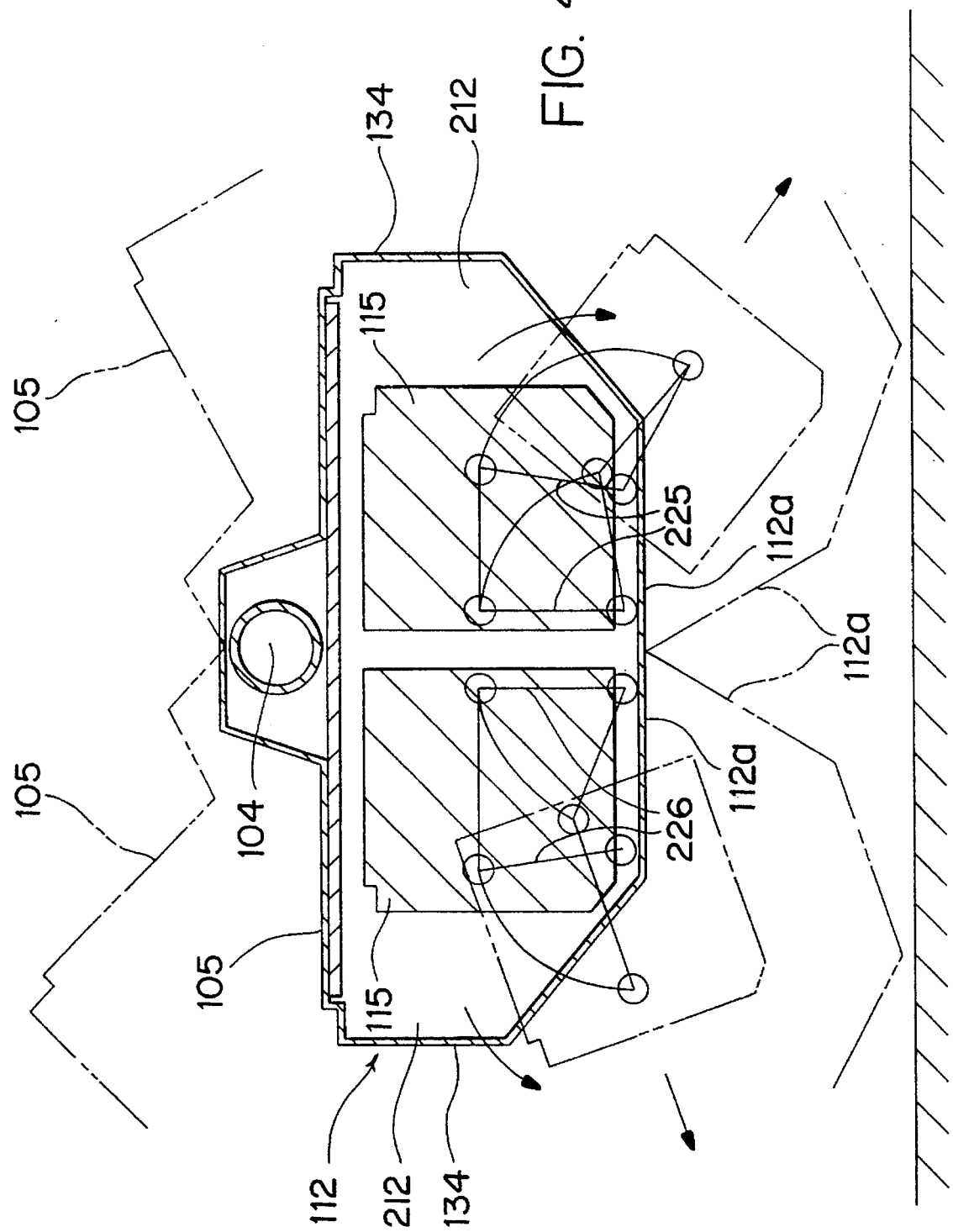
FIG. 44 is a transverse sectional view of another embodiment of the present invention.

FIG. 44 illustrates another embodiment employing another link arrangement using trapezoidal links 225 and 226 of different lengths. Either one of these links permits to extract the battery in a posture which is inclined downward in the outward direction, and to set the angle of inclination arbitrarily by changing the combination of link members.

FIG. 45 illustrates another embodiment employing a pair of link members 227 and 228 of different lengths, which have the respective pivoting points in an upper outer portion of the battery 115. Consequently, the battery 115 can be extracted in an obliquely raised state.

FIG. 46 illustrates another embodiment employing different guide systems for the batteries 115 on the left and right battery cases. In an unloading operation, the battery 115 on the left side is turned downward in the outward direction together with the side wall 134. Of course, it is possible to combine different guide systems of different movements arbitrarily by the use of the guides means described hereinbefore or other guide means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An electrically powered motor-scooter having a scooter body, said scooter body including a step floor, a seat, a body cover mounted under said seat, and a storage compartment located below said seat, said motor-scooter comprising:

a battery case mounted under said step floor, said battery case having at least one opening which is open to the surrounding air for allowing the flow of air therethrough;

a rear compartment extending below and rearwardly of said storage compartment and extending rearwardly of said battery case, said storage compartment forming an upper wall of said rear compartment, and said body cover forming sidewalls of said rear compartment, a portion of said rear compartment being open to the surrounding air;

a fan mounted in a forward portion of said rear compartment for producing a movement of cooling air between said rear compartment and said battery case, said cooling air passing through said rear compartment and said opening in said battery case;

a duct connected between said fan and said battery case, said duct forming a passage for said cooling air to pass therethrough; and a control apparatus mounted in said rear compartment rearwardly of said fan for controlling a drive motor of said electrically powered motor-scooter.

2. The electrically powered motor-scooter according to claim 1, wherein said control apparatus includes a charger, a controller, and a converter.

3. The electrically powered motor-scooter according to claim 2, wherein said body cover substantially encloses said control apparatus.

4. The electrically powered motor-scooter according to claim 3, wherein said charger includes a charging cable for connection to a source of electricity, and said body cover includes:

an access opening for obtaining access to said charging cable; and an access opening cover associated with said access opening.

5. The electrically powered motor-scooter according to claim 4, wherein said seat is operatively mounted to said scooter body for pivotal movement about a front end thereof between an open position allowing access to said storage compartment and a closed position preventing access to said storage compartment, and wherein a rear portion of said seat prevents said access opening cover from being opened when said seat is in said closed position.

6. The electrically powered motor-scooter according to claim 2, wherein said controller is located substantially directly under said charger.

7. The electrically powered motor-scooter according to claim 2, wherein said charger includes a charging cable for connection to a source of electricity.

8. The electrically powered motor-scooter according to claim 1, wherein said seat is operatively mounted to said scooter body for pivotal movement about a front end thereof between an open position allowing access to said storage compartment and a closed position preventing access to said storage compartment, said control apparatus including a charging cable for connection to a source of electricity, and said scooter body including:

an access opening for obtaining access to said charging cable; and an access opening cover associated with said access opening, wherein a rear portion of said seat prevents said access opening cover from being opened when said seat is in said closed position.

9. The electrically powered motor-scooter according to claim 1, wherein said body cover substantially encloses said control apparatus.

10. The electrically powered motor-scooter according to claim 1, wherein said storage compartment is shaped and sized to receive a helmet of an operator of said electrically powered motor-scooter.

* * * * *